US009063613B2

(12) United States Patent
Harada et al.

(10) Patent No.: US 9,063,613 B2
(45) Date of Patent: Jun. 23, 2015

(54) IMAGE PICKUP DEVICE, DISPLAY-AND-IMAGE-PICKUP DEVICE, ELECTRONIC APPARATUS AND METHOD OF DETECTING AN OBJECT

(75) Inventors: Tsutomu Harada, Tokyo (JP); Yoshiharu Nakajima, Tokyo (JP); Michiru Senda, Tokyo (JP); Kazunori Yamaguchi, Tokyo (JP); Mitsuru Tateuchi, Tokyo (JP); Ryoichi Tsuzaki, Tokyo (JP); Toshikazu Maekawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 1400 days.

(21) Appl. No.: 12/451,485

(22) PCT Filed: Mar. 18, 2009

(86) PCT No.: PCT/JP2009/055328
§ 371 (c)(1),
(2), (4) Date: Nov. 13, 2009

(87) PCT Pub. No.: WO2009/119417
PCT Pub. Date: Oct. 1, 2009

(65) Prior Publication Data
US 2010/0128004 A1    May 27, 2010

(30) Foreign Application Priority Data
Mar. 24, 2008  (JP) ................................. 2008-076281

(51) Int. Cl.
*G06F 3/042*    (2006.01)
*G06F 3/041*    (2006.01)
(Continued)

(52) U.S. Cl.
CPC .............. *G06F 3/042* (2013.01); *G06F 3/0412* (2013.01); *G06F 3/04883* (2013.01); *G09G 3/3406* (2013.01); *G09G 2360/142* (2013.01)

(58) Field of Classification Search
CPC ....... G06F 3/041; G06F 3/042; G06F 3/0421; G09G 3/30
USPC ............. 345/156, 173–178; 178/18.09, 18.11
See application file for complete search history.

(56) References Cited

U.S. PATENT DOCUMENTS 7,190,336 B2    3/2007 Fujisawa
2004/0113877 A1  6/2004 Abileah et al.
(Continued)

FOREIGN PATENT DOCUMENTS

EP    1 744 241 A1    1/2007
JP    2000-222097 A    8/2000
(Continued)

OTHER PUBLICATIONS

International Search Report; International Application No. PCT/JP2009/055328; Date of mailing of International Search Report: May 26, 2009.
(Continued)

*Primary Examiner* — Amare Mengistu
*Assistant Examiner* — Stacy Khoo
(74) *Attorney, Agent, or Firm* — Fishman Stewart Yamaguchi PLLC

(57) ABSTRACT

An image pickup device capable of stably detecting an object irrespective of use conditions while reducing manufacturing costs is provided. When illumination light from a backlight 15 is emitted to a proximity object from an I/O display panel 20, an electric charge for charging is accumulated in each of image pickup pixels 33 in accordance with total light amount as a summation of reflected light Lon originating from the illumination light and environment light (outside light) L0. Moreover, when the above-described illumination light is not emitted, an electric charge for discharging is released from each of the image pickup pixels 33 in accordance with light amount of the environment light L0. Thereby, a component by the environment light L0 is subtracted in an image pickup signal obtained from each of the image pickup pixels 33, so object information about the proximity object is obtainable without influence of the environment light L0. Moreover, in a light reception drive circuit 13, a smaller number of necessary frame memories 13A for producing a picked-up image from the image pickup signal than that in related art are necessary.

26 Claims, 52 Drawing Sheets

(51) Int. Cl.
*G06F 3/0488* (2013.01)
*G09G 3/34* (2006.01)

(56) References Cited

U.S. PATENT DOCUMENTS

| | | |
|---|---|---|
| 2005/0281475 A1 | 12/2005 | Wilson |
| 2006/0103637 A1* | 5/2006 | Yamaguchi et al. .......... 345/175 |
| 2006/0146175 A1 | 7/2006 | Numazaki et al. |
| 2006/0214892 A1 | 9/2006 | Harada et al. |
| 2008/0055266 A1* | 3/2008 | Harada et al. ................. 345/173 |
| 2008/0211787 A1* | 9/2008 | Nakao et al. .................. 345/175 |
| 2013/0120331 A1 | 5/2013 | Yamamoto et al. |

FOREIGN PATENT DOCUMENTS

| | | |
|---|---|---|
| JP | 3275579 B2 | 4/2002 |
| JP | 2004-127272 | 4/2004 |
| JP | 2006-276223 | 10/2006 |
| JP | 2007-011228 | 1/2007 |
| JP | 2007-065508 | 3/2007 |
| JP | 2007-206192 | 8/2007 |

OTHER PUBLICATIONS

Supplemental European Search Report issued Apr. 10, 2015 for corresponding European Application No. 09 724 453.7—1972/2151740.

Communication Pursuant to Article 94(3) EPC issued May 4, 2015 for corresponding European No. 09 724 453.7—1972.

* cited by examiner

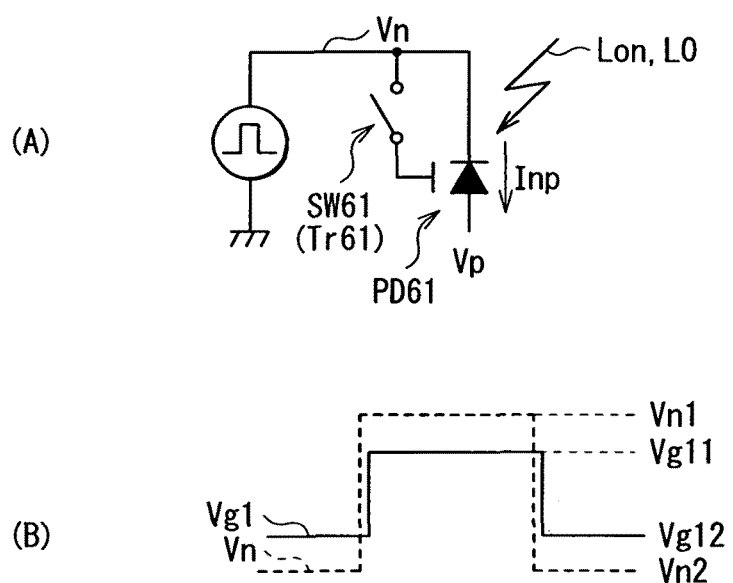
F I G. 37

IMAGE PICKUP DEVICE, DISPLAY-AND-IMAGE-PICKUP DEVICE, ELECTRONIC APPARATUS AND METHOD OF DETECTING AN OBJECT

TECHNICAL FIELD

The present invention relates to an image pickup device and a display-and-image-pickup device obtaining information such as the position of an object touching or in proximity to a panel, and an electronic apparatus including such a display-and-image-pickup device, and a method of detecting an object for obtaining such information.

BACKGROUND ART

Techniques of detecting the position or the like of an object touching or in proximity to a surface of a display have been heretofore known. Among them, as a typical and widespread technique, a display including a touch panel is cited.

There are various types of touch panels, but as a commonly used type, a touch panel of a type detecting capacitance is cited. When a finger touches the touch panel, the touch panel captures a change in a surface electric charge of the panel to detect the position or the like of an object. Therefore, when such a touch panel is used, users are allowed to intuitively operate the touch panel.

Moreover, the applicant of the invention has proposed displays having a display function of displaying an image and an image pickup function (a detection function) of picking up an image of an object (detecting an object) in Patent Document 1 and Patent Document 2.
[Patent Document 1] Japanese Unexamined Patent Application Publication No. 2004-127272
[Patent Document 2] Japanese Unexamined Patent Application Publication No. 2006-276223

DISCLOSURE OF THE INVENTION

When a display described in the above-described Patent Document 1 is used, for example, in the case where an object such as a finger touches or comes in proximity to a display-and-image-pickup panel, the position or the like of the object is detectable based on an image picked up by using reflected light reflected by the object from illumination light from the display-and-image-pickup panel. Therefore, when this display is used, the position or the like of the object is detectable with a simple configuration without separately arranging a component such as a touch panel on a display-and-image-pickup panel.

However, in the case where the reflected light reflected by the object is used as described above, in some cases, outside light (environment light) or variations in characteristics of light-receiving elements cause an issue. More specifically, the luminance of received light depends on the brightness of outside light, so in some cases, it is difficult to detect the position or the like of the object based on a picked-up image. Moreover, variations in characteristics of the light-receiving elements cause stationary noises, thereby in some cases, it is difficult to detect the position or the like of the object based on the picked-up image.

Therefore, in the above-described Patent Document 2, a difference between an image obtained in a light-emitting state (an image obtained by using reflected light originating from illumination light) and an image obtained in a lighting-off state is detected to remove an influence by the above-described outside light or stationary noise.

More specifically, for example, as illustrated in a sectional view of FIG. 55(A), in the case where incident outside light (environment light) L0 is strong, as illustrated in FIG. 55(B), a light reception output voltage Von101 in a state in which a backlight 105 is on has a voltage value Va corresponding to the brightness of the environment light L0 at a point other than a point touched by a finger f in a display area 101, and at the point touched by the finger f in the display area 101, the light reception output voltage Von101 is reduced to a voltage value Vb corresponding to reflectivity at which illumination light Lon from the backlight 105 is reflected on the surface of an object (the finger F) touching the point at this time. On the other hand, as in the case of the light reception output voltage Von101, a light reception output voltage Voff101 in a state in which the backlight 105 is off has the voltage value Va corresponding to the brightness of the environment light L0 at a point other than the point touched by the finger f, but the point touched by the finger f is in a state in which the environment light L0 is blocked, so the light reception output voltage Voff101 has a very low-level voltage value Vc.

Moreover, as illustrated in a sectional view of FIG. 56(A), in a state in which the incident environment light L0 is weak (very little), as illustrated in FIG. 56(B), a light reception output voltage Von201 in a state in which the backlight 105 is on has the very low-level voltage value Vc at a point other than the point touched by the finger f in the display area 101, because the environment light L0 is not present, and at the point touched by the finger f in the display area 101, the light reception output voltage Von201 is increased to the voltage value Vb corresponding to reflectivity at which the illumination light Lon from the backlight 105 is reflected on the surface of the object (the finger f) touching the point at this time. On the other hand, a light reception output voltage Voff201 in a state in which the backlight 105 is off remains unchanged at the very low-level voltage value Vc at the point touched by the finger f and any other point.

As described above, at a point not touched by the finger f in the display area 101, the light reception output voltage is greatly different between the case where the environment light L0 is present and the case where the environment light L0 is not present. On the other hand, at the point touched by the finger f in the display area 101, the voltage Vb when the backlight 105 is on and the voltage Vc when the backlight 105 is off are substantially in the same state irrespective of the presence or absence of the environment light L0. Therefore, it is considered that when a difference between a voltage when the backlight 105 is on and a voltage when the backlight 105 is off is detected, a point where there is a certain or larger difference such as a difference between the voltages Vb and Vc is allowed to be determined as a point where the object touches or comes in proximity, and, for example, like a difference image C illustrated in FIG. 57, the position or the like of the object is detectable without influence of outside light or stationary noises.

However, in a method of detecting an object using such a difference image C, for example, as illustrated in FIG. 57, frame memories or the like for two images, that is, an image when a backlight is off (an image A) and an image when the backlight is on (an image B) are necessary, thereby to cause an increase in component costs.

As described above, in related art, it is difficult to stably detect an object touching or in proximity to a panel irrespective of use conditions at the time while reducing manufacturing costs, and there is room for improvement.

The present invention is made to solve the above-described issues, and it is an object of the invention to provide an image pickup device, a display-and-image-pickup device and a method of detecting an object which are capable of stably detecting an object irrespective of use conditions while reducing manufacturing costs, and an electronic apparatus including such a display-and-image-pickup device.

An image pickup device of the invention includes: an image pickup panel including a plurality of image pickup pixels, and having an illumination light source for a proximity object; an image pickup drive means for obtaining an image pickup signal from each of the image pickup pixels by performing an image pickup drive on each of the image pickup pixels; and an image processing means for obtaining object information including one or more of position, shape and size of the proximity object through utilizing a picked-up image based on the image pickup signal obtained from each of the image pickup pixels. Moreover, the above-described image pickup drive means performs an image pickup drive so that when illumination light is emitted from the illumination light source, an electric charge for charging is accumulated in each of the image pickup pixels in accordance with total light amount as a summation of reflected light originating from the illumination light and environment light, and when the illumination light is not emitted from the illumination light source, an electric charge for discharging is released from each of the image pickup pixels in accordance with light amount of the environment light, thereby to obtain the image pickup signal from each of the image pickup pixels. In addition, "a proximity object" means not only a literally proximity object but also an object in a touch state.

A display-and-image-pickup device of the invention includes: a display-and-image-pickup panel including a plurality of display pixels and a plurality of image pickup pixels; a display drive means for displaying an image by performing a display drive on each of the display pixels; an image pickup drive means for obtaining an image pickup signal from each of the image pickup pixels by performing an image pickup drive on each of the image pickup pixels; and an image processing means for obtaining object information including one or more of position, shape and size of a proximity object through utilizing a picked-up image based on the image pickup signal obtained from each of the image pickup pixels. Moreover, the above-described image pickup drive means performs an image pickup drive so that when illumination light is emitted from the display-and-image-pickup panel to the proximity object, an electric charge for charging is accumulated in each of the image pickup pixels in accordance with total light amount as a summation of reflected light originating from the illumination light and environment light, and when the illumination light is not emitted from the display-and-image-pickup panel, an electric charge for discharging is released from each of the image pickup pixels in accordance with light amount of the environment light, thereby to obtain the image pickup signal from each of the image pickup pixels. In addition, "illumination light" means not only display light applied from the display-and-image-pickup panel but also light applied from another light source (for example, an infrared light source or the like) on the display-and-image-pickup panel.

An electronic apparatus of the invention includes the above-described display-and-image-pickup device having an image display function and an image pickup function.

A method of detecting an object of the invention includes steps of: performing an image pickup drive on each of a plurality of image pickup pixels so that when illumination light is emitted to a proximity object from an image pickup panel including the plurality of image pickup pixels, an electric charge for charging is accumulated in each of the image pickup pixels in accordance with total light amount as a summation of reflected light originating from the illumination light and environment light, and when the illumination light is not emitted, an electric charge for discharging is released from each of the image pickup pixels in accordance with light amount of the environment light, thereby obtaining an image pickup signal from each of the image pickup pixels; and obtaining object information including one or more of position, shape and size of the proximity object through utilizing a picked-up image based on the image pickup signal obtained from each of the image pickup pixels.

In the image pickup device, the display-and-image-pickup device, the electronic apparatus and the method of detecting an object of the invention, when illumination light is emitted to the proximity object from the image pickup panel or the display-and-image-pickup panel, an electric charge for charging is accumulated in each of the image pickup pixels in accordance with total light amount as a summation of reflected light originating from the illumination light and environment light. Moreover, when the above-described illumination light is not emitted, an electric charge for discharging is released from each of the image pickup pixels in accordance with light amount of the environment light. Thereby, an image pickup signal is obtained from each of the image pickup pixels. Then, object information including one or more of position, shape and size of the proximity object is obtained through utilizing a picked-up image based on the image pickup signal obtained from each of the image pickup pixels. Thereby, a component by the environment light is subtracted in the image pickup signal from each of the image pickup pixels, so object information about the proximity object is obtainable without influence of such environment light. Moreover, the image pickup signal is obtained from each of the image pickup pixels based on an operation of accumulating the electric charge for charging and an operation of releasing the electric charge for discharging, so a smaller number of necessary frame memories or the like for producing a picked-up image from the image pickup signal than that in related art are necessary.

According to the image pickup device, the display-and-image-pickup device, the electronic apparatus or the method of detecting an object of the invention, when illumination light is emitted to the proximity object from the image pickup panel or the display-and-image-pickup panel, an electric charge for charging is accumulated in each of the image pickup pixels in accordance with total light amount as a summation of reflected light originating from the illumination light and environment light, and when the above-described illumination light is not emitted, an electric charge for discharging is released from each of the image pickup pixels in accordance with light amount of the environment light, thereby the image pickup signal is obtained from each of the image pickup pixels, so object information about the proximity object is obtainable without influence of the environment light, and a smaller number of necessary frame memories or the like for producing a picked-up image from the image pickup signal than that in related art are necessary. Therefore, the object is stably obtainable irrespective of use conditions while reducing manufacturing costs.

BRIEF DESCRIPTION OF THE DRAWINGS

FIG. 37 is an illustration for describing an on-operation region and an off-operation region in a photoelectric transducer according to Modification Example 5.

BEST MODE(S) FOR CARRYING OUT THE INVENTION

A best mode for carrying out the invention (hereinafter simply referred to as embodiment) will be described in detail below referring to the accompanying drawings.

Figure 1:
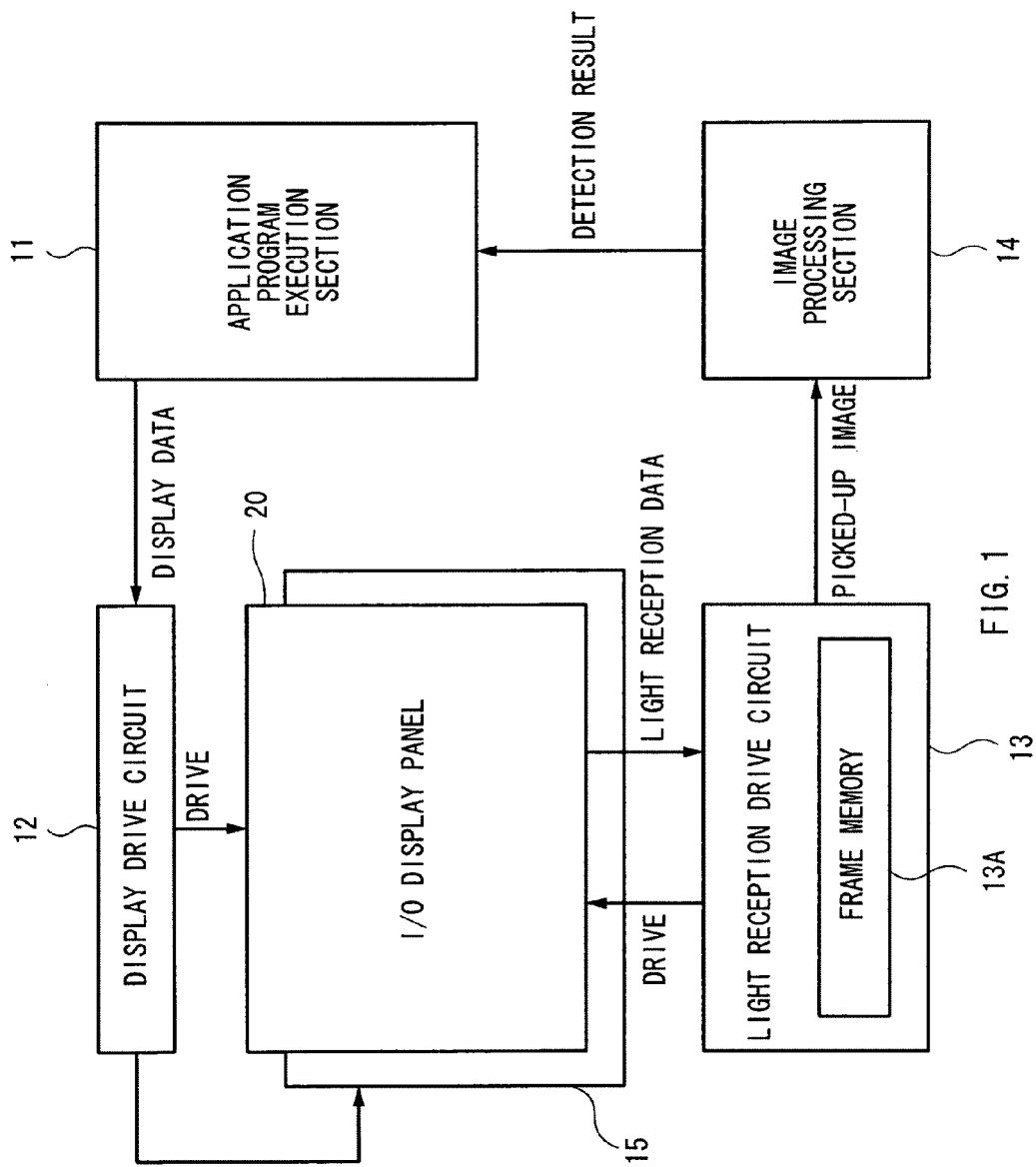
FIG. 1 is a block diagram illustrating a configuration of a display-and-image-pickup device according to an embodiment of the invention.

FIG. 1 illustrates the whole configuration of a display-and-image-pickup device according to an embodiment of the invention. The display-and-image-pickup device includes an I/O display panel 20, a backlight 15, a display drive circuit 12, a light reception drive circuit 13, an image processing section 14 and an application program execution section 11.

The I/O display panel 20 configured of a liquid crystal panel (LCD (Liquid Crystal Display)) in which a plurality of pixels are arranged in a matrix form on the whole surface thereof, and has a function (display function) of displaying an image such as a predetermined symbol or character based on display data while performing a line-sequential operation, and a function (image pickup function) of picking up an image of an object (a proximity object) touching or in proximity to the I/O display panel 20, as will be described later. Moreover, the backlight 15 is a light source for display and detection of the I/O display panel 20, and is formed, for example, by arranging a plurality of light-emitting diodes, and as will be described later, the backlight 15 performs an on-off operation at high speed at a predetermined timing in synchronization with an operation timing of the I/O display panel 20.

The display drive circuit 12 is a circuit driving the I/O display panel 20 (driving a line-sequential display operation) so as to display an image based on display data on the I/O display panel 20 (to perform a display operation).

The light reception drive circuit 13 is a circuit driving the I/O display panel 20 (driving a line-sequential image pickup operation) so as to obtain a light reception signal (an image pickup signal) from each pixel of the I/O display panel 20 (to pick up an image of an object). In addition, the light reception signal from each pixel is accumulated in a frame memory 13A, for example, on a frame-by-frame basis to be outputted to the image processing section 14 as a picked-up image.

The image processing section 14 performs predetermined image processing (arithmetic processing) based on the picked-up image outputted from the light reception drive circuit 13, and detects and obtains object information about the object touching or in proximity to the I/O display panel 20 (position coordinate data, data about the shape or size of the object, or the like). A process of detecting the object information will be described in detail later.

The application program execution section 11 executes a process according to predetermined application software based on a detection result by the image processing section 14, and as the application program execution section 11, for example, a section in which the position coordinates of a detected object are included in display data, and are displayed on the I/O display panel 20, or the like is cited. In addition, display data produced in the application program execution section 11 is supplied to the display drive circuit 12.

Figure 2:
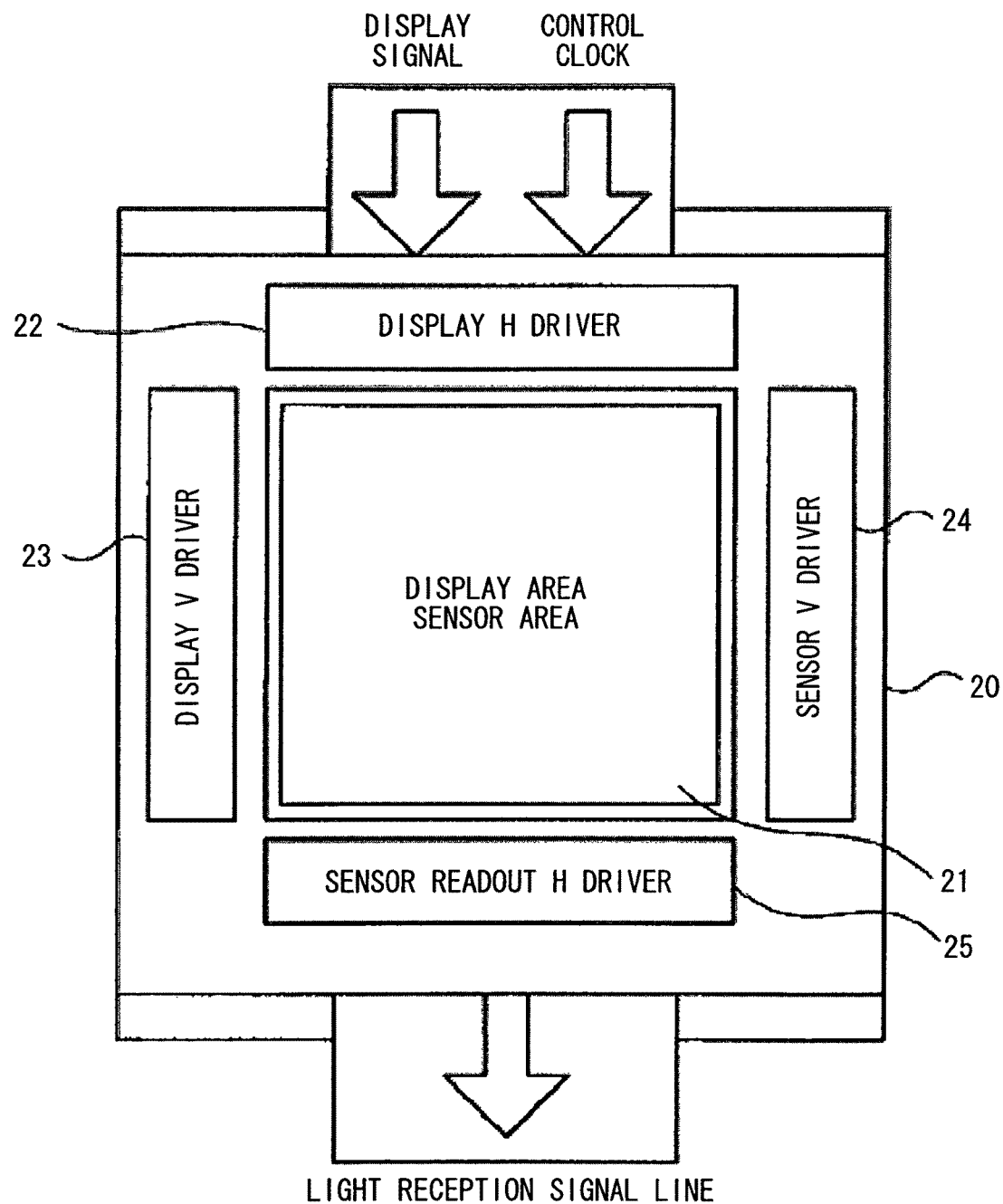
FIG. 2 is a block diagram illustrating a configuration example of an I/O display panel illustrated in FIG. 1.

Next, a specific configuration example of the I/O display panel 20 will be described below referring to FIG. 2. The I/O display panel 20 includes a display area (a sensor area) 21, a display H driver 22, a display V driver 23, a sensor readout H driver 25 and a sensor V driver 24.

The display area (the sensor area) 21 is an area where light from the backlight 15 is modulated to emit illumination light (including display light and illumination light for detection from, for example, an infrared light source or the like (not illustrated), hereinafter the same meaning shall apply), and an image of an object touching or in proximity to the area is picked up, and in the display area 21, liquid crystal elements which are light-emitting elements (display elements) and light-receiving elements (image pickup elements) which will be described later are arranged in a matrix form.

The display H driver 22, together with the display V driver 23, line-sequentially drives a liquid crystal element of each pixel in the display area 21 in response to a display signal for display drive and a control clock which are supplied from the display drive circuit 12.

The sensor readout H driver 25, together with the sensor V driver 24, line-sequentially drives a light-receiving element of each pixel in the display area 21 to obtain a light reception signal. Moreover, although details will be described later, the sensor readout H driver 25 and the sensor V driver 24 perform an image pickup drive so that when illumination light is emitted from the I/O display panel 20 to a proximity object, an electric charge for charging is accumulated in each pixel in accordance with total light amount as a summation of reflected light originating from the illumination light and environment light, and when the illumination light is not emitted from the I/O display panel 20, an electric charge for discharging is released from each pixel in accordance with the light amount of the environment light, thereby to obtain an image pickup signal (a light reception signal) for each pixel.

Next, referring to FIGS. 3 to 6, a specific configuration example of each pixel in the display area 21 will be described below.

Figure 3:
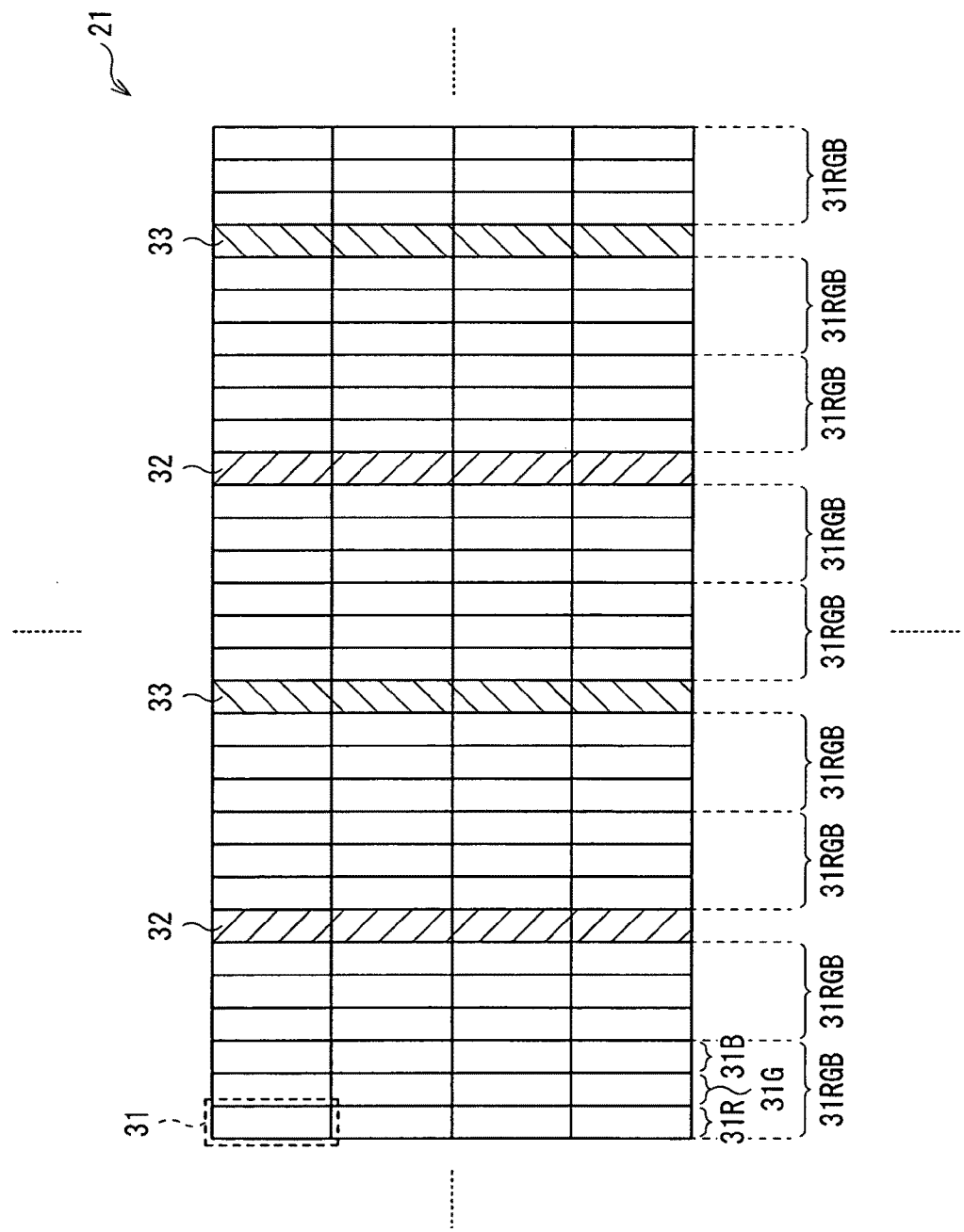
FIG. 3 is a plan view illustrating a pixel arrangement example in a display area (a sensor area) illustrated in FIG. 2.
Figure 4:
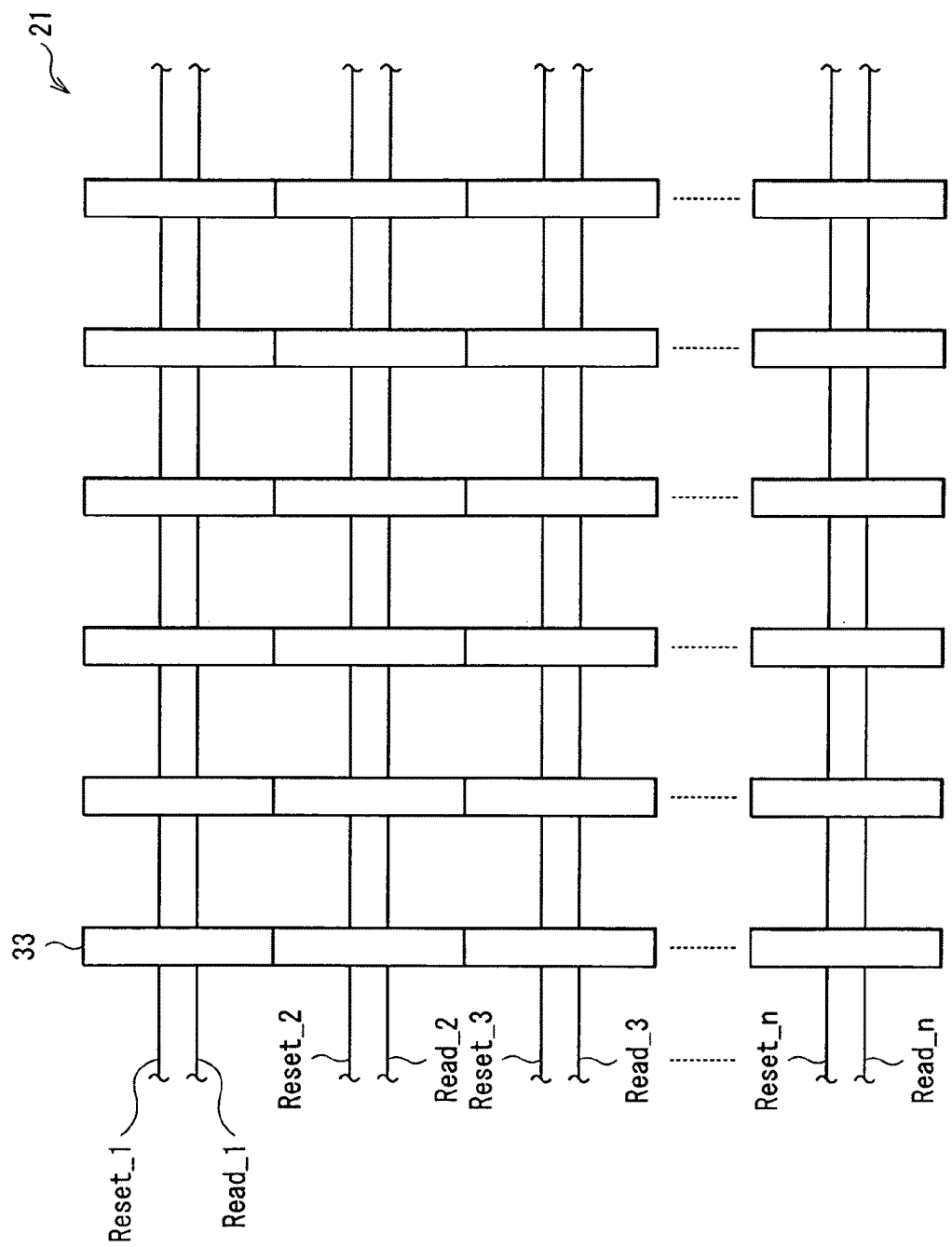
FIG. 4 is a schematic plan view illustrating an example of a connection relationship between light-receiving sections and signal lines in a pixel arrangement illustrated in FIG. 3.

First, for example, as illustrated in FIG. 3, the pixels 31 include display pixels (display sections) 31RGB, image pickup pixels (light-receiving sections) 33, and wiring sections 32 in which wiring for the image pickup pixels 33 is formed. Moreover, the display pixels 31RGB include red (R) display pixels 31R, green (G) display pixels 31G and blue (B) display pixels 31B. The display pixels 31RGB, the image pickup pixels 33 and the wiring sections 32 are arranged on the display area 21 (the sensor area) in a matrix form. Moreover, the image pickup pixels 33 and the wiring sections 32 for performing an image pickup drive on the image pickup pixels 33 are arranged separately from each other at regular intervals. Such an arrangement allows the sensor area including the image pickup pixels 33 and the wiring sections 32 to be extremely inconspicuous among the display pixels 31RGB, and allows a decline in aperture ratio in the display pixels 31RGB to be minimized. Moreover, when the wiring sections 32 are arranged in a region not contributing to the apertures of the display pixels 31RGB (for example, a region where light is shielded by a black matrix, a reflection region, or the like), a light-receiving circuit is allowed to be arranged without degradation in display quality. In addition, as will be described in detail later, for example, as illustrated in FIG. 4, reset signal lines Reset_1 to Reset_n and read signal lines Read_1 to Read_n are connected to each of the image pickup pixels (light-receiving sections) 33 along a horizontal line direction.

Figure 5:
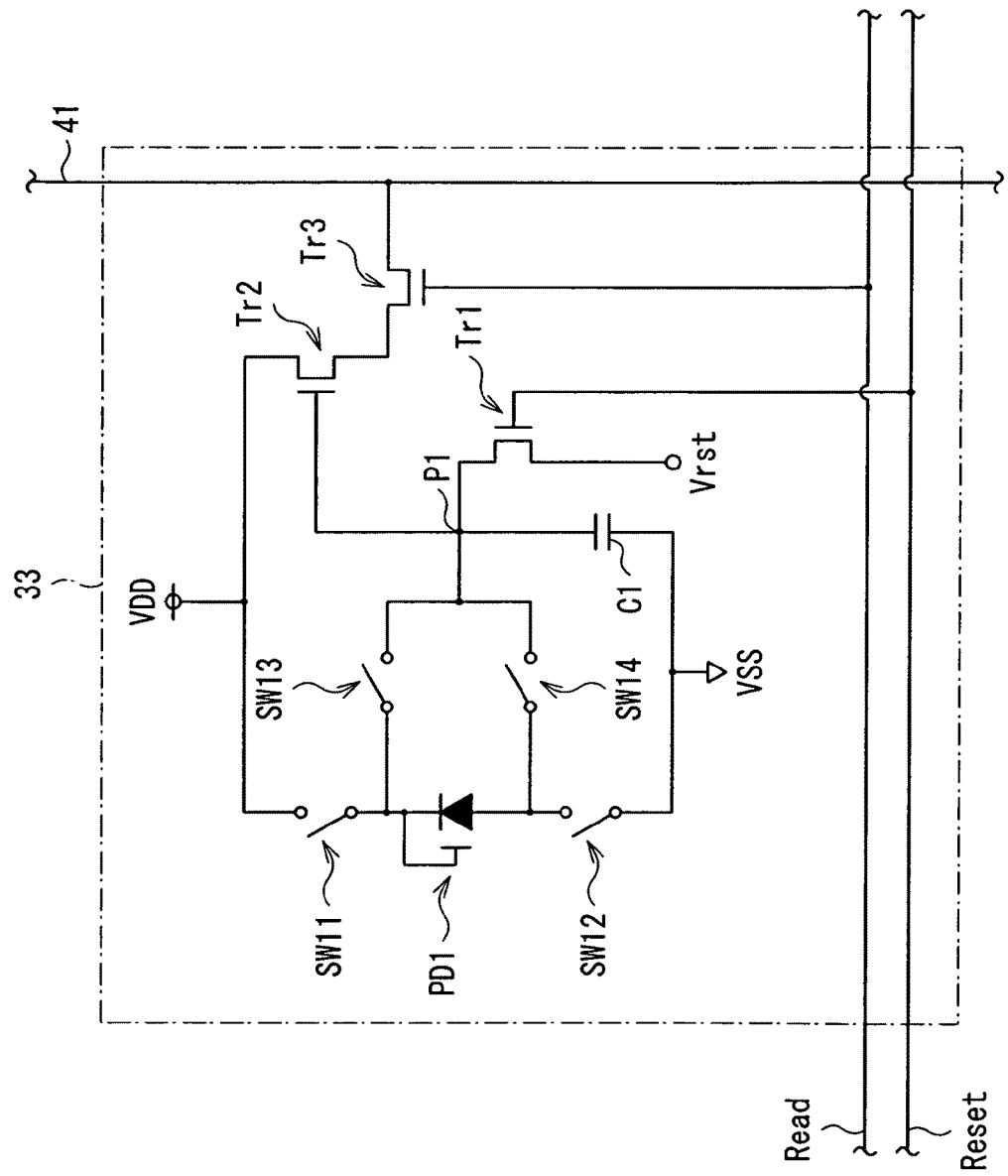
FIG. 5 is a circuit diagram illustrating a configuration example of a light-receiving section according to the embodiment of the invention.

Moreover, for example, as illustrated in FIG. 5, each of the light-receiving sections 33 includes a photoelectric transducer PD1 as a light-receiving element generating an electric charge corresponding to the light amount of received light, a capacitor C1 as a capacitor, four switching element SW11 to SW14 and three transistors Tr1 to Tr3. The photoelectric transducer PD1 generates both of an electric charge for charging and a discharge electric charge for the capacitor C1, and is configured of, for example, a photodiode, a phototransistor or the like. Herein, the photoelectric transducer PD1 is configured of a PIN photodiode including an anode (formed in a p-type semiconductor region), a cathode (formed in an n-type semiconductor region) and a gate (for example, formed in an intrinsic semiconductor region), and the same hold true for photoelectric transducers according to modification examples which will be described later. Further, the transistors Tr1 to Tr3 each are configured of a thin film transistor (TFT) or the like. In the light-receiving section 33, one end of the switching element SW11 is connected to a power source VDD, and the other end of the switching element SW11 is connected to one end of the switching element SW13 and the cathode and the gate of the photoelectric transducer PD1. Moreover, one end of the switching element SW12 is connected to a ground VSS, and the other end of the switching element SW12 is connected to one end of the switching element SW14 and the anode of the photoelectric transducer PD1. Further, the other end of the switching element SW13 and the other end of the switching element SW14 are connected to one end of the capacitor C1, a drain of the transistor Tr1 and a gate of the transistor Tr2 through a connection point P1. The other end of the capacitor C1 is connected to the ground VSS. Moreover, a gate of the transistor Tr1 is connected to a reset signal line Reset, and a source of the transistor Tr1 is connected to a reset power source Vrst. Further, a source of the transistor Tr2 is connected to the power source VDD, and a drain of the transistor Tr2 is connected to a drain of the transistor Tr3. Moreover, a gate of the transistor Tr3 is connected to a read signal line Read, and a source of the transistor Tr3 is connected to a readout line 41. Moreover, a charge circuit allowing an electric charge for charging to be accumulated (charged) in the capacitor C1 is configured of the switching elements SW11 and SW14 functioning as switching elements for charging. Further, a discharge circuit allowing an electric charge for discharging to be released (discharged) from the capacitor C1 is configured of the switching elements SW12 and SW13 functioning as switching elements for discharging. By such a configuration, as will be described in detail later, the switching elements SW11 to SW14 in the above-described charge circuit and the above-described discharge circuit are driven to pick up an image so that the electric charge for charging generated in the photoelectric transducer PD1 is accumulated in the capacitor C1 through the switching elements SW11 and SW14 for charging, and the electric charge for discharging generated in the photoelectric transducer PD1 is released from the capacitor C1 through the switching elements SW12 and SW13 for discharging, thereby an image pickup signal is obtained from each of the light-receiving sections (the image pickup pixels) 33. In addition, the voltage of the above-described reset power source Vrst (a reset voltage allowing whole of the electric charge accumulated in the capacitor C1 in each of the light-receiving sections 33 to be released) is settable to an arbitrary voltage between a power source voltage VDD and a ground voltage VSS.

Figure 6:
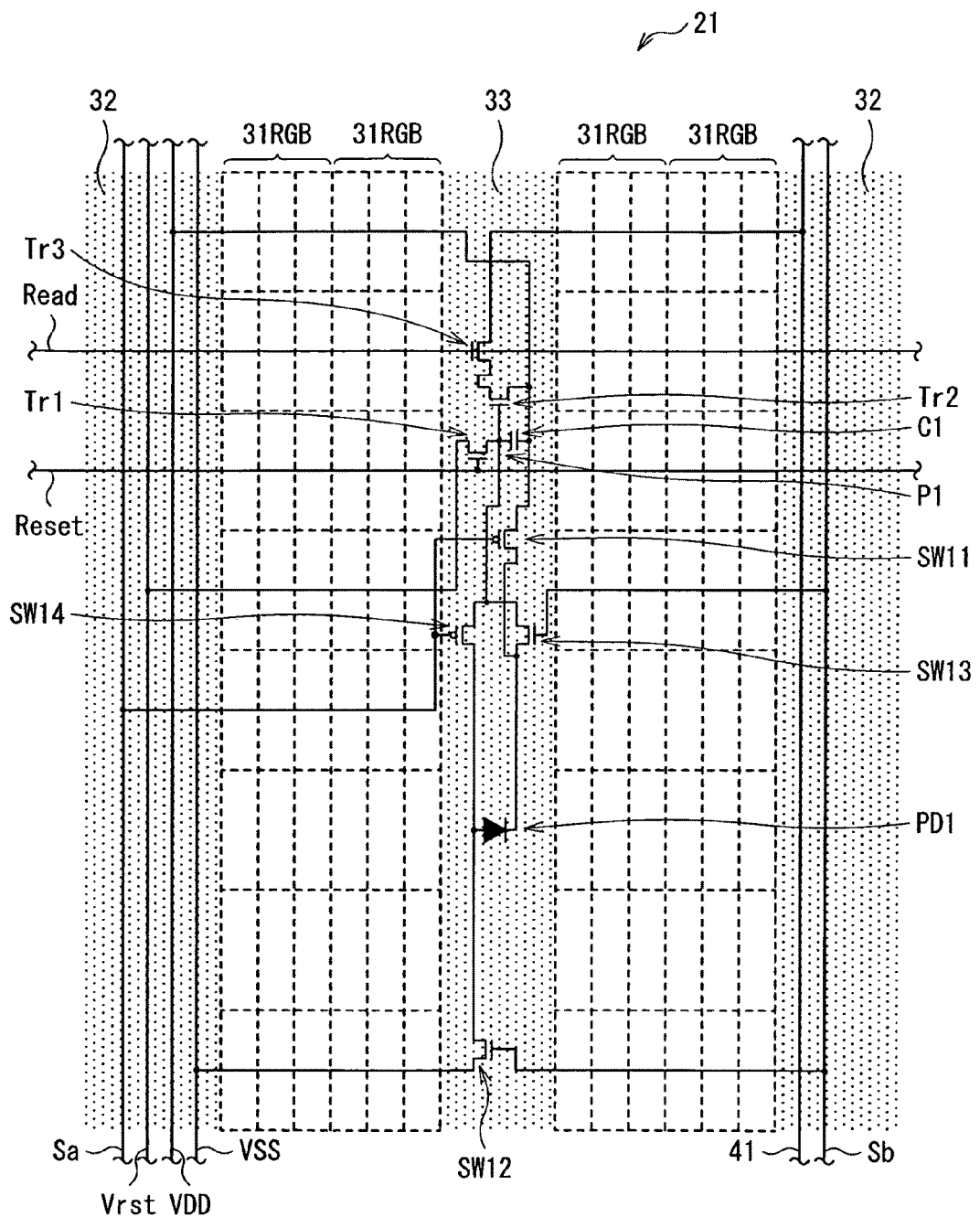
FIG. 6 is a schematic view illustrating details of the connection relationship between the light-receiving sections and the signal lines in the pixel arrangement illustrated in FIG. 3.

In addition, a circuit part in each of the light-receiving sections (the image pickup pixels) 33 described in FIG. 5, the display pixels 31RGB, the reset signal line Reset, the read signal line Read, the readout line 41, a power source line VDD, a ground line VSS and a reset voltage line Vrst, an SW control line Sa to which an SW control signal for controlling switching of the switching signals SW11 and S14 is supplied, and an SW control line Sb to which an SW control signal for controlling switching of the switching signals SW12 and S13 is supplied are arranged in the display area (the sensor area) 21, for example, as illustrated in FIG. 6.

Next, operation of the display-and-image-pickup device of the embodiment will be described in detail below.

First, an operation of displaying an image and an operation of picking up an image of an object by the display-and-image-pickup device will be briefly described below.

In the display-and-image-pickup device, a drive signal for display is produced in the display drive circuit 12 based on display data supplied from the application program execution section 11, and a line-sequential display drive is performed on the I/O display panel 20 in response to the drive signal to display an image. Moreover, at this time, the backlight 15 is also driven by the display drive circuit 12 to perform a lighting-on/off operation in synchronization with the I/O display panel 20.

Here, in the case where there is an object (for example, a fingertip or the like) which touches or comes in proximity to the I/O display panel 20, an image of the object is picked up in each of the image pickup pixels 33 in the I/O display panel 20 by a line-sequential light reception drive by the light reception drive circuit 13, and an image pickup signal from each of the image pickup pixels 33 is supplied to the light reception drive circuit 13. In the light reception drive circuit 13, the image pickup signals from the image pickup pixels 33 for one frame are accumulated, and are outputted to the image processing section 14 as a picked-up image.

Then, in the image processing section 14, predetermined image processing (arithmetic processing) which will be described later is performed based on the picked-up image so as to obtain object information about the object touching or in proximity to the I/O display panel 20 (position coordinate data, data about the shape or size of the object, or the like).

Figure 7:
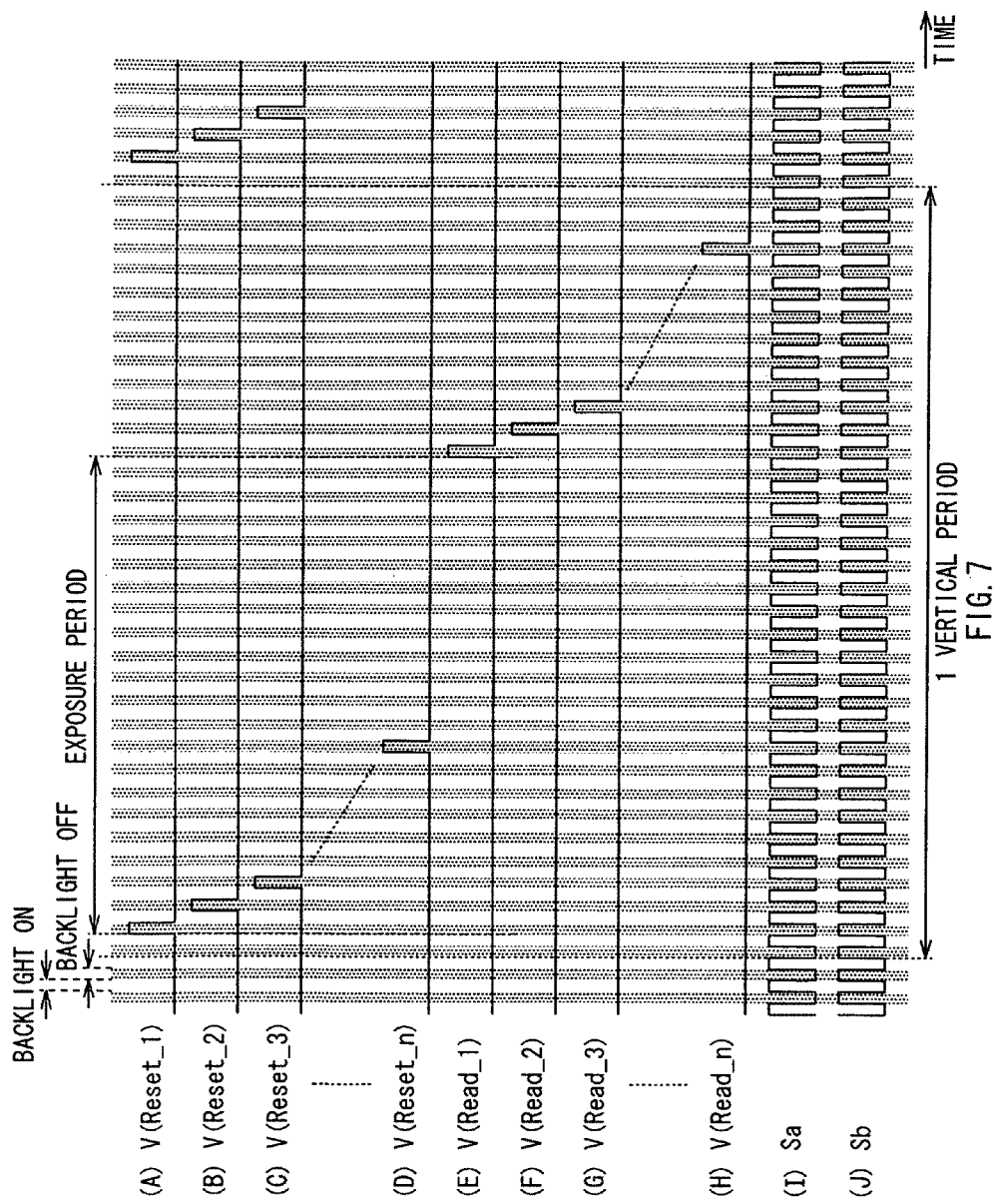
FIG. 7 is a timing waveform chart illustrating an example of an image pickup operation in the display-and-image-pickup device according to the embodiment.
Figure 8:
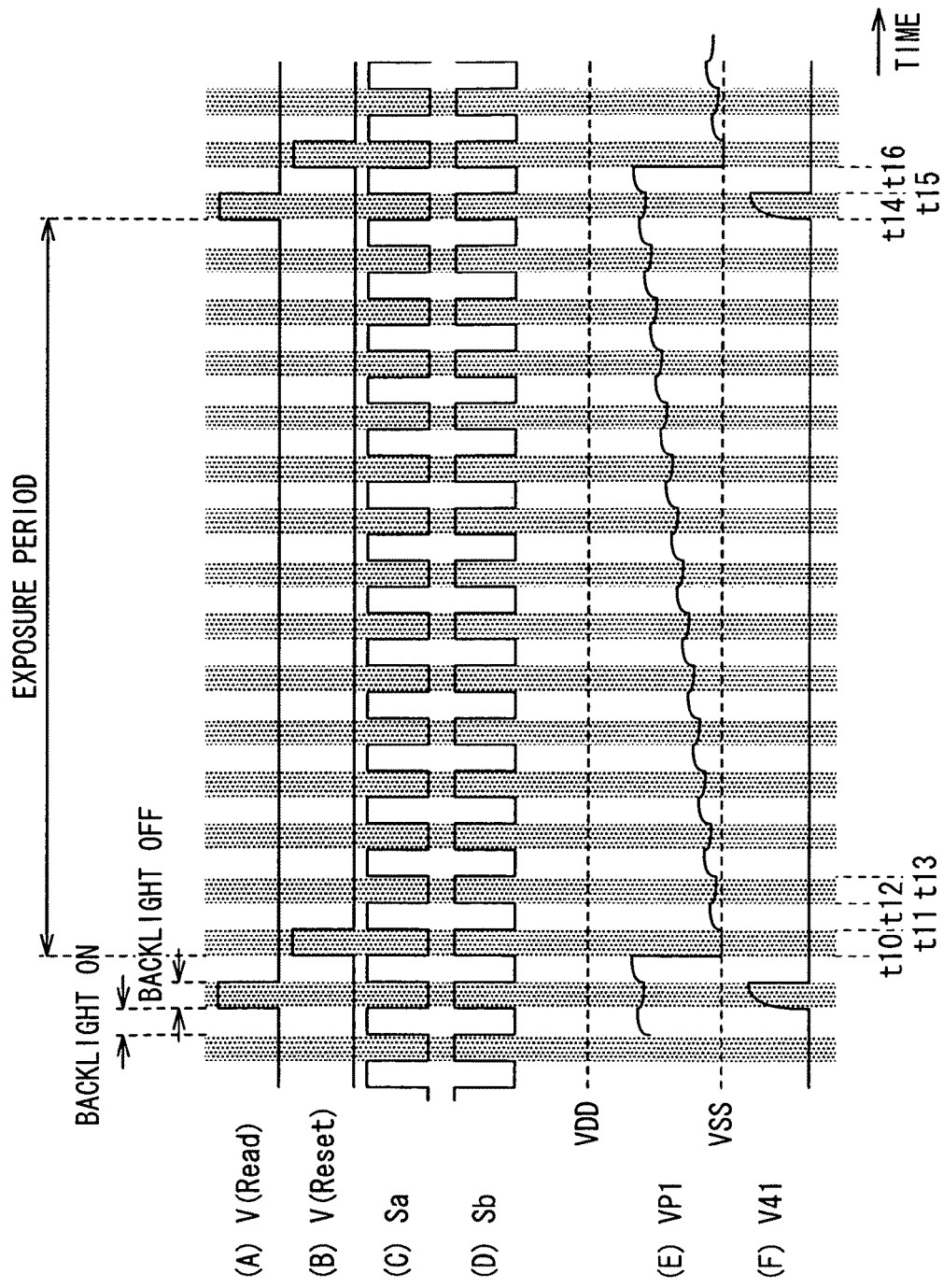
FIG. 8 is a timing waveform chart for describing details of the image pickup operation illustrated in FIG. 7.
Figure 9:
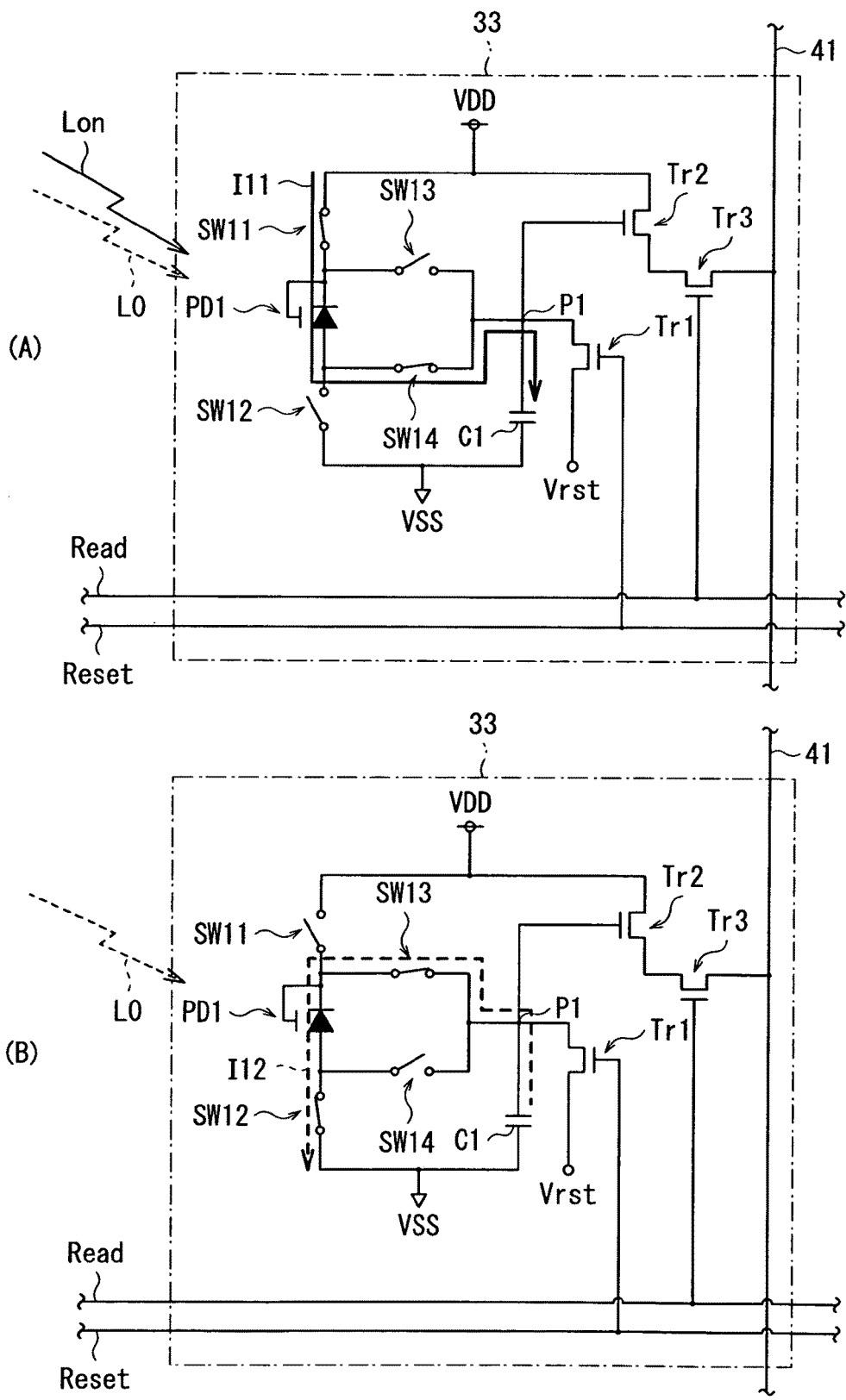
FIG. 9 is a circuit diagram for describing a charge operation and a discharge operation during the image pickup operation illustrated in FIGS. 7 and 8.

Next, details of an image pickup operation of the embodiment, and a process (a fingertip extraction process) of extracting an object (a proximity object such as a fingertip) which touches or comes in proximity to the I/O display panel 20 by the image processing section 14 will be described below referring to FIGS. 7 to 14. Here, FIG. 7 illustrates an example of the image pickup operation of the embodiment with a timing waveform chart, and (A) to (D) indicate reset signal voltages V(Reset_1), V(Reset_2), V(Reset_3) and V(Reset_n), respectively, and (E) to (H) indicate read signal voltages V(Read_1), V(Read_2), V(Read_3) and V(Read_n), respectively, and (I) indicates a control signal (the SW control signal Sa) for the switching elements SW11 and SW14, and (J) indicates a control signal (the SW control signal Sb) for the switching elements SW12 and SW13. Moreover, FIG. 8 illustrates details (an image pickup operation in one light-receiving element 31) of the image pickup operation illustrated in FIG. 7 with a timing waveform chart, and (A) indicates a reset signal voltage V(Reset), and (B) indicates a read signal voltage V(Read), and (C) and (D) indicate the SW control signals Sa and Sb, respectively, and (E) indicates a potential (accumulation potential) VP1 at the connection point P1, and (F) indicates a potential (readout voltage) V41 of the readout line 41. Further, FIGS. 11 to 14 are plots and a schematic view for describing an image pickup operation in related art according to a comparative example.

First, for example, as illustrated in FIG. 7, the reset signal voltages V(Reset_1), V(Reset_2), V(Reset_3) and V(Reset_n) and the read signal voltages V(Read_1), V(Read_2), V(Read_3) and V(Read_n) are brought into an H (high) state by a line-sequential operation. In the light-receiving sections 33 on each horizontal line, as will be described in detail later, a period from when the read signal voltage V(Read) is brought into the H state to when the read signal voltage V(Read) is brought into the H state is an exposure period. Moreover, the backlight 15 alternately changes between an ON state and an OFF state in synchronization with the line-sequential operations of such a reset signal voltage V(Reset) and such a read signal voltage V(Read), and the SW control signals Sa and Sb are brought into the H (high) state in synchronization with the switching operation between ON/OFF states of the backlight 15, and the switching SW11 to SW14 are brought into an on-state. Further, the SW control signal Sa and the SW control signal Sb are alternately brought into the H state. More specifically, when the backlight 15 is in the ON state, the SW control signal Sa is brought into the H state, and the SW control signal Sb is brought into an L (low) state, and when the backlight 15 is in the OFF state, the SW control signal Sa is brought into the L state, and the SW control signal Sb is brought into the H state.

At this time, the image pickup operation in one light-receiving element 31 is, for example, as illustrated in FIG. 8. That is, first, when the reset signal voltage V(Reset) is brought into the H state at a timing t10, the transistor Tr1 is brought into the on-state, thereby the potential VP1 (the accumulation potential) at the connection point P1 is reset to the reset voltage Vrst (in this case, Vrst=VSS) which is arbitrarily set.

Next, in a period from a timing t11 to a timing t12, the backlight 15 is brought into the ON state, and the SW control signal Sa and the SW control signal Sb are brought into the H state and the L state, respectively, thereby an operation of accumulating an electric charge for charging in the capacitor C1 (a charge operation) is performed in synchronization with a horizontal period (an ON switching period and an OFF switching period of the backlight 15) during a display drive. More specifically, for example, as illustrated in FIG. 9(A), the switching elements SW11 and SW14 for charging are brought into the on-state, and the switching elements SW12 and SW13 for discharging are brought into the off-state. Thereby, the electric charge for charging is accumulated in the capacitor C1 along a path of a charging current I11 illustrated in the drawing in accordance with the total light amount as a summation of reflected light Lon reflected by the proximity object of illumination light from the backlight 15 and outside light (environment light) L0 so as to cause a rise in the accumulation potential VP1.

Next, in a period from the timing t12 to a timing t13, the backlight 15 is brought into the OFF state, and the SW control signal Sa and the SW control signal Sb are brought into the L state, and the H state, respectively, thereby an operation of releasing the electric charge for discharging from the capacitor C1 (a discharge operation) is performed in synchronization with a horizontal period (the ON/OFF switching operation of the backlight 15) during the display drive. More specifically, for example, as illustrated in FIG. 9(B), the switching elements SW11 and SW14 for charging are brought into the off-state, and the switching elements SW12 and SW13 for discharging are brought into the on-state. Thereby, the electric charge for discharging is released from the capacitor C1 through a path of a discharging current I12 illustrated in the drawing in accordance with the light amount of the outside light (the environment light) L0, and not the reflected light Lon originating from the illumination light, to cause a decline in the accumulation potential VP1.

Then, multiple times of switching between such an operation of accumulating the electric charge for charging and such an operation of releasing the electric charge for discharging are performed until a timing t14 (during the exposure period), and after that, an electric charge accumulated in the capacitor C1 during the switching is read out as an image pickup signal. More specifically, when the read signal voltage V(Read) is brought into the H state at the timing t14, the transistor Tr3 is brought into the on-state, and in a period from a timing t15 to a timing t16, the voltage of the accumulation potential VP1 is read out from the readout line 41. Thus, when the image pickup signal is read out after multiple times of switching between the operation of accumulating the electric charge for charging and the operation of releasing the electric charge for discharging, the exposure period becomes longer, so as illustrated in FIG. 8(E), a signal component (the accumulation potential VP1) of the image pickup signal increases. Moreover, the image pickup signal obtained herein is an analog value, so A/D (analog/digital) conversion is performed on the image pickup signal in the light reception drive circuit 13. In addition, after that, the reset signal voltage V(Reset) is brought into the H state at a timing t16, thereby the same operation from the timing t10 to the timing t16 is repeated.

Figure 10:
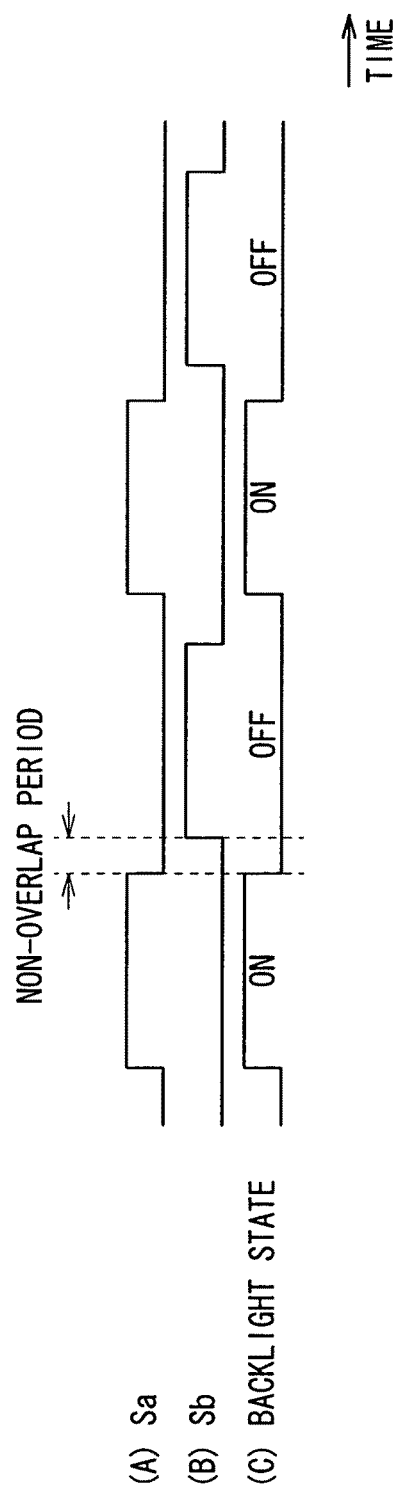
FIG. 10 is a timing waveform chart for describing details of SW control signals illustrated in FIG. 8 and a backlight state.

In addition, more specifically, for example, as illustrated in FIG. 10, a period in which the SW control signal Sa is in the H state and a period in which the SW control signal Sb is in the H state are set so as not to overlap one another (a non-overlap period is set), thereby the generation of a leakage current in the light-receiving section 33 is prevented.

Next, in the image processing section 14, arithmetic processing of determining the centroid of an picked-up image for one frame produced in the light reception drive circuit 13 is performed to determine the touch (proximity) center. Then, a result of the detection of the proximity object is outputted from the image processing section 14 to the application program execution section 11, thereby the fingertip extraction process by the image processing section 14 is completed.

Thus, in the fingertip extraction process of the embodiment, when illumination light is emitted from the backlight 15 to the proximity object by the I/O display panel 20, the electric charge for charging is accumulated in each of the image pickup pixels 33 in accordance with the total light amount as a summation of the reflected light Lon originating from the illumination light and the environment light (the outside light) L0. Moreover, when the above-described illumination light is not emitted, the electric charge for discharging is released from each of the image pickup pixels 33 in accordance with the light amount of the environment light L0. Therefore, the image pickup signal is obtained from each of the image pickup pixels 33. Then, in the image processing section 14, object information including one or more of position, shape and size of the proximity object is obtained through utilizing a picked-up image based on the image pickup signal obtained from each of the image pickup pixels 33. Thereby, a component by the environment light L0 is subtracted in the image pickup signal obtained from each of the image pickup pixels 33, so the object information about the proximity object is obtainable without influence of such environment light L0.

Moreover, the image pickup signal is obtained from each of the image pickup pixels 33 based on the operation of accumulating the electric charge for charging and the operation of releasing the electric charge for discharging, so in the light reception drive circuit 13, a smaller number of necessary frame memories 13A for producing the picked-up image from the image pickup signal than that in related art (for example, as illustrated in FIG. 58, frame memories for two images, that is, an image (an image A) when a backlight is off and an image (an image B) when the backlight is on are necessary) are necessary.

In addition, in the fingertip extraction process, information about a plurality of touching or proximity objects which are placed on the display area 21 of the I/O display panel 20 at one time such as the positions, shapes, sizes or the like of the objects is obtainable.

Figure 11:
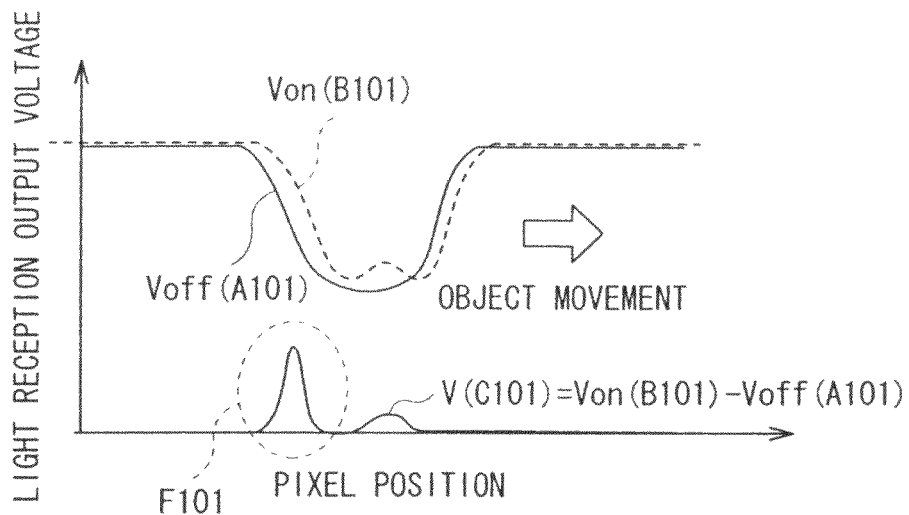
FIG. 11 is a plot for describing an image pickup operation according to a comparative example.
Figure 12:
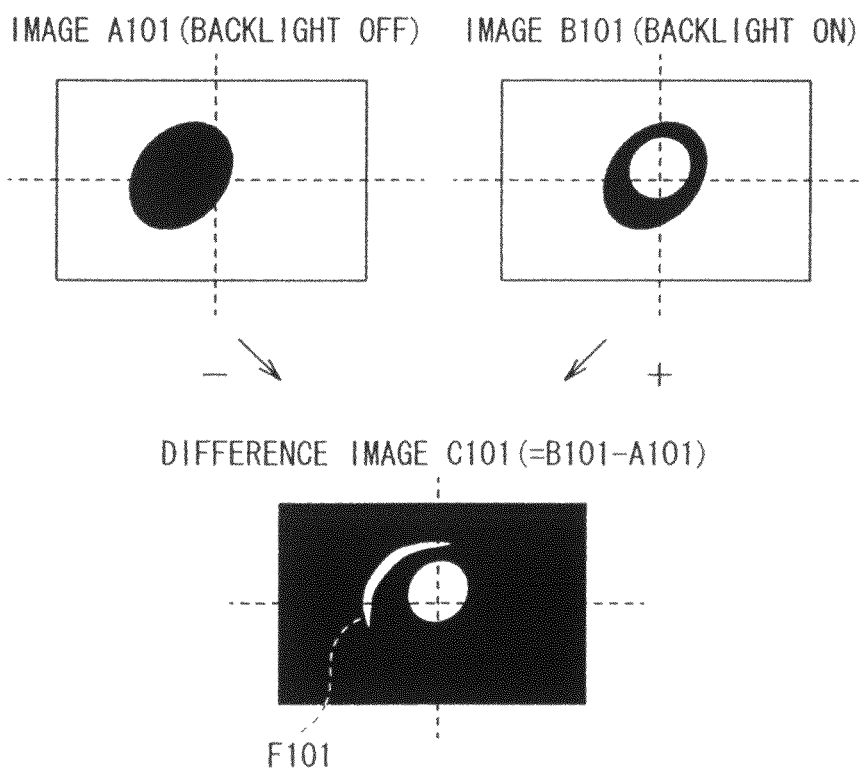
FIG. 12 is a schematic view for describing the image pickup operation illustrated in FIG. 11.
Figure 57:
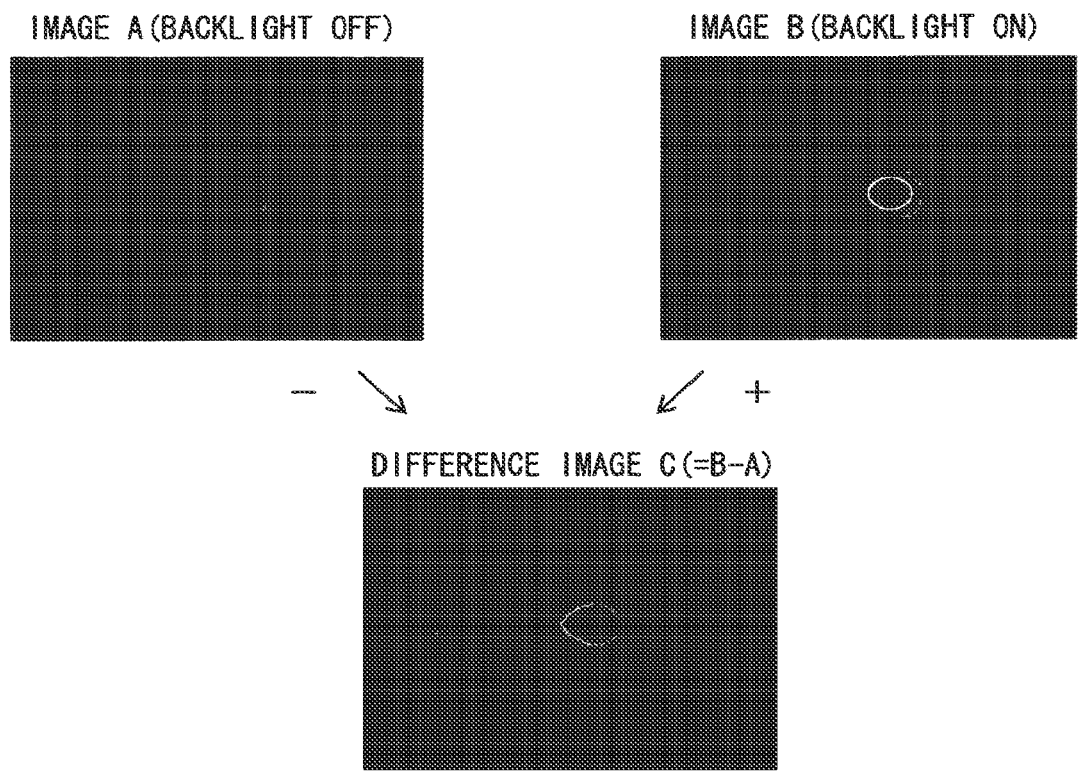
FIG. 57 is photographs for describing the image pickup operation (the difference image fingertip extraction process) by the display-and-image-pickup device in related art.

Moreover, in a comparative example illustrated in FIGS. 11 and 12 (for example, a fingertip extraction process in related art illustrated in FIGS. 57 and 58), as indicated by an arrow in FIG. 11, in the case where the proximity object is moving on the display area 21 of the I/O display panel 20, the following issue occurs. That is, under actual use conditions, for example, as illustrated in FIG. 12, there is a time difference between an image A101 obtained when the backlight is in the off-state and an image B101 obtained when the backlight is in the on-state. Therefore, for example, as illustrated in FIG. 11, in the case where the proximity object is moving at high speed on the I/O display panel 20, or the like, the time difference causes a difference in the position of a part corresponding to the proximity object between a light reception output signal Voff(A101) in the image A101 and a light reception output signal Von(B101) in the image B101. Then, due to such a position, in a difference image C101 (=B101−A101) between these two images A101 and B101 and a light reception detection signal V(C101) (=Von(B101)−Voff(A101)), as illustrated in FIGS. 11 and 12, in addition to an original signal corresponding to the position of the proximity object, a spurious signal F101 is generated at another position. Therefore, in the fingertip extraction process according to the comparative example, in some cases, it is difficult to stably detect the proximity object due to the presence of such a spurious signal F101. In addition, when the proximity object moves quickly, an area where the spurious signal is generated tends to increase, and the stronger the outside light, the stronger the spurious signal tends to be.

On the other hand, in the embodiment, as described above, in the case where, for example, at least the proximity object is moving on the I/O display panel 20, or the like, the image pickup drive is performed on each of the image pickup pixels 33 so that the electric charge for charging is accumulated, and the electric charge for discharging is released, thereby the image pickup signal is obtained from each of the image pickup pixels 33, and object information about the proximity object is obtained through utilizing the picked-up image based on such an image pickup signal. Therefore, for example, when the period of switching between the ON/OFF states of the backlight 15 is set to be extremely short, even if the proximity object is moving on the display area 21 of the I/O display panel 20 during such a period of switching, the moving distance of the proximity object is extremely short, so the generation of the spurious signal is minimized (or prevented).

Figure 13:
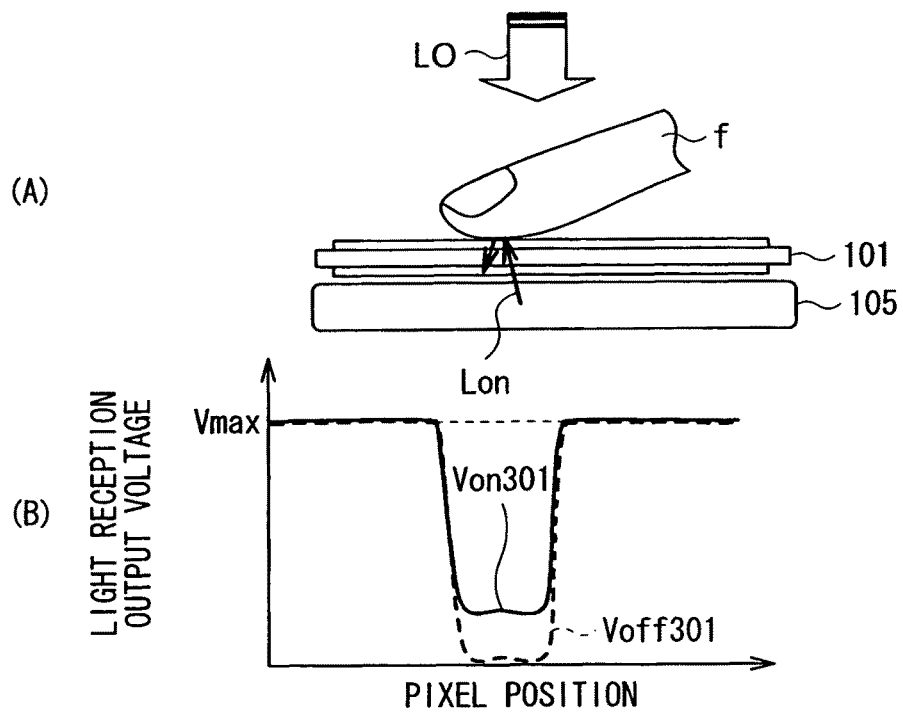
FIG. 13 is another plot for describing the image pickup operation according to the comparative example.
Figure 14:
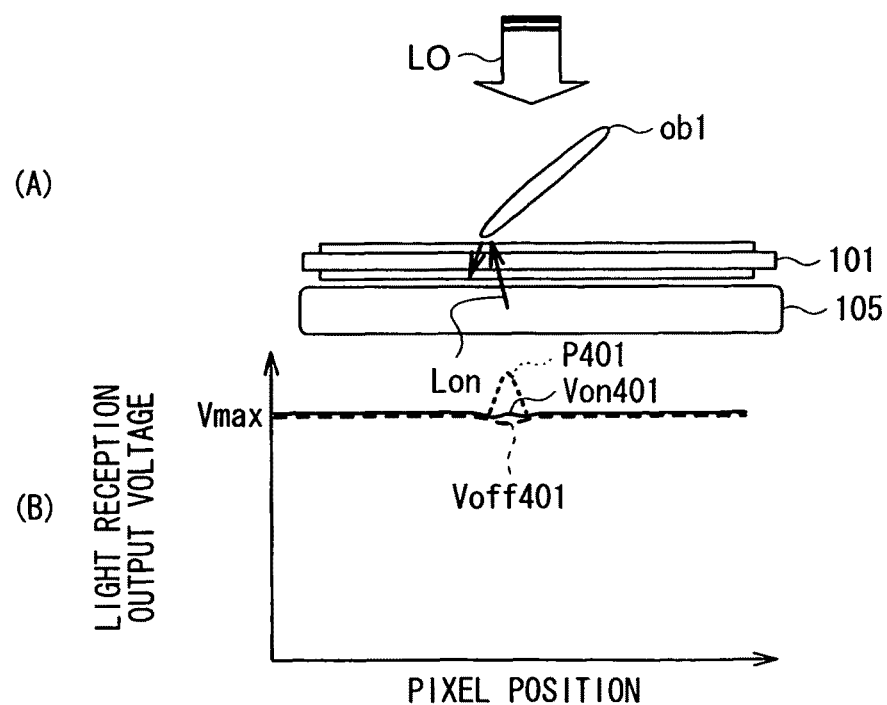
FIG. 14 is another plot for describing the image pickup operation according to the comparative example.

Moreover, in a comparative example illustrated in FIGS. 13 and 14 (for example, the fingertip extraction process in related art illustrated in FIGS. 57 and 58), the following issue may occur. That is, in each image pickup pixel in the actual I/O display panel 20, the accumulation capacity for light is limited. Here, for example, as illustrated in FIGS. 13(A) and (B), when the light amount of the outside light L0 is large, and an electric charge larger than the accumulation capacity flows, in the case where the proximity object is a finger f or the like, as indicated by light reception output signals Von301 and Voff301 in the drawings, the light reception output signals Von301 and Voff301 do not exceed the accumulation capacity in a part shadowed by the finger f, or the like, so the detection of the proximity object is allowed. On the other hand, as illustrated in FIGS. 14(A) and (B), in the case where the proximity object is a very thin object such as a pen ob1, the case where the proximity object has a distance from the I/O display panel 20, or the like, as indicated by light reception output signals Von401 and Voff401 and a reference numeral P401, in some cases, in a part shadowed by the pen ob1 or the like, the light reception output signals Von401 and Voff401 exceed the accumulation capacity and reach a high level. In such a case, a difference signal between the light reception output signals Von401 and Voff401 exceeds the accumulation capacity of the image pickup pixel, thereby the proximity object is not allowed to be detected by using a difference result.

On the other hand, in the embodiment, irrespective of an exposure time, the component of the outside light L0 is invariably removed, so under any outside light condition, the limited accumulation capacity is allowed to be prevented from being filled with only the component of the outside light L0 (depending on the period of switching between the ON/OFF states of the backlight 15, a capacity accumulated by one charge operation and one discharge operation is determined).

As described above, in the embodiment, when illumination light from the backlight 15 is emitted to the proximity object from the I/O display panel 20, the electric charge for charging is accumulated in each image pickup pixel 33 in accordance with the total light amount as a summation of the reflected light Lon originating from the illumination light and the environment light (outside light) L0, and when the above-described illumination light is not emitted, the electric charge for discharging is released from each image pickup pixel 33 in accordance with the light amount of the environment light L0, thereby the image pickup signal is obtained from each image pickup pixel 33, so in the image pickup signal obtained from each image pickup pixel 33, the component by the environment light L0 is subtracted, so the object information about the proximity object is obtainable without influence of such environment light L0. Moreover, the image pickup signal is obtained from each image pickup pixel 33 based on the operation of accumulating the electric charge for charging and the operation of releasing the electric charge for discharging, so in the light reception drive circuit 13, a smaller number of necessary frame memories 13A for producing a picked-up image from the image pickup signal than that in related art are necessary (a frame memory for difference detection is not necessary). Therefore, the object is stably detectable irrespective of use conditions while reducing manufacturing costs.

More specifically, in each image pickup pixel (each light-receiving section) 33, the photoelectric transducer PD1 generates both of the electric charge for charging and the electric charge for discharging, and the electric charge for charging generated in the photoelectric transducer PD1 is accumulated in the capacitor C1 through the switching elements SW11 and SW14 for charging, and the electric charge for discharging generated in the photoelectric transducer PD1 is released from the capacitor C1 through the switching elements SW12 and SW13 for discharging, so the above-described effects are obtainable.

Moreover, the operation of accumulating the electric charge for charging (charge operation) and the operation of releasing the discharge electric charge (discharge operation) each are in synchronization with the horizontal period during the display drive, so coupling noises are allowed to be reduced.

Further, the object information is obtained based on the image pickup signals obtained after multiple times of switching between the operation of accumulating the electric charge for charging and the operation of releasing the electric charge for discharging, so the exposure period is allowed to be longer, and an improvement in the detection sensitivity is allowed by increasing the signal component (the accumulation potential VP1) of the image pickup signal, and the exposure time is freely settable, so an increase in an S/N ratio is allowed.

Moreover, for example, when the period of switching between the ON/OFF states of the backlight 15 is set to be extremely short, even in the case where the proximity object is moving on the display area 21 of the I/O display panel 20, the generation of the spurious signal is allowed to be minimized (or prevented), thereby a further improvement in the detection sensitivity is allowed. Further, difference processing is performed in synchronization with a rapid period of switching between the ON/OFF states of the backlight 15, so the moving object is easily detectable.

Further, in the capacitor C1 in each image pickup pixel 33, only the electric charge by the reflected light Lon is accumulated, so at the time of A/D conversion on the image pickup signal, it is not necessary to set an unnecessary range for the outside light L0 or the like (the bit length (word length) of an A/D converter is effectively utilizable), and an improvement in use efficiency is allowed (an improvement in the S/N ratio is allowed).

In addition, a dark current component resulting from a temperature change is removable by the image pickup drive by the embodiment.

Moreover, at the time of reading out the image pickup signal, in related art, the moving object is followed more precisely by reading out the image pickup signal at high speed, but on the other hand, in the embodiment, the readout speed and the following capability for the moving object may be completely independent of each other. Therefore, the exposure time is freely settable, so a demand for light reception sensitivity is allowed to be more moderate than that in related art, and the readout speed is allowed to be set slower.

Further, in the light-receiving section 33 of the embodiment, when the backlight 15 is brought into the OFF state, and only the operation of accumulating the electric charge for charging is performed, shadow detection using the outside light L0 is allowed to be performed.

Some modification examples of the invention will be described below. In addition, like components are denoted by like numerals as of the above-described embodiment and will not be further described.

Modification Example 1

Figure 15:
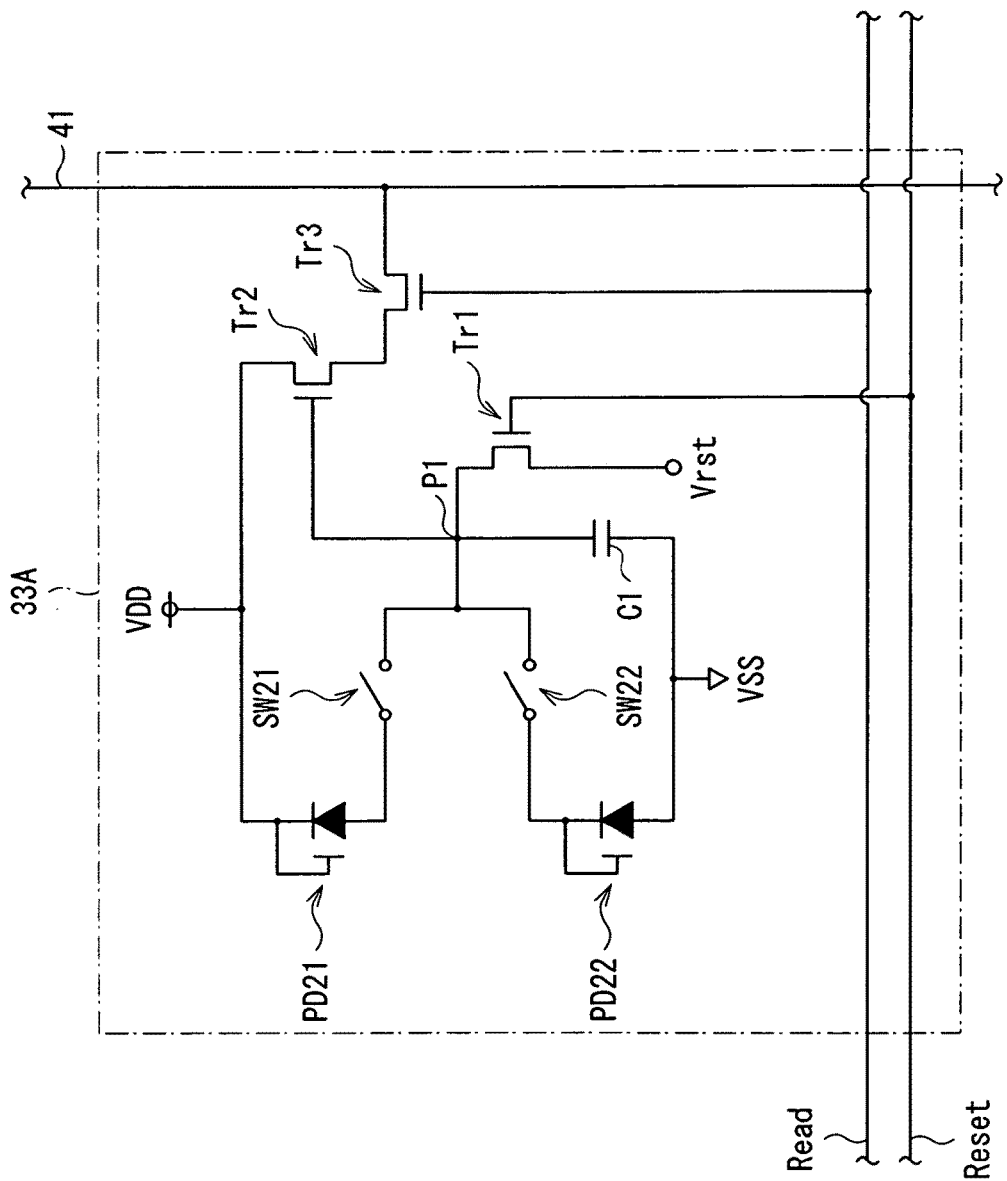
FIG. 15 is a circuit diagram illustrating a configuration example of a light-receiving section according to Modification Example 1 of the invention.
Figure 16:
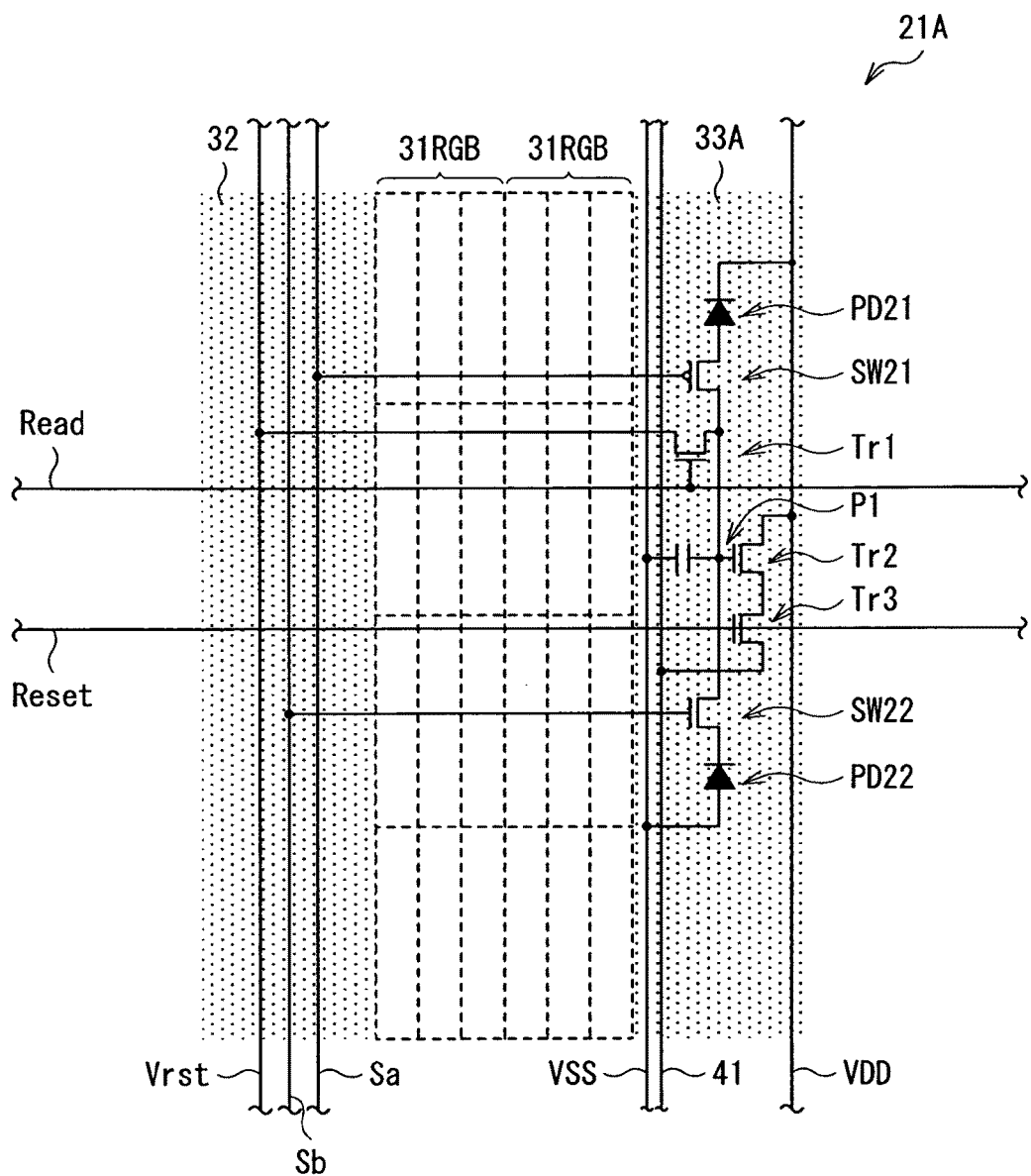
FIG. 16 is a schematic view illustrating details of a connection relationship between light-receiving sections and signal lines in a display area (a sensor area) according to Modification Example 1.

FIG. 15 illustrates a circuit configuration of a light-receiving section (a light-receiving section 33A) according to Modification Example 1. The light-receiving section (image pickup pixel) 33A is distinguished from the light-receiving section 33 described in the above-described embodiment by the fact that the light-receiving section 33A includes two photoelectric transducers PD21 and PD22 and two switching elements SW21 and SW22. More specifically, a cathode and a gate of the photoelectric transducer PD21 are connected to the power source VDD, and an anode of the photoelectric transducer PD21 is connected to one end of the switching element SW21. Moreover, an anode of the photoelectric transducer PD22 is connected to the ground VSS, and a cathode and a gate of the photoelectric transducer PD22 are connected to one end of the switching element SW22. Further, the other end of the switching element SW21 and the other end of the switching element SW22 are connected to the connection point P1. Moreover, as in the case of the above-described embodiment, for example, as illustrated in FIG. 16, the light-receiving section 33A is arranged so that the image pickup pixel 33A and the wiring section 32 for driving the image pickup pixel 33A to pick up an image are separated from each other in a display area (a sensor area) 21A. In addition, any other circuit configuration is the same as that of the light-receiving section 33, and will not be further described.

Figure 17:
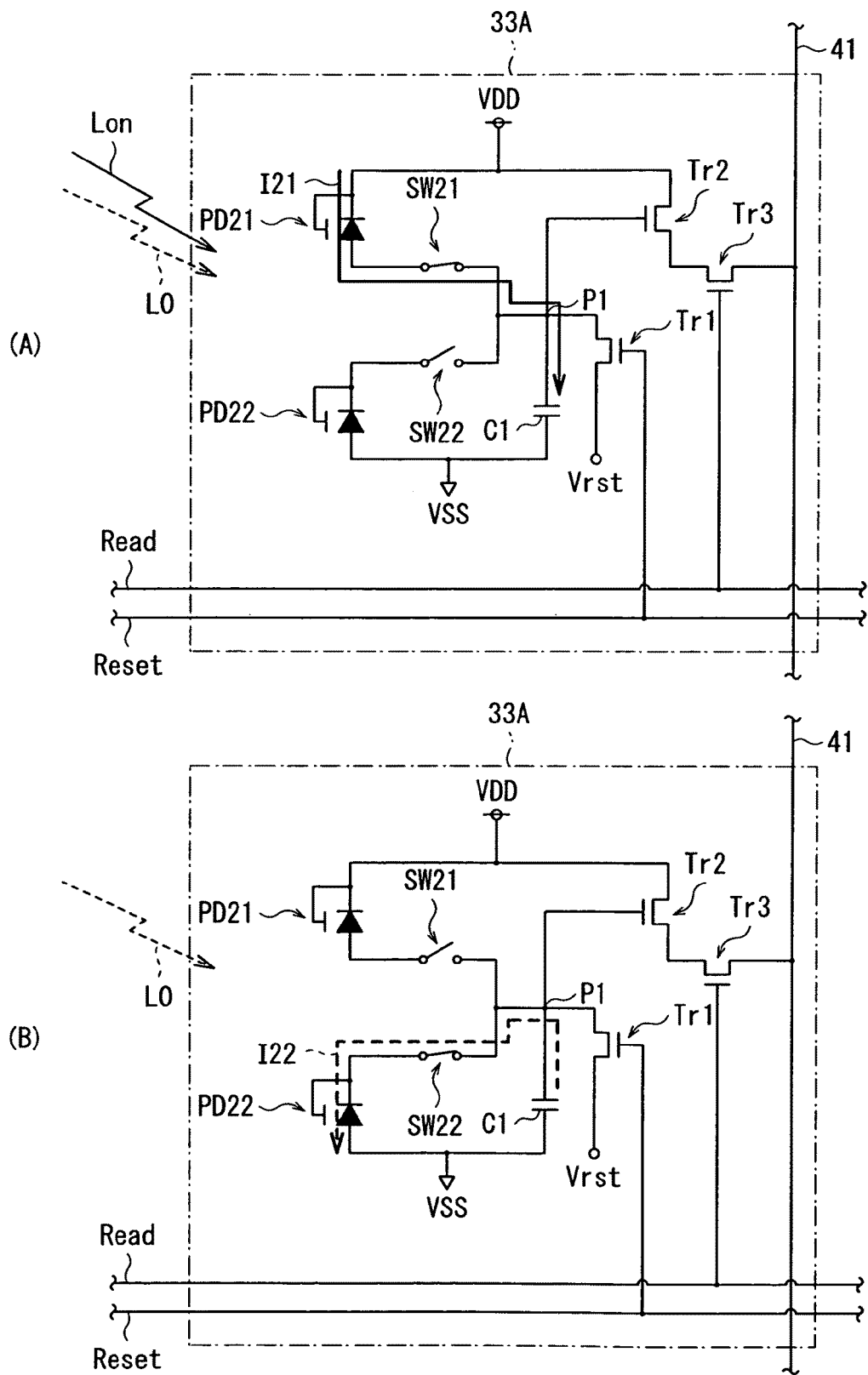
FIG. 17 is a circuit diagram for describing a charge operation and a discharge operation during an image pickup operation according to Modification Example 1.

Moreover, in the light-receiving section 33A, the photoelectric transducer PD21 functions as a photoelectric transducer for generating an electric charge for charging, and the photoelectric transducer PD22 functions as a photoelectric transducer for generating an electric charge for discharging. Further, the switching element SW21 functions as a switching element for charging, and the switching element SW22 functions as a switching element for discharging. Thereby, an image pickup drive is performed so that, for example, as illustrated in FIG. 17(A), the electric charge for charging (in accordance with the total light amount as a summation of the reflected light Lon and the outside light L0) generated in the photoelectric transducer PD21 is accumulated in the capacitor C1 through the switching element SW21 for charging, and, for example, as illustrated in FIG. 17(B), the electric charge for discharging (in accordance with the light amount of the outside light L0) generated in the photoelectric transducer PD22 is released from the capacitor C1 through the switching element SW22 for discharging.

Thus, also in the modification example, the same fingertip extraction process is performed by the same image pickup operation as that in the above-described embodiment. Thereby, also in the modification example, the object is stably detectable irrespective of use conditions while reducing manufacturing costs.

Moreover, one of the cathode of the photoelectric transducer PD21 and the anode of the photoelectric transducer PD22 is constantly connected to the power source VDD or the ground VSS, so coupling noises which occur during on/off operations of the switching elements SW21 and SW22 is allowed to be reduced.

Further, only two switching elements are necessary in the light-receiving section 33A (in the light-receiving section 33 of the above-described embodiment, four switching elements SW11 to SW14 are necessary), so wiring capacities in signal lines of the SW control signals Sa and Sb are reduced to allow a reduction in power consumption.

Figure 18:
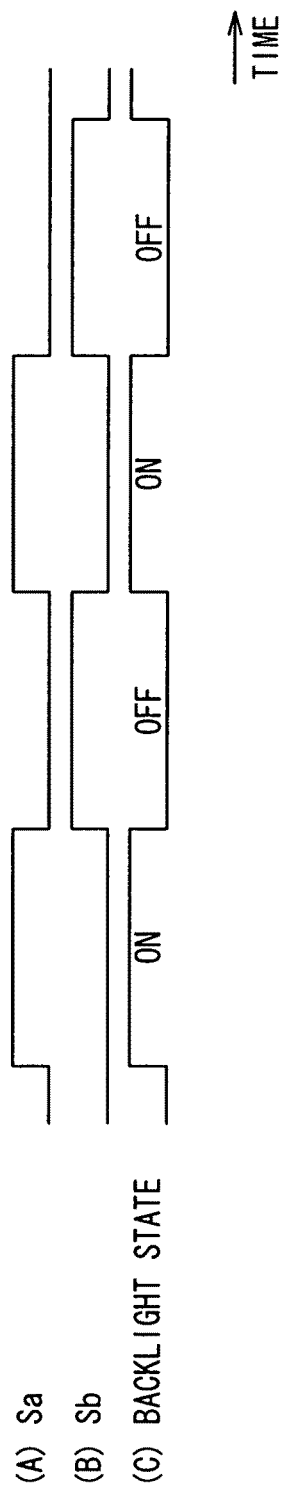
FIG. 18 is a timing waveform chart for describing SW control signals and a backlight state during the image pickup operation according to Modification Example 1.
Figure 19:
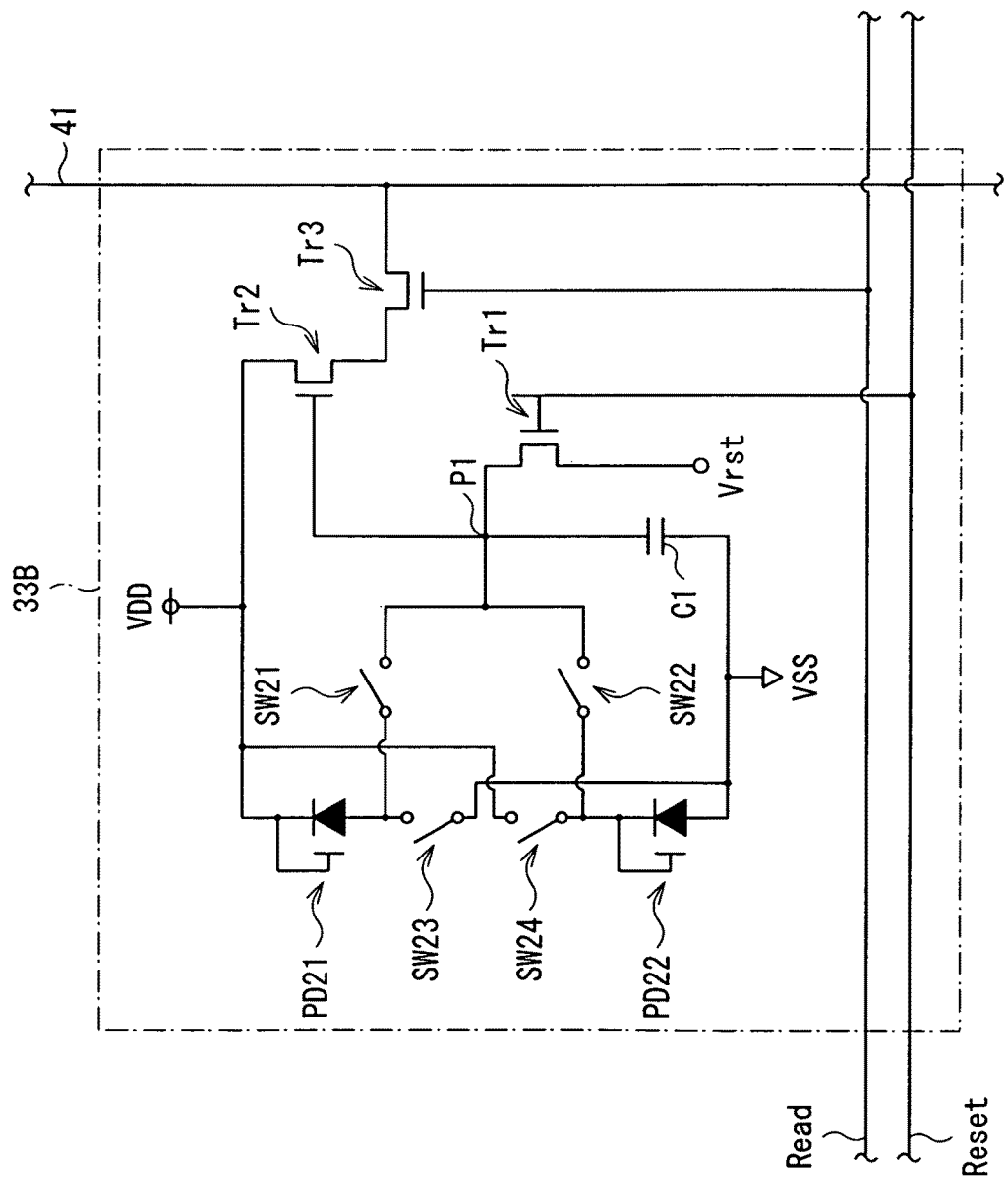
FIG. 19 is a circuit diagram illustrating a configuration example of another light-receiving section according to Modification Example 1 of the invention.

Moreover, in the light-receiving section 33A of the modification example, unlike the light-receiving section 33 of the above-described embodiment, a path for the generation of a leakage current is not present, so, for example, as illustrated in FIG. 18, a period in which the SW control signal Sa is in the H state and a period in which the SW control signal Sb is in the H state may overlap one another (a non-overlap period is not set).

In addition, in the modification example, for example, like a light-receiving section (an image pickup pixel) 33B, switching elements SW23 and SW24 for removing an electric charge accumulated in a parasitic capacity during the off-states of the switching elements SW21 and SW22 are preferably arranged. More specifically, the switching element SW23 is arranged between the anode of the photoelectric transducer PD21 and the one end of the switching element SW21, and the ground VSS. Moreover, the switching element SW24 is arranged between the cathode of the photoelectric transducer PD22 and the one end of the switching element SW22, and the power source VDD.

Modification Example 2

Figure 20:
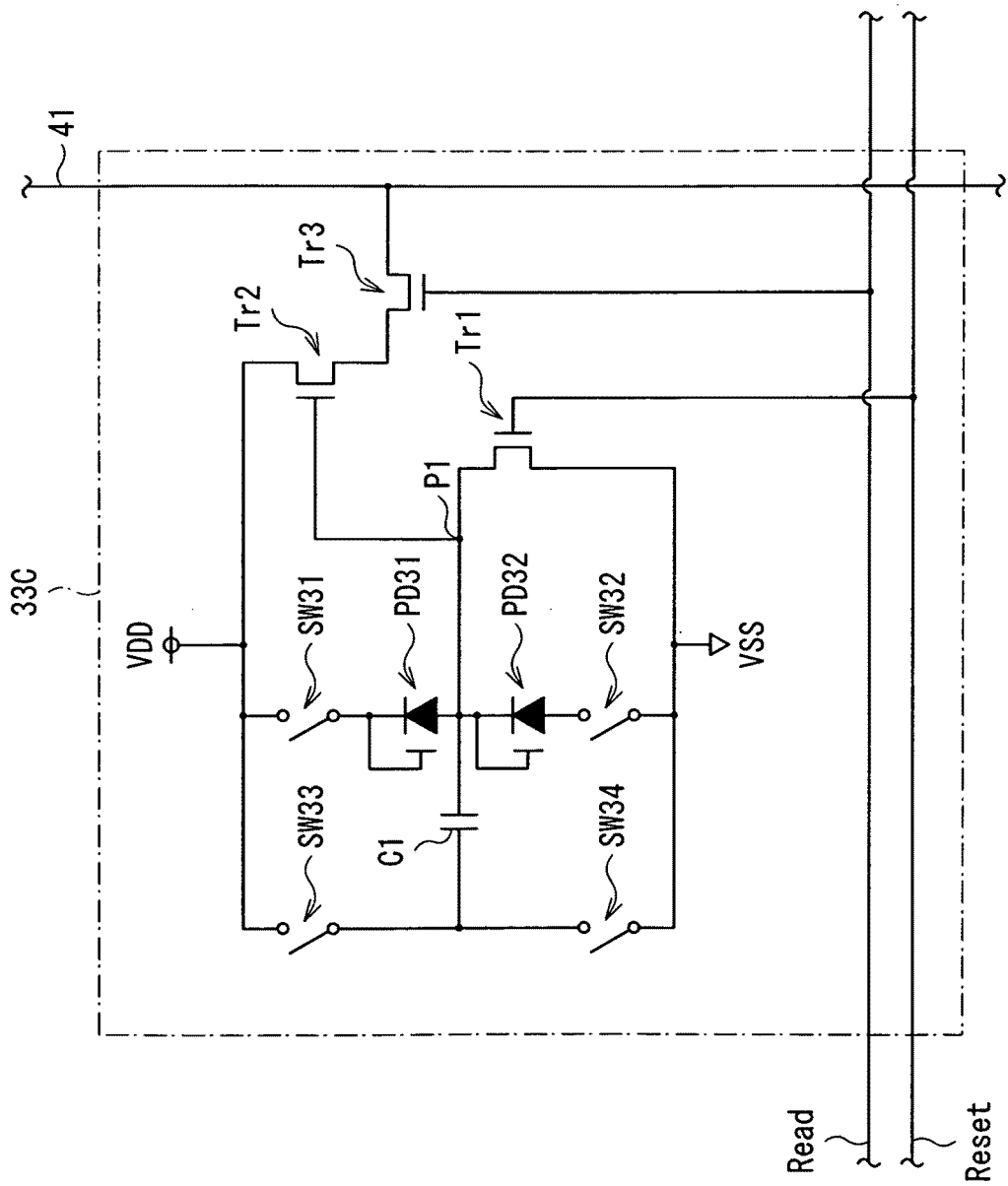
FIG. 20 is a circuit diagram illustrating a configuration example of a light-receiving section according to Modification Example 2 of the invention.

FIG. 20 illustrates a circuit configuration of a light-receiving section (a light-receiving section 33C) according to Modification Example 2. The light-receiving section (image pickup pixel) 33C includes two photoelectric transducers PD31 and PD32 and four switching elements SW31 to SW34. More specifically, one end of the switching element SW31 and one end of the switching element SW33 are connected to the power source VDD, and the other end of the switching element SW31 is connected to a cathode and a gate of the photoelectric transducer PD31, and the other end of the switching element SW33 is connected to one end of the capacitor C1 and one end of the switching element SW34. Moreover, an anode of the photoelectric transducer PD31 is connected to the other end of the capacitor C1, a cathode and a gate of the photoelectric transducer PD32 and the connection point P1. Further, an anode of the photoelectric transducer PD32 is connected to one end of the switching element SW32. Moreover, the other end of the switching element SW32 and the other end of the switching element SW34 are connected to the ground VSS. In addition, any other circuit configuration is the same as those in the light-receiving sections 33 and 33A, and will not be further described.

Figure 21:
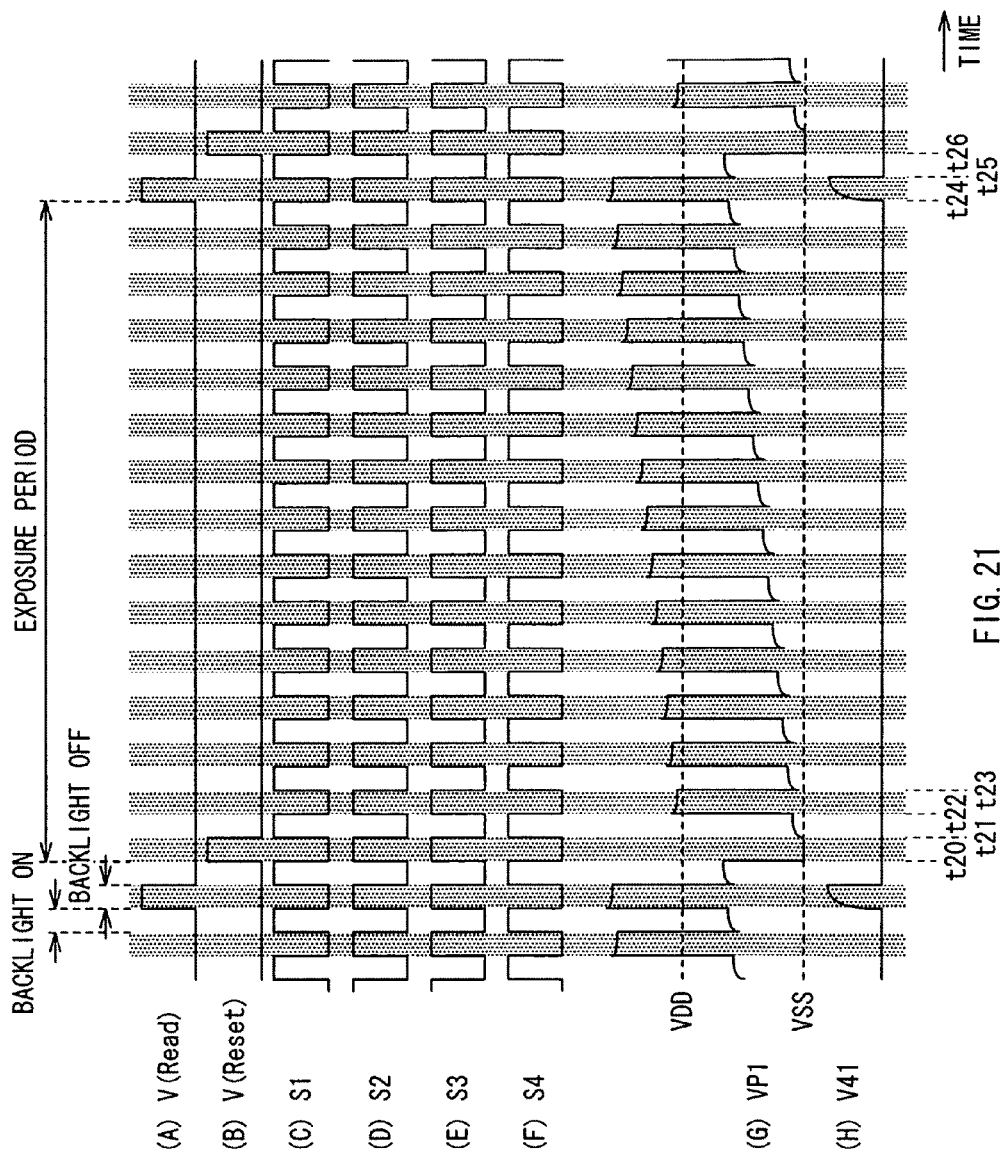
FIG. 21 is a timing waveform chart for describing an image pickup operation according to Modification Example 2.
Figure 22:
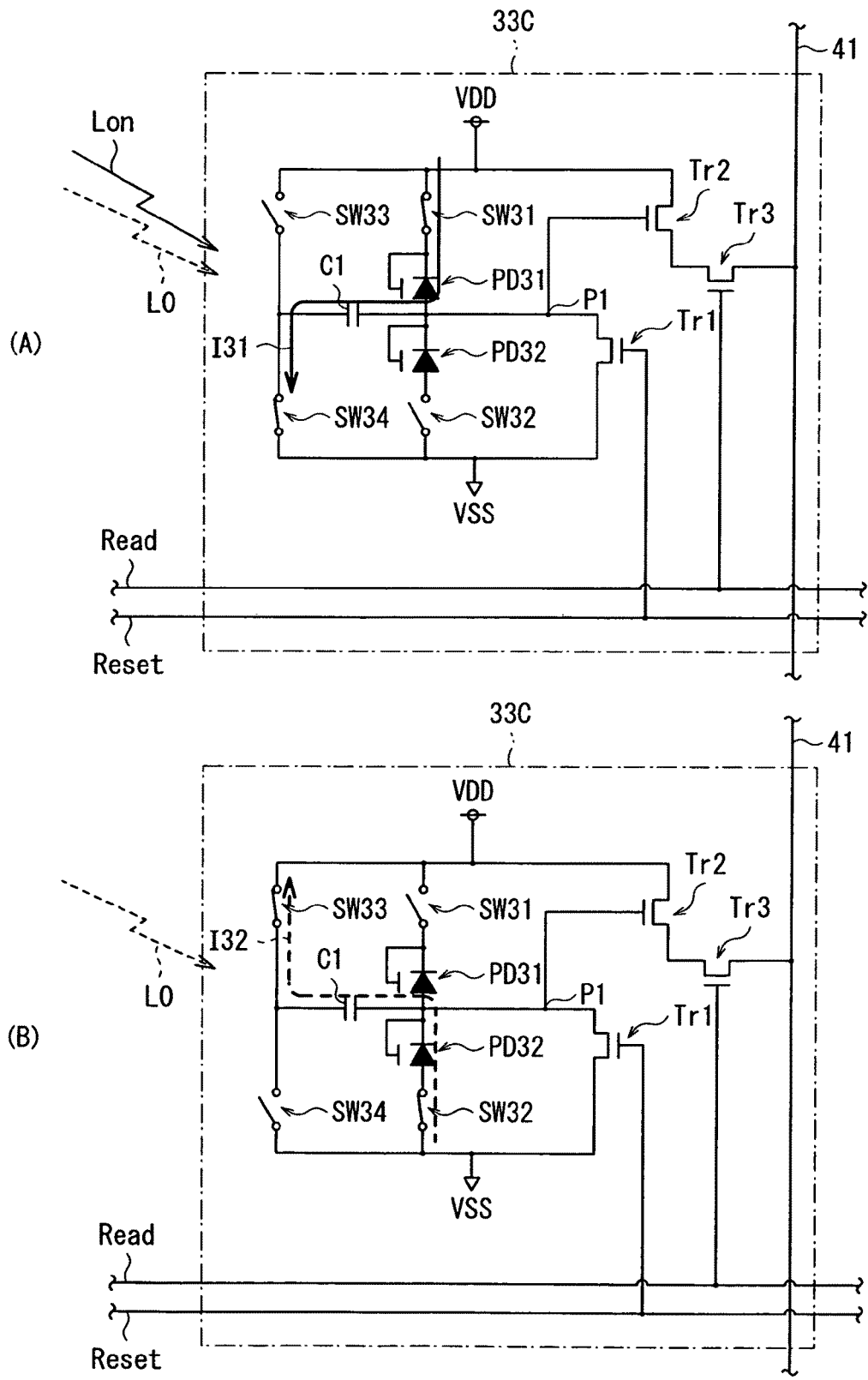
FIG. 22 is a circuit diagram for describing a charge operation and a discharge operation during the image pickup operation according to Modification Example 2.

In the light-receiving section 33C, for example, as illustrated in FIG. 21, an image pickup operation is performed at timings t20 to t26 in the drawing by SW control signals S1 to S4 for the switching elements SW31 to SW34, the read signal voltage V(Read) and the reset signal voltage V(Reset). More specifically, an image pickup drive is performed so that, for example, as illustrated in FIG. 22(A), an electric charge for charging (in accordance with the total light amount as a summation of the reflected light Lon and the outside light L0) generated in the photoelectric transducer PD31 is accumulated in the capacitor C1 through the switching elements SW31 and SW34 for charging, and, for example, as illustrated in FIG. 22(B), an electric charge for discharging (in accordance with the light amount of the outside light L0) generated in the photoelectric transducer PD32 is released from the capacitor C1 through the switching elements SW32 and SW33 for discharging. Moreover, at this time, one end of the capacitor C1 is alternately switched to be connected to the power source VDD through the switching element SW33 and the ground VSS through the switching element SW34 between a period of accumulating the electric charge for charging and a period of releasing the electric charge for discharging.

Thus, also in the modification example, the same fingertip extraction process is performed by the same image pickup operation as in the case of the above-described embodiment. Thereby, also in the modification example, the object is stably detectable irrespective of use conditions while reducing manufacturing costs.

Moreover, one end of the capacitor C1 is alternately switched to be connected to the power source VDD through the switching element SW33 and the ground VSS through the switching element SW34 between a period accumulating the electric charge for charging and a period of releasing the electric charge for discharging, so a voltage applied to both ends of the photoelectric transducers PD31 and PD32 is allowed to be substantially equal to (VDD−VSS) without arbitrarily inputting a reset voltage, and the reset signal lines are allowed to be reduced.

Figure 23:
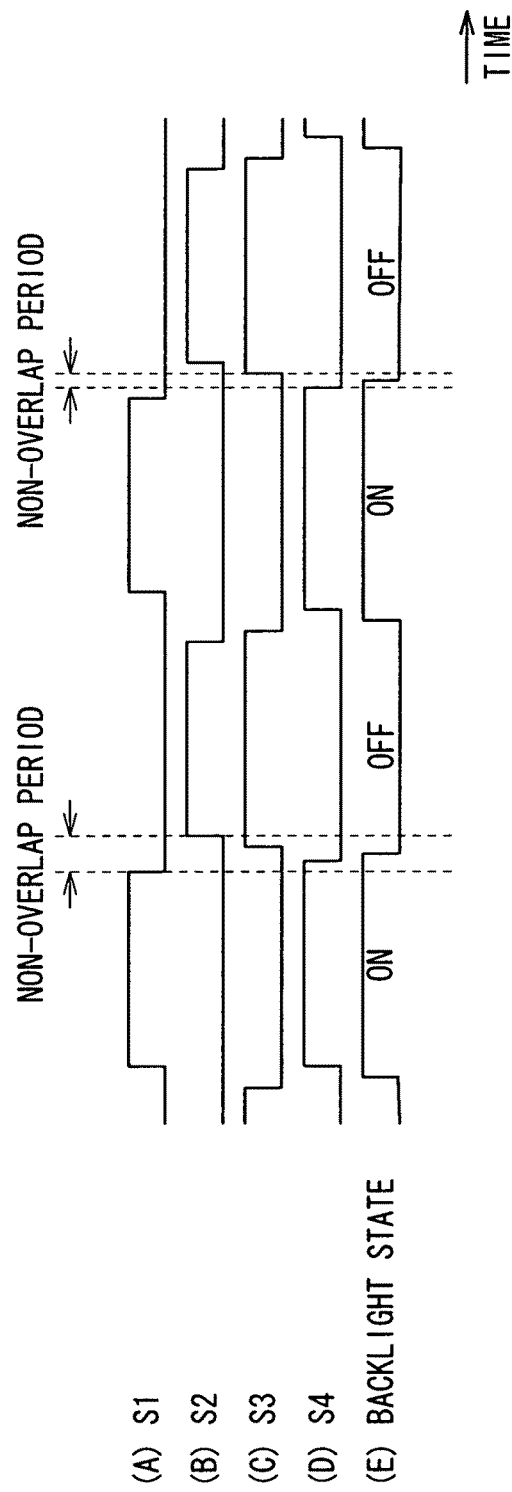
FIG. 23 is a timing waveform chart for describing SW control signals and a backlight state during the image pickup operation according to Modification Example 2.

In addition, also in the light-receiving section 33C of the modification example, to prevent the generation of a leakage current as in the case of the light-receiving section 33 of the above-described embodiment, for example, as illustrated in FIG. 23, a period in which the SW control signal Sa is in the H state and a period in which the SW control signal Sb is in the H state are preferably prevented from overlapping one another (a non-overlap period is preferably set).

Modification Example 3

Figure 24:
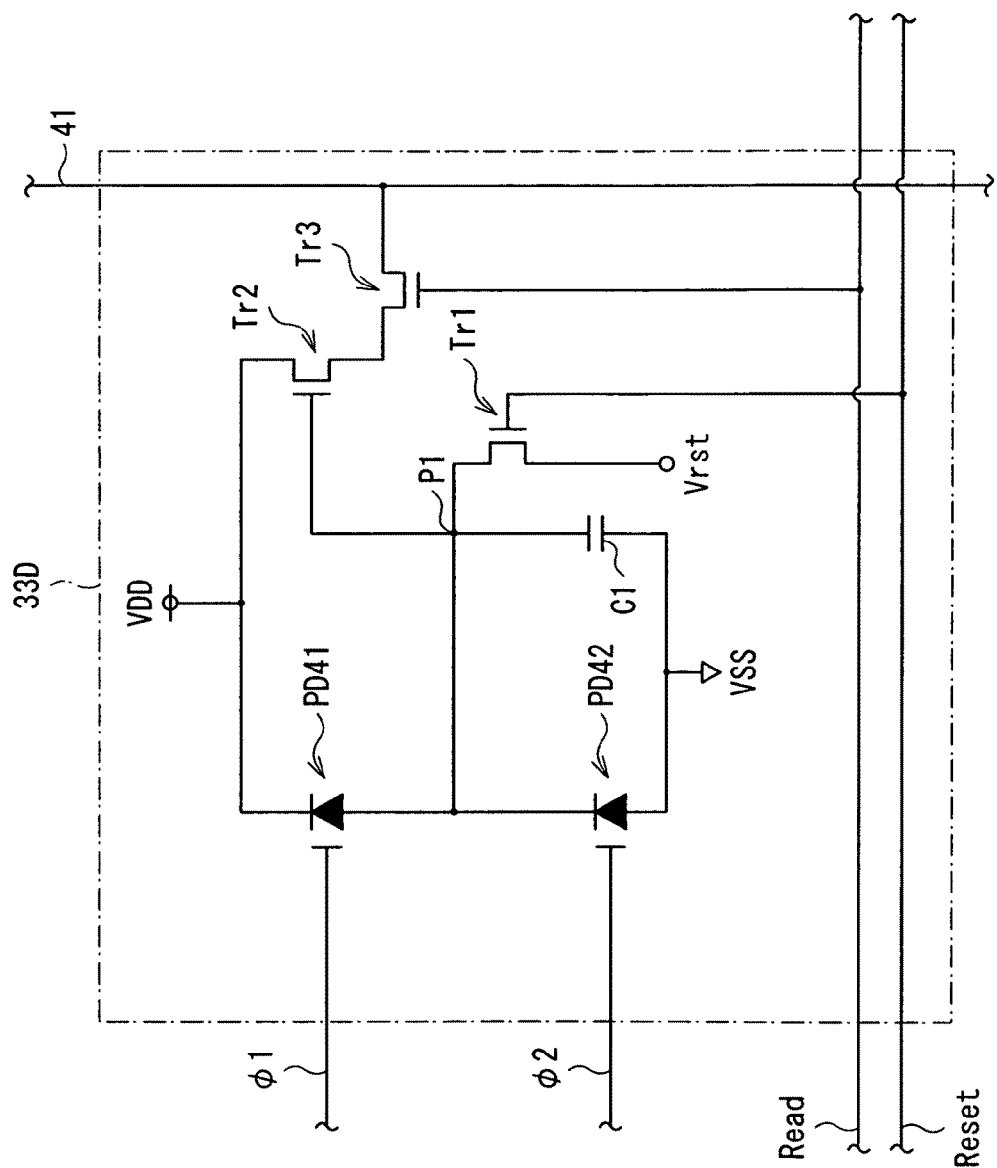
FIG. 24 is a circuit diagram illustrating a configuration example of a light-receiving section in a display area (a sensor area) according to Modification Example 3 of the invention.

FIG. 24 illustrates a circuit configuration of a light-receiving section (a light-receiving section 33D) according to Modification Example 3. The light-receiving section (an image pickup pixel) 33D includes two photoelectric transducer PD41 (a first photoelectric transducer) and PD42 (a second photoelectric transducer). More specifically, in the photoelectric transducer PD41, a cathode is connected to the power source VDD, and an anode is connected to a cathode of the photoelectric transducer PD42 and the connection point P1, and a gate is connected to a signal line φ1. Moreover, in the photoelectric transducer PD42, an anode is connected to the ground VSS, and a gate is connected to a signal line φ2. That is, in the light-receiving section 33D, unlike the above-described light-receiving sections 33, 33A, 33B and 33C, while the switching element is not arranged, gate potentials of the photoelectric transducers PD41 and PD42 are controlled by the signal lines φ1 and φ2, respectively. In addition, any other circuit configuration is the same as that of the light-receiving section 33 or the like, and will not be further described.

In the modification example (and Modification Examples 4 and 5 which will be described later), an operation of switching a current path is performed by switching the photoelectric transducers between an on-operation region and an off-operation region instead of the above-described operation of switching a current path by using the switching element. More specifically, the photoelectric transducers PD41 and PD42 are separately set to the on-state or the off-state through separately changing a potential relationship between the cathode and the gate in the photoelectric transducer PD41 and a potential relationship between the anode and the gate in the photoelectric transducer PD42.

Figure 25:
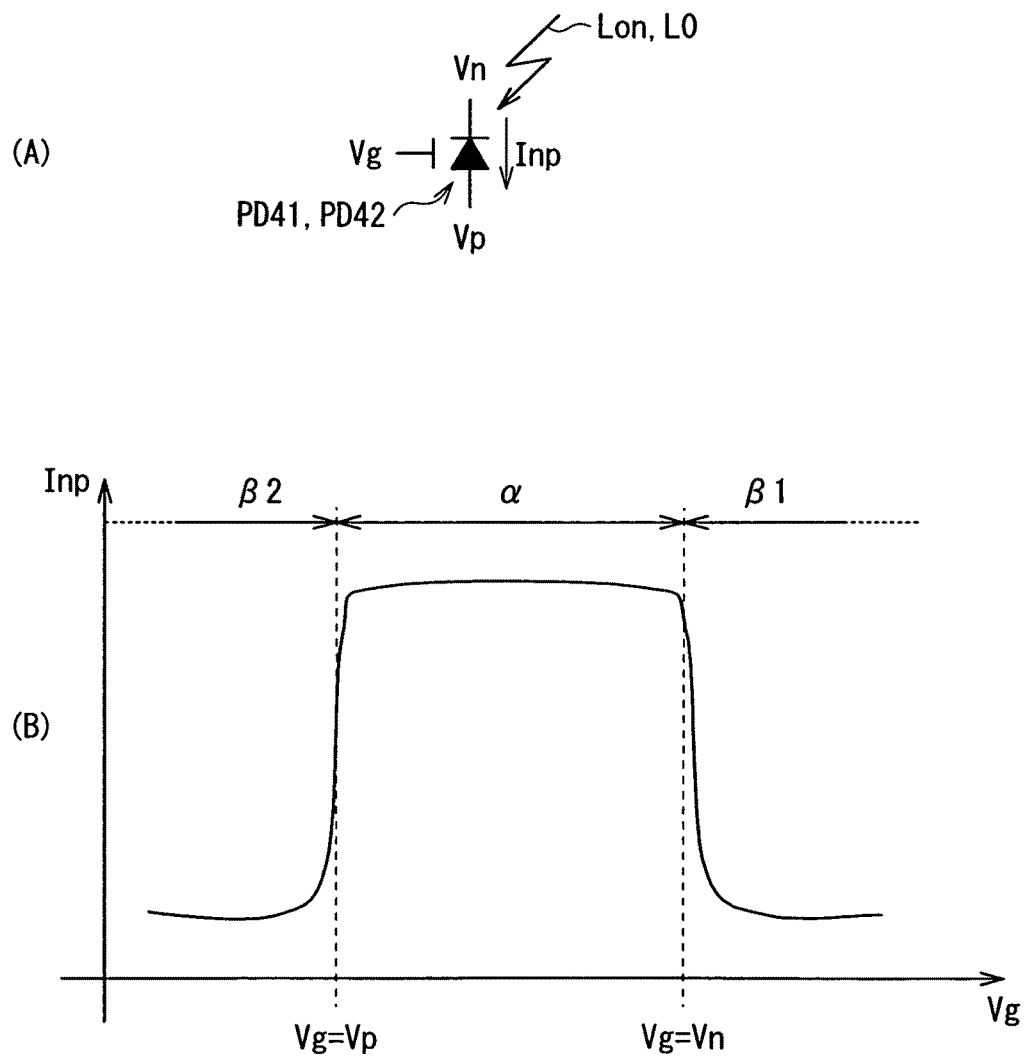
FIG. 25 is an illustration for describing an on-operation region and an off-operation region in a photoelectric transducer.
Figure 26:
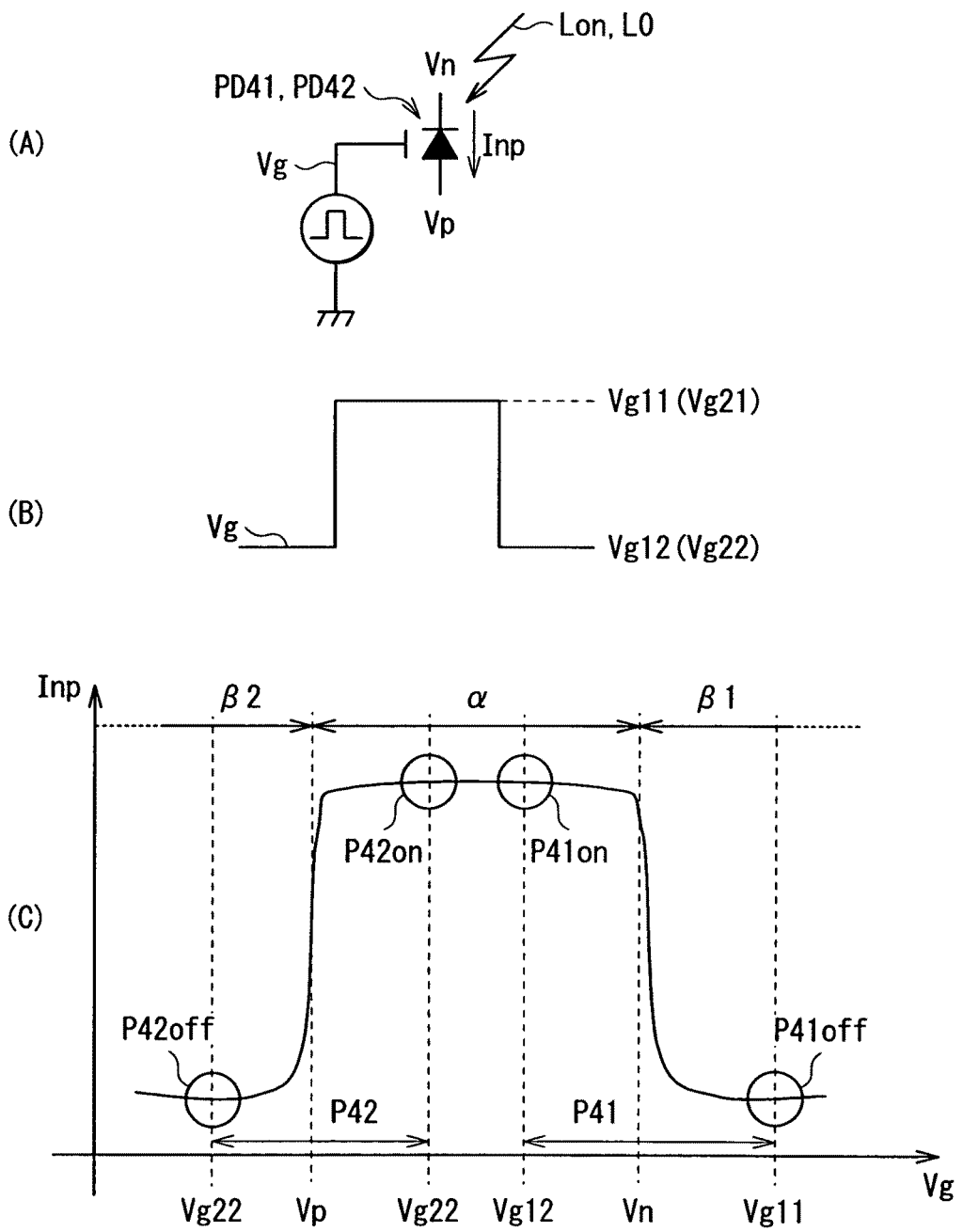
FIG. 26 is an illustration for describing an on-operation region and an off-operation region in a photoelectric transducer according to Modification Example 3.

Here, for example, as illustrated in FIG. 25(A), in the case where the anode potentials of the photoelectric transducers PD41 and PD42 are Vp, the cathode potentials of the photoelectric transducers PD41 and PD42 are Vn, the gate potentials of the photoelectric transducers PD41 and PD42 are Vg, and a photocurrent flowing from the cathode to the anode is Inp, I-V characteristics in the photoelectric transducers PD41 and PD42 are, for example, as illustrated in FIG. 25(B). That is, when the gate potential (a gate voltage) Vg is changed, a voltage region of Vp<Vg<Vn is an on-operation region α in which the photoelectric transducers PD41 and PD42 are in an on-state. On the other hand, a voltage region of Vn<Vg is an off-operation region β1 in which the photoelectric transducers PD41 and PD42 are in an off-state, and a voltage region of Vg<Vp is an off-operation region β2 in which the photoelectric transducers PD41 and PD42 are in the off-state. Thus, photoelectric conversion efficiency in these photoelectric transducers PD41 and PD42 is allowed to be changed through separately changing the potential relationship between the cathode and the gate in the photoelectric transducer PD41 and the potential relationship between the anode and the gate in the photoelectric transducer PD42. Therefore, in the modification example (and Modification Examples 4 and 5 which will be described later), the photoelectric transducers PD41 and PD42 are separately set to the on-state or the off-state by actively using such a change in photoelectric conversion efficiency.

More specifically, in the modification example, first, as illustrated in FIG. 24, the cathode potential in the photoelectric transducer PD41 is fixed to the power source VDD, and the anode potential in the photoelectric transducer PD42 is fixed to the ground VSS. Moreover, as illustrated in FIG. 24 and FIGS. 26(A) to (C), the gate voltages Vg in these photoelectric transducers PD41 and PD42 are changed by the signal lines φ1 and φ2, respectively. More specifically, the gate voltage Vg of the photoelectric transducer PD41 is changed alternately between Vg11 and Vg12 by the potential V(φ1) of the signal line φ1 (refer to an arrow P41 in FIG. 26(C); Vg12<Vg11). Moreover, the gate voltage Vg of the photoelectric transducer PD42 is changed alternately between Vg21 and Vg22 by the potential V(φ2) of the signal line φ2 (refer to an arrow P42 in FIG. 26(C); Vg22<Vg21). Thereby, for example, as indicated by operation points P41on and P41off in FIG. 26(C), the on/off-states of the photoelectric transducer PD41 are arbitrarily settable by the potential V(φ1) of the signal line φ1. Moreover, for example, as indicated by operation points P42on and P42off in FIG. 26(C), the on/off-states of the photoelectric transducer PD42 are arbitrarily settable by the potential V(φ2) of the signal line φ2.

In the light-receiving section 33D of the modification example, for example, as illustrated in FIGS. 27(A) to (F) and FIGS. 28(A) to (C), the image pickup operation is performed at timings in the drawings by the reset signal voltage V(Reset), the read signal voltage V(Read), the potentials V(φ1) and V(φ2) of the signal lines φ1 and φ2, the reset power source Vrst and the like. Herein, β10 and β20 indicate transition regions from the on-operation region to the off-operation region in the photoelectric transducers PD41 and PD42, respectively.

Figure 29:
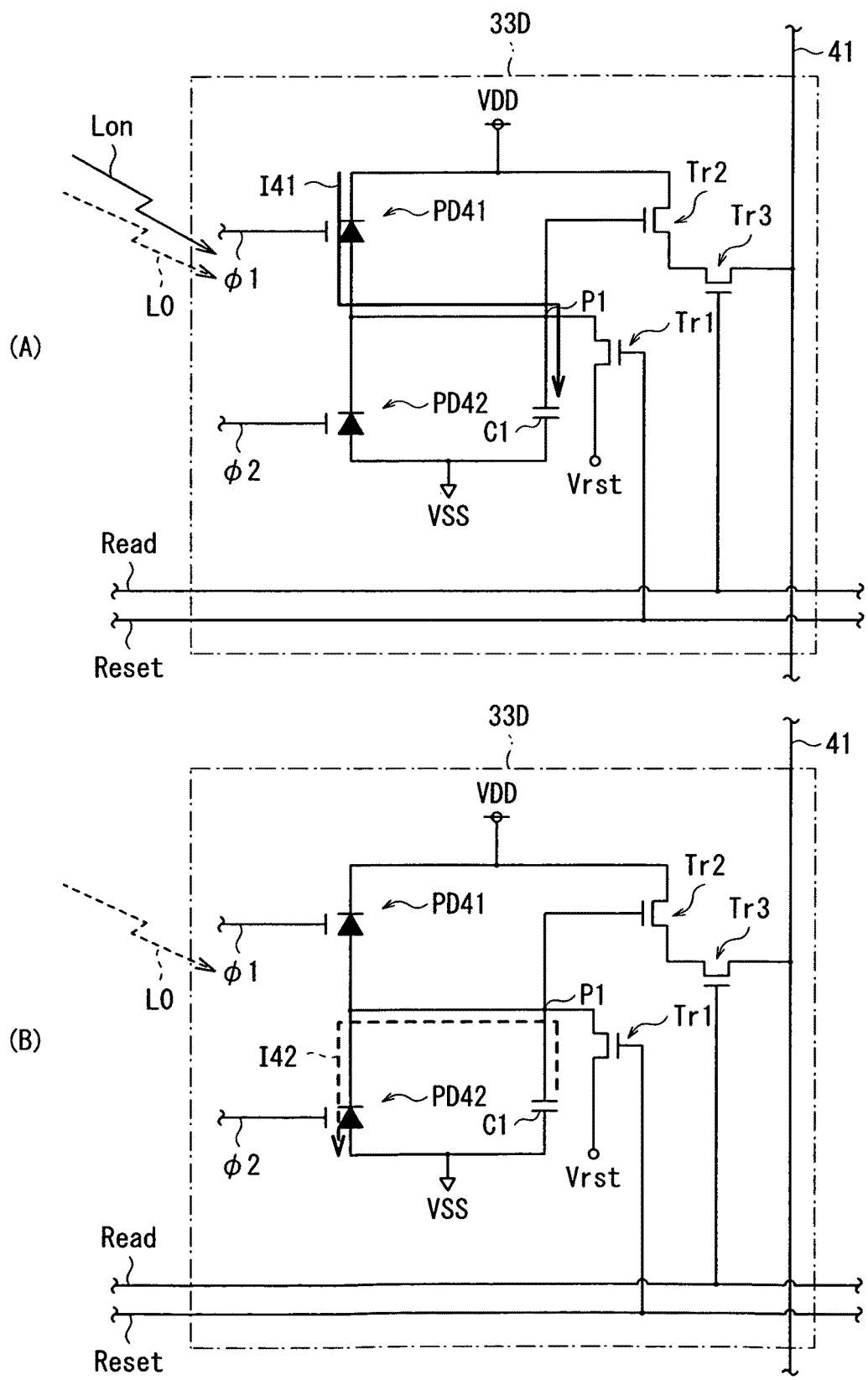
FIG. 29 is a circuit diagram for describing a charge operation and a discharge operation during the image pickup operation according to Modification Example 3.

More specifically, for example, as illustrated in FIG. 29(A), the electric charge for charging (in accordance with the total light amount as a summation of the reflected light Lon and the outside light L0) generated in the photoelectric transducer PD41 is accumulated in the capacitor C1 through a current path I41 in the drawing through bringing the photoelectric transducers PD41 and PD42 into the on-state and the off-state, respectively. Moreover, for example, as illustrated in FIG. 29(B), the electric charge for discharging (in accordance with the light amount of the outside light L0) generated in the photoelectric transducer PD42 is released from the capacitor C1 through a current path I42 in the drawing through bringing the photoelectric transducers PD41 and PD42 into the off-state and the on-state, respectively. In addition, a current flowing when the photoelectric transducers PD41 and PD42 are in the off-state is not 0, so to be precise, charging or discharging is performed by a current difference between the photoelectric transducer which is in the on-state and the photoelectric transducer which is in the off-state.

Thus, also in the modification example, by the above-described image pickup operation, the object is stably detectable irrespective of use conditions while reducing manufacturing costs.

Figure 27:
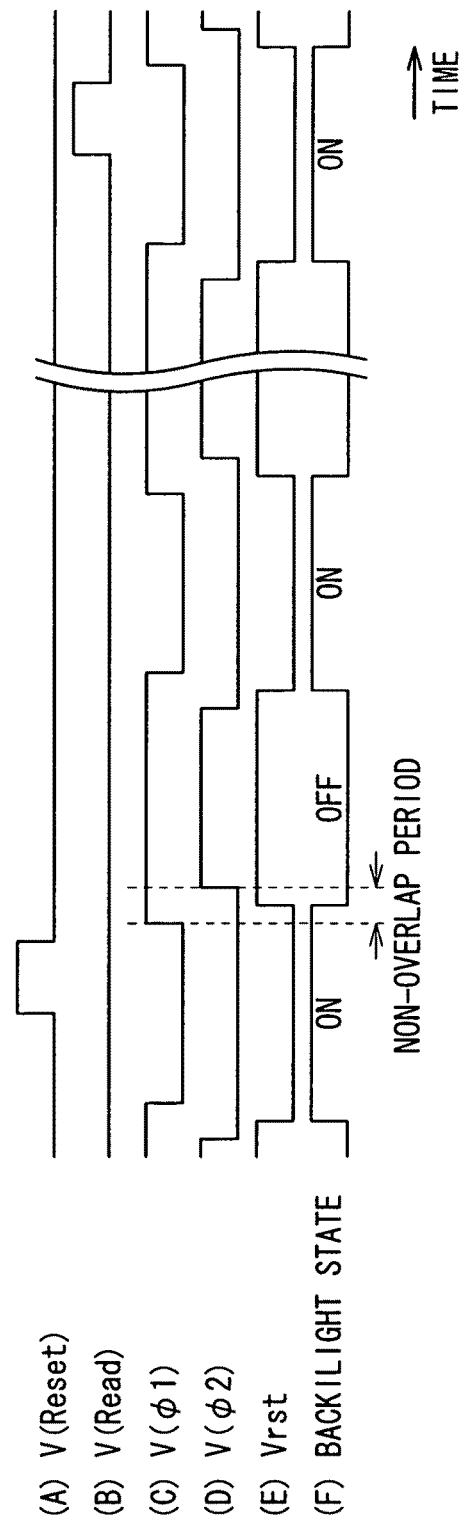
FIG. 27 is a timing waveform chart for describing an image pickup operation according to Modification Example 3.
Figure 28:
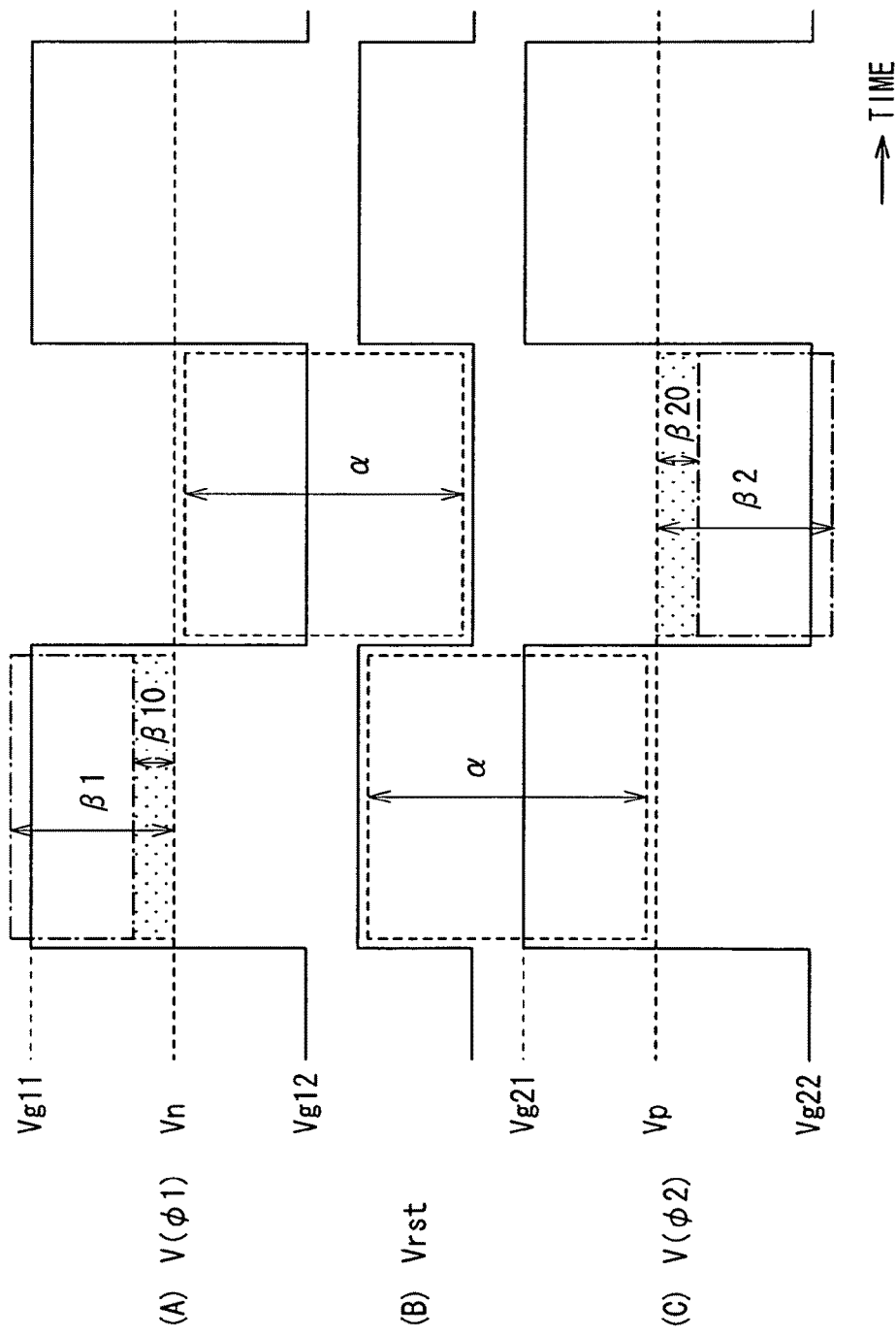
FIG. 28 is a timing waveform chart for specifically describing an on operation and an off operation in the photoelectric transducer according to Modification Example 3.

In addition, also in the modification example, to prevent the generation of a leakage current, as illustrated in FIG. 27, a period in which the potential V(φ1) of the signal line φ1 is in the H state and a period in which the potential V(φ2) of the signal line φ2 is in the H state are preferably prevented from overlapping one another (a non-overlap period is preferably set). Further, in the case where a PIN diode turns on or off, a through current hardly flows, so the non-overlap period may not be arranged, but arranging the non-overlap period does not cause an issue.

Modification Example 4

Figure 30:
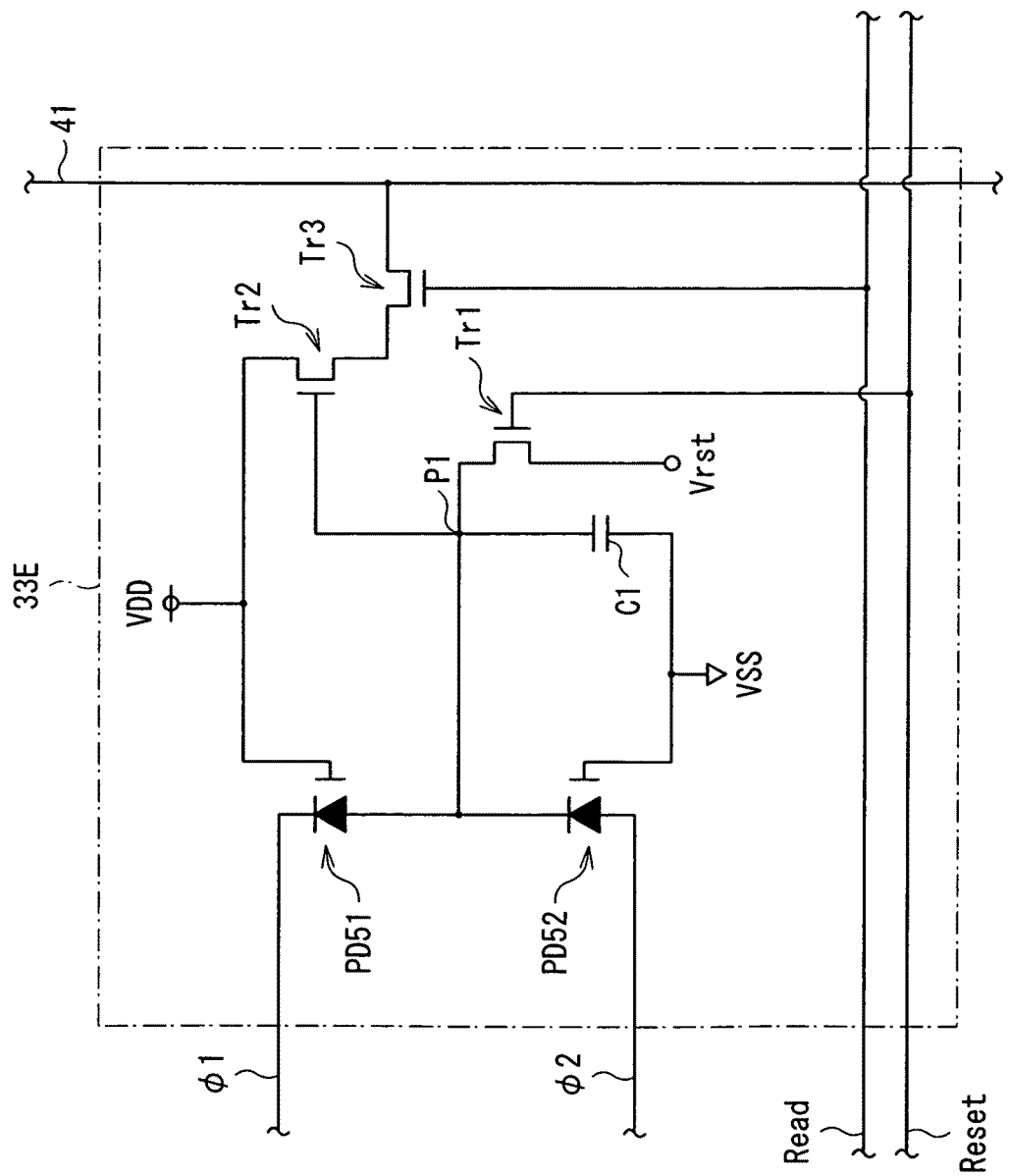
FIG. 30 is a circuit diagram illustrating a configuration example of a light-receiving section in a display are (a sensor area) according to Modification Example 4 of the invention.

FIG. 30 illustrates a circuit configuration of a light-receiving section (a light-receiving section 33E) according to Modification Example 4. The light-receiving section (image pickup pixel) 33E includes two photoelectric transducer PD51 (a first photoelectric transducer) and PD52 (a second photoelectric transducer). More specifically, in the photoelectric transducer PD51, a cathode is connected to the signal line φ1, an anode is connected to a cathode of the photoelectric transducer PD52 and the connection point P1, and a gate is connected to the power source VDD. Moreover, in the photoelectric transducer PD52, an anode is connected to the signal line φ2, and a gate is connected to the ground VSS. That is, in the light-receiving section 33E, unlike the above-described light-receiving section 33D of Modification Example 3, while the gate potentials of the photoelectric transducers PD51 and PD52 are fixed by the power source VDD or the ground VSS, the cathode potential of the photoelectric transducer PD51 and the anode potential of the photoelectric transducer PD52 are controlled by the signal lines φ1 and φ2. In addition, any other circuit configuration is the same as that of the light-receiving section 33D, and will not be further described.

Figure 31:
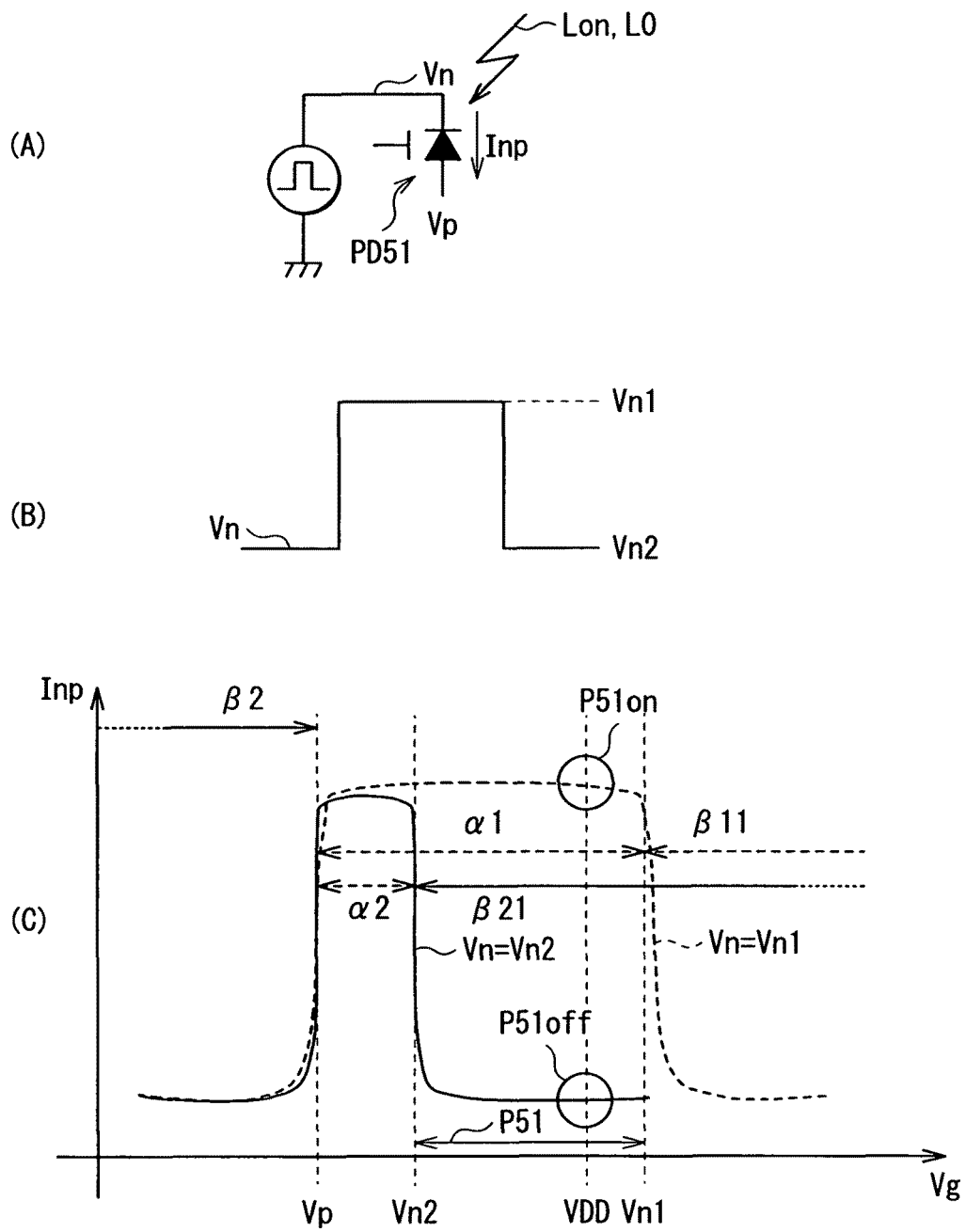
FIG. 31 is an illustration for describing an on-operation region and an off-operation region in a photoelectric transducer according to Modification Example 4.
Figure 32:
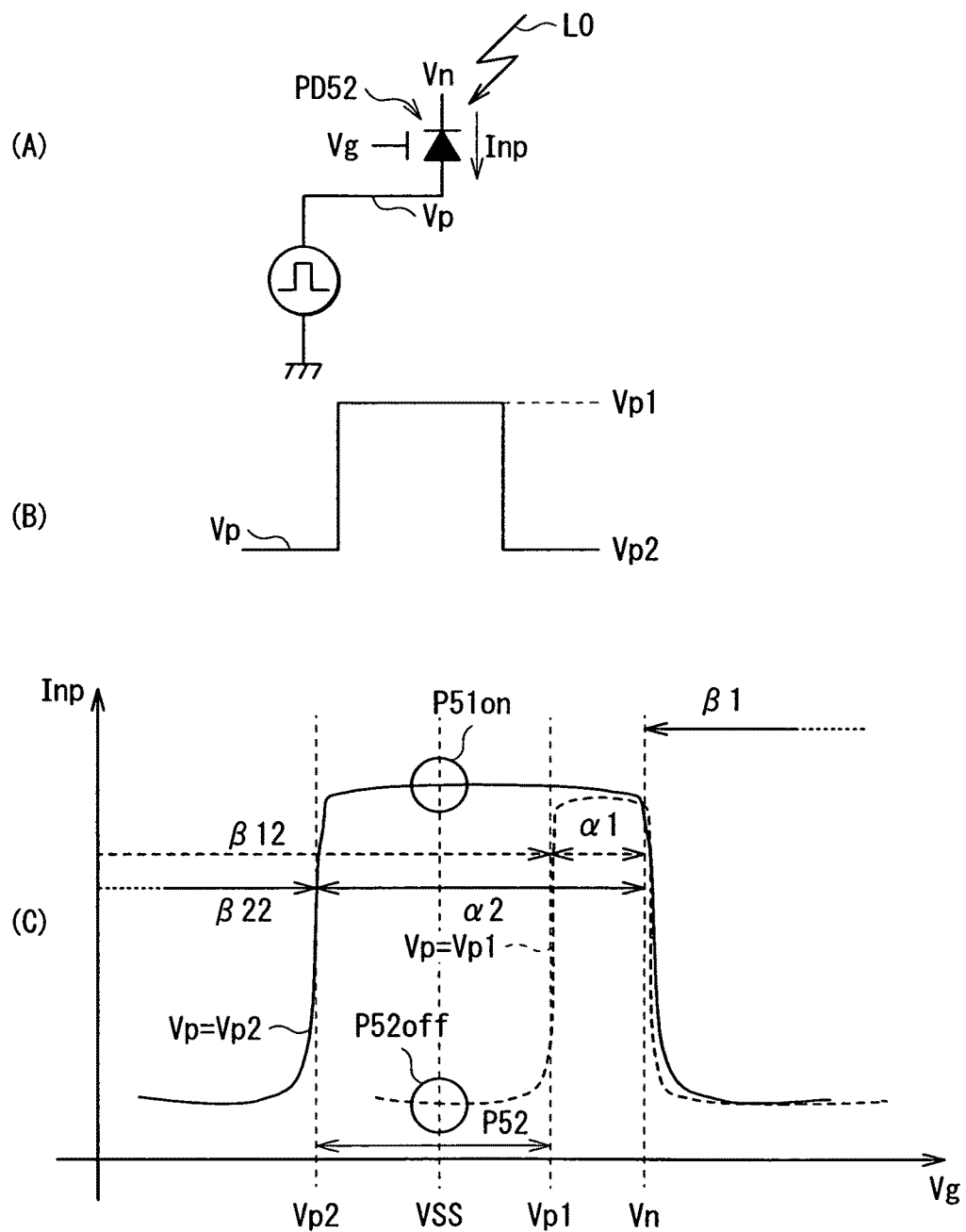
FIG. 32 is an illustration for describing the on-operation region and the off-operation region in the photoelectric transducer according to Modification Example 4.
Figure 33:
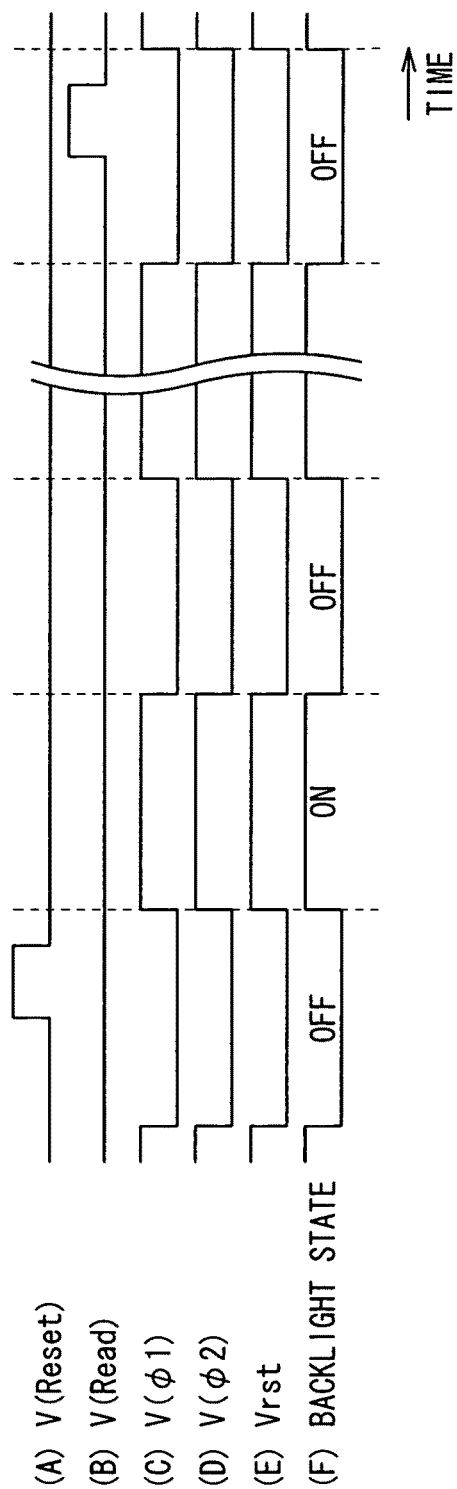
FIG. 33 is a timing waveform chart for describing an image pickup operation according to Modification Example 4.
Figure 34:
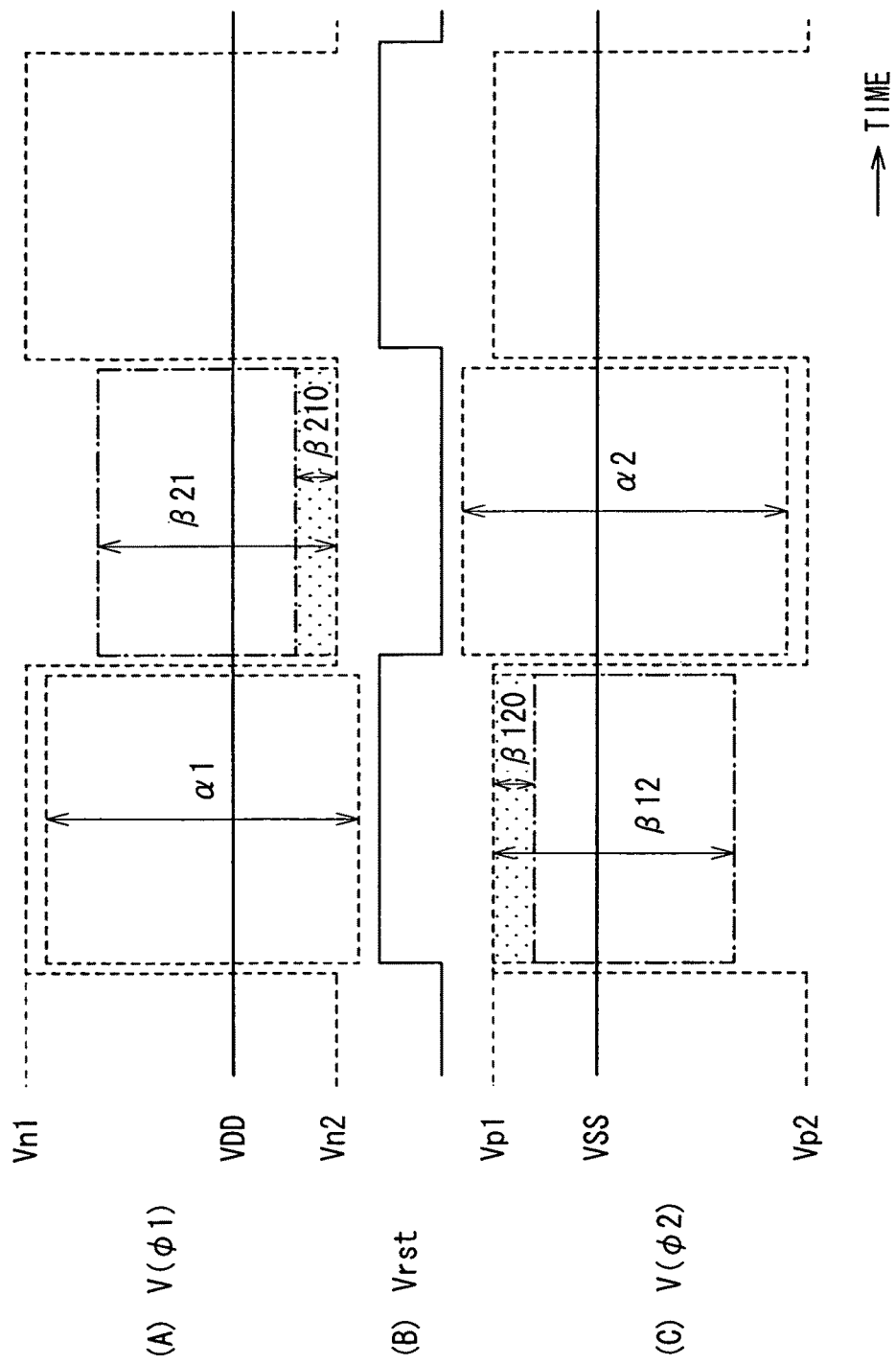
FIG. 34 is a timing waveform chart for specifically describing an on operation and an off operation in the photoelectric transducer according to Modification Example 4.

In the modification example, first, as illustrated in FIG. 30, the gate potential in the photoelectric transducer PD51 is fixed to the power source VDD, and the gate potential in the photoelectric transducer PD52 is fixed to the ground VSS. Moreover, as illustrated in FIG. 30 and FIGS. 31(A) to (C), the cathode voltage Vn in the photoelectric transducer PD51 is changed by the signal line φ1. More specifically, the cathode voltage Vn of the photoelectric transducer PD51 is changed alternately between Vn1 and Vn2 by the potential V(φ1) of the signal line φ1 (refer to an arrow P51 in FIG. 31(C); Vn2<Vn1). Thereby, for example, as illustrated in FIG. 31(C), the voltage ranges of the on-operation region α and the off-operation region β1 are different from each other between in the case of Vn=Vn1 and in the case of Vn=Vn2 (refer to on-operation regions α1 and α2 and off-operation regions β11 and β21). Therefore, when such a change in photoelectric conversion efficiency is actively used, as illustrated by operation points P51on and P51off in the drawing, the on/off-state of the photoelectric transducer PD51 is arbitrarily settable by the potential V(φ1) of the signal line φ1. Moreover, as illustrated in FIG. 30 and FIG. 32(A) to (C), the anode voltage Vp in the photoelectric transducer PD52 is changed by the signal line φ2. More specifically, the anode voltage Vp of the photoelectric transducer PD52 is changed alternately between Vp1 and VP2 by the potential V(φ2) of the signal line φ2 (refer to an arrow P52 in FIG. 32(C); Vp2<Vp1). Thereby, for example, as illustrated in FIG. 32(C), the voltage ranges of the on-operation region α and the off-operation region β2 are different from each other between in the case of Vp=Vp1 and in the case of Vp=Vp2 (refer to the on-operation regions α1 and α2 and off-operation regions β12 and β22). Therefore, when such a change in photoelectric conversion efficiency is actively used, as illustrated by operation points P52on and P52off in the drawing, the on/off-state of the photoelectric transducer PD52 is arbitrarily settable by the potential V(φ2) of the signal line φ2.

In the light-receiving section 33E of the modification example, for example, as illustrated in FIGS. 33(A) to (F) and FIG. 34(A) to (C), the image pickup operation is performed at timings in the drawings by the reset signal voltage V(Reset), the read signal voltage V(Read), the potentials V(φ1) and V(φ2) of the signal lines φ1 and φ2, the reset power source Vrst and the like. Herein, β120 and β210 indicate transition regions from the on-operation region to the off-operation region in the photoelectric transducers PD51 and PD52, respectively.

Figure 35:
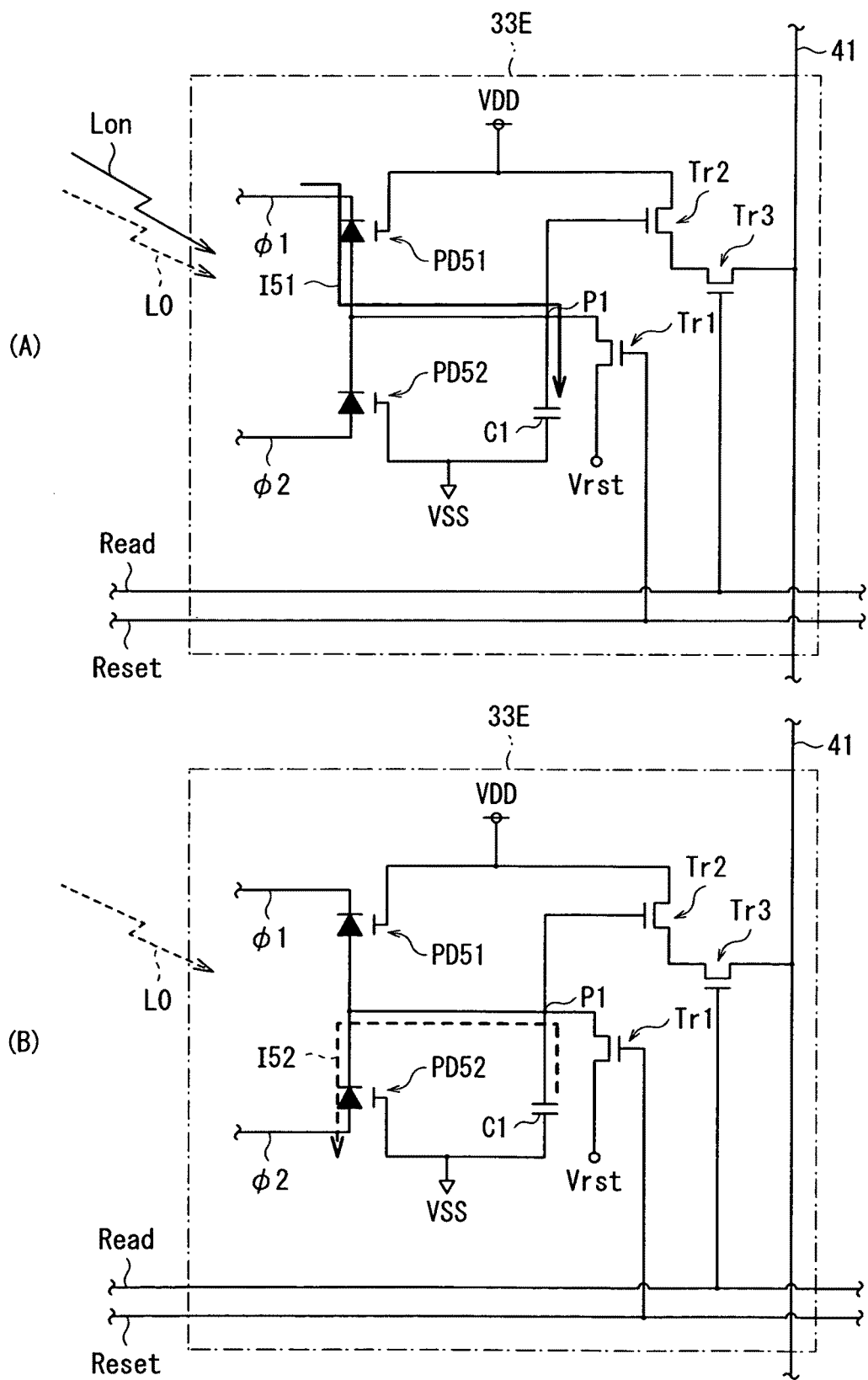
FIG. 35 is a circuit diagram for describing a charge operation and a discharge operation during the image pickup operation according to Modification Example 4.

More specifically, for example, as illustrated in FIG. 35(A), the electric charge for charging (in accordance with the total light amount as a summation of the reflected light Lon and the outside light L0) generated in the photoelectric transducer PD51 is accumulated in the capacitor C1 through a current path I51 in the drawing through bringing the photoelectric transducers PD51 and PD52 into the on-state and the off-state, respectively. Moreover, for example, as illustrated in FIG. 35(B), the electric charge for discharging (in accordance with the light amount of the outside light L0) generated in the photoelectric transducer PD52 is released from the capacitor C1 through a current path I52 in the drawing through bringing the photoelectric transducers PD51 and PD52 into the off-state and the on-state, respectively. In addition, a current flowing when the photoelectric transducers PD51 and PD52 are in the off-state is not 0, so to be precise, charging or discharging is performed by a current difference between the photoelectric transducer which is in the on-state and the photoelectric transducer which is in the off-state.

Thus, in the modification example, by the above-described image pickup operation, the object is stably detectable irrespective of use conditions while reducing manufacturing costs.

Modification Example 5

Figure 36:
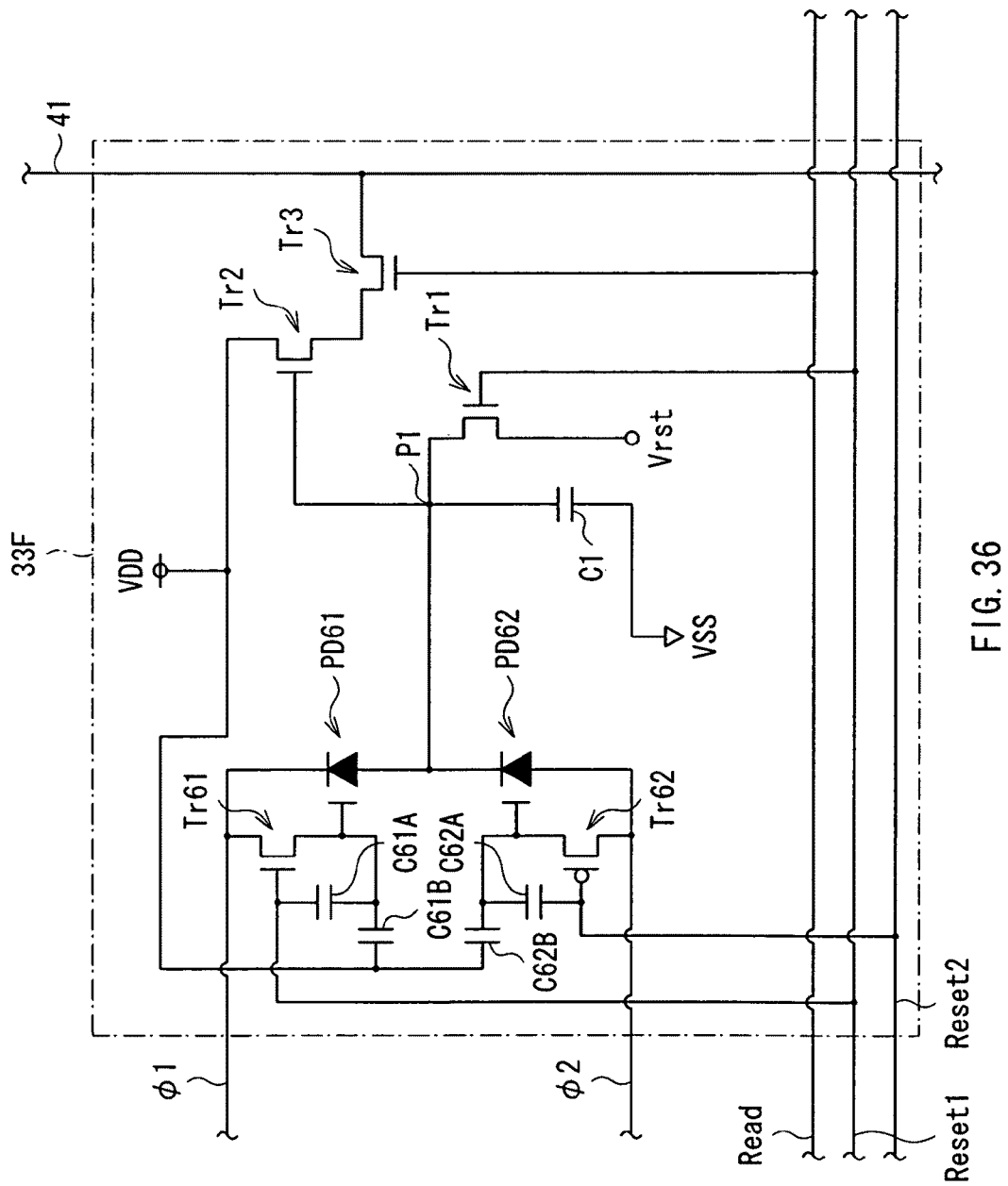
FIG. 36 is a circuit diagram illustrating a configuration example of a light-receiving section in a display area (a sensor area) in Modification Example 5 of the invention.

FIG. 36 illustrates a circuit configuration of a light-receiving section (a light-receiving section 33F) according to Modification Example 5. The light-receiving section (image pickup pixel) 33F includes two photoelectric transducers PD61 (a first photoelectric transducer) and PD62 (a second photoelectric transducer), five transistors Tr1, Tr2 and Tr3, and Tr61 (an N-channel transistor) and Tr62 (a P-channel transistor) and four capacitors C61A, C61B, C62A and C62B. More specifically, in the photoelectric transducer PD61, a cathode is connected to the signal line φ1 and a source of the transistor Tr61, an anode is connected to a cathode of the photoelectric transducer PD62 and the connection point P1, and a gate is connected to a drain of the transistor Tr61, one end of the capacitor C61A and one end of the capacitor C61B. Moreover, a gate of the transistor Tr61 is connected to the other end of the capacitor C61A and a reset line Resel1 (corresponding to the reset line Reset described above). On the other hand, in the photoelectric transducer PD62, an anode is connected to the signal line φ2 and a source of the transistor Tr62, and a gate is connected to a drain of the transistor Tr62 and one end of the capacitor C62A and one end of the capacitor C62B. Moreover, a gate of the transistor Tr62 is connected to the other end of the capacitor C61A and an inversion signal of a reset line Reset2. In addition, the other end of the capacitor C61B and the other end of the capacitor C62B are connected to the power source VDD. That is, in the light-receiving section 33F, unlike the above-described light-receiving section 33E of Modification Example 4, the gate potentials of the photoelectric transducers PD61 and PD62 are not fixed, and the photoelectric transducers PD61 and PD62 are in a high impedance state from after a precharge period to a readout period (a period of accumulating the electric charge for charging and a period of releasing the electric charge for discharging). In addition, any other circuit configuration is the same as that of the light-receiving section 33E, and will not be further described.

Figure 38:
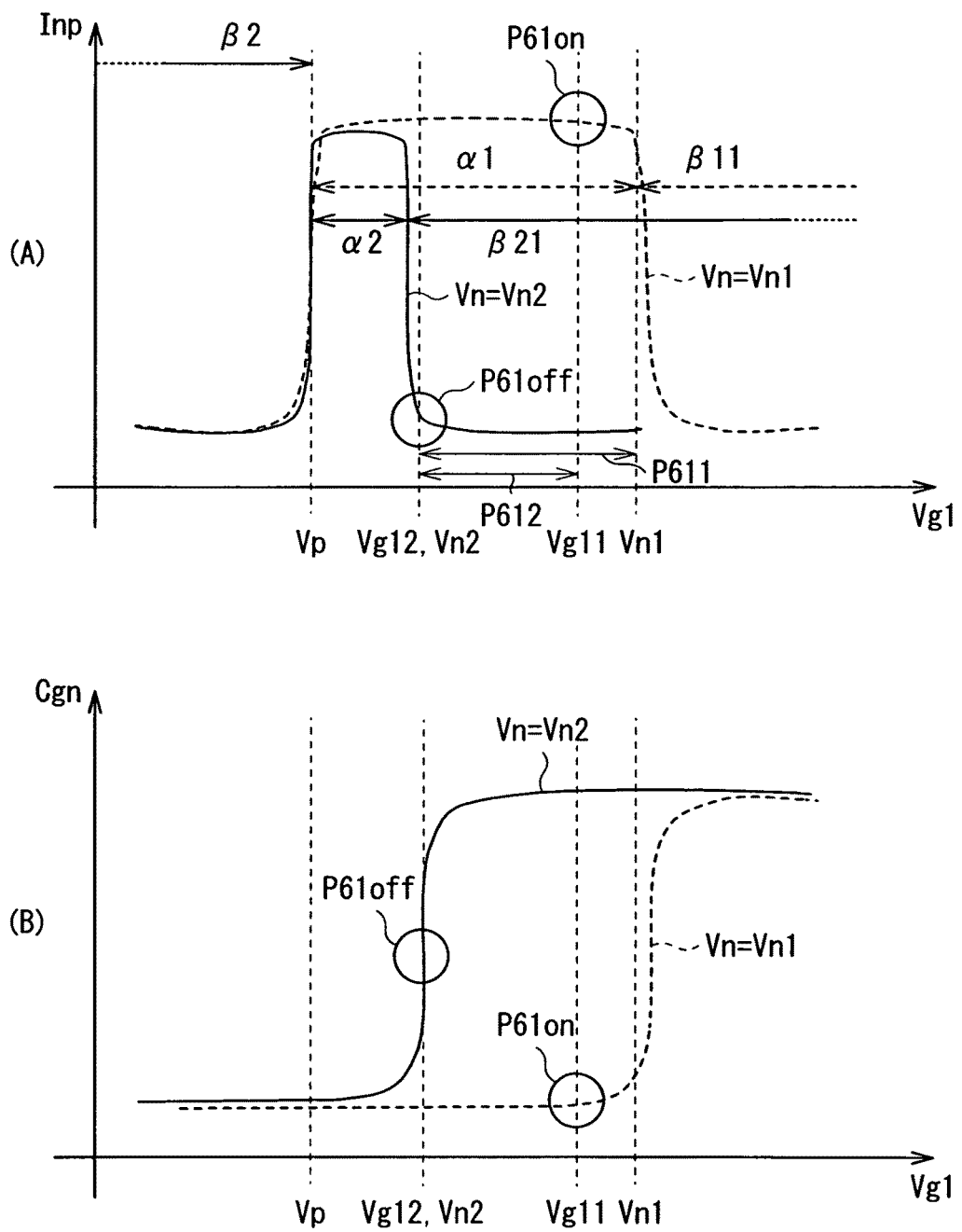
FIG. 38 is an illustration for describing the on-operation region and the off-operation region in the photoelectric transducer according to Modification Example 5.

In the modification example, first, as schematically illustrated in FIGS. 37(A) and (B), the cathode potential Vn in the photoelectric transducer PD61 is changed by the signal line φ1. Then, the gate voltage Vg1 in the photoelectric transducer PD61 is changed by connecting or disconnecting between the signal line φ1 and a gate electrode through allowing a switching element SW61 configured of the transistor Tr61 to be turned on or off. More specifically, as illustrated in FIG. 37 and FIGS. 38(A) and (B), the cathode potential Vn in the photoelectric transducer PD61 is changed alternately between Vn1 and Vn2 by the potential V(φ1) of the signal line φ1 (refer to an arrow P611 in FIG. 38(A); Vn2<Vn1). At this time, after the gate voltage Vg1 of the photoelectric transducer PD61 is reset to Vn1 through bringing the switching element SW61 into the on-state, the switching element SW61 is brought into the off-state. Then, after that, in the case where the cathode potential Vn is Vn=Vn2, as illustrated in a C-V characteristic in FIG. 38(B), the gate voltage Vg of the photoelectric transducer PD61 is reduced due to a coupling capacity between the gate and the cathode, and stops at an operation point (Vg=Vg12) where the coupling capacity is increased. That is, the gate voltage Vg1 in the photoelectric transducer PD61 is changed alternately between Vg11 and Vg12 (refer to an arrow P612 in FIG. 38(A); Vg12<Vg11). Thus, for example, as illustrated in FIG. 38(A), the voltage ranges of the on-operation region α and the off-operation region β1 are different from each other between in the case of Vn=Vn1 and in the case of Vn=Vn2 (refer to the on-operation regions α1 and α2 and the off-operation regions β11 and β21). Therefore, when such a change in photoelectric conversion efficiency is actively used, as illustrated by operation points P61on and P61off in FIGS. 38(A) and (B), the on/off-state of the photoelectric transducer PD61 is arbitrarily settable by the potential V(φ1) of the signal line φ1 and the operation by the switching element SW 61.

Figure 39:
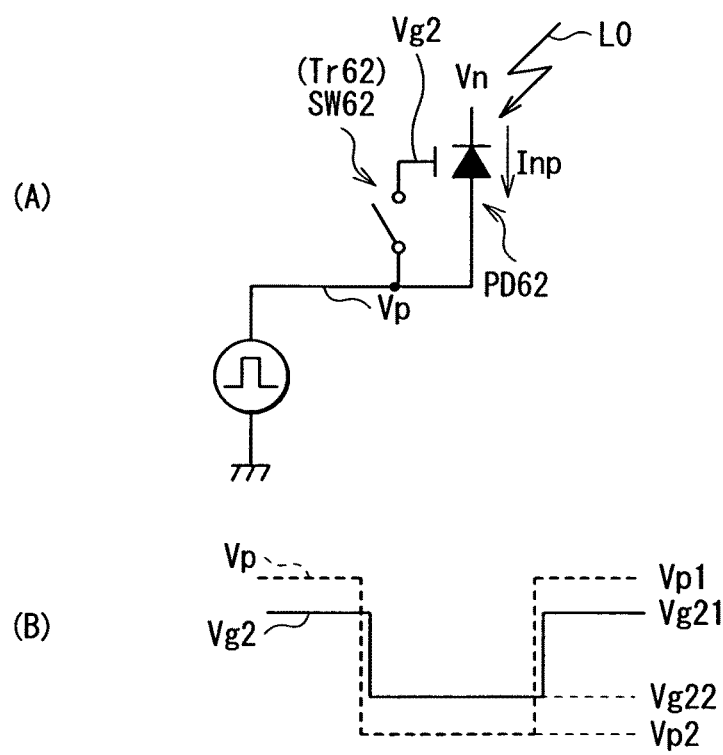
FIG. 39 is an illustration for describing the on-operation region and the off-operation region in the photoelectric transducer according to Modification Example 5.
Figure 40:
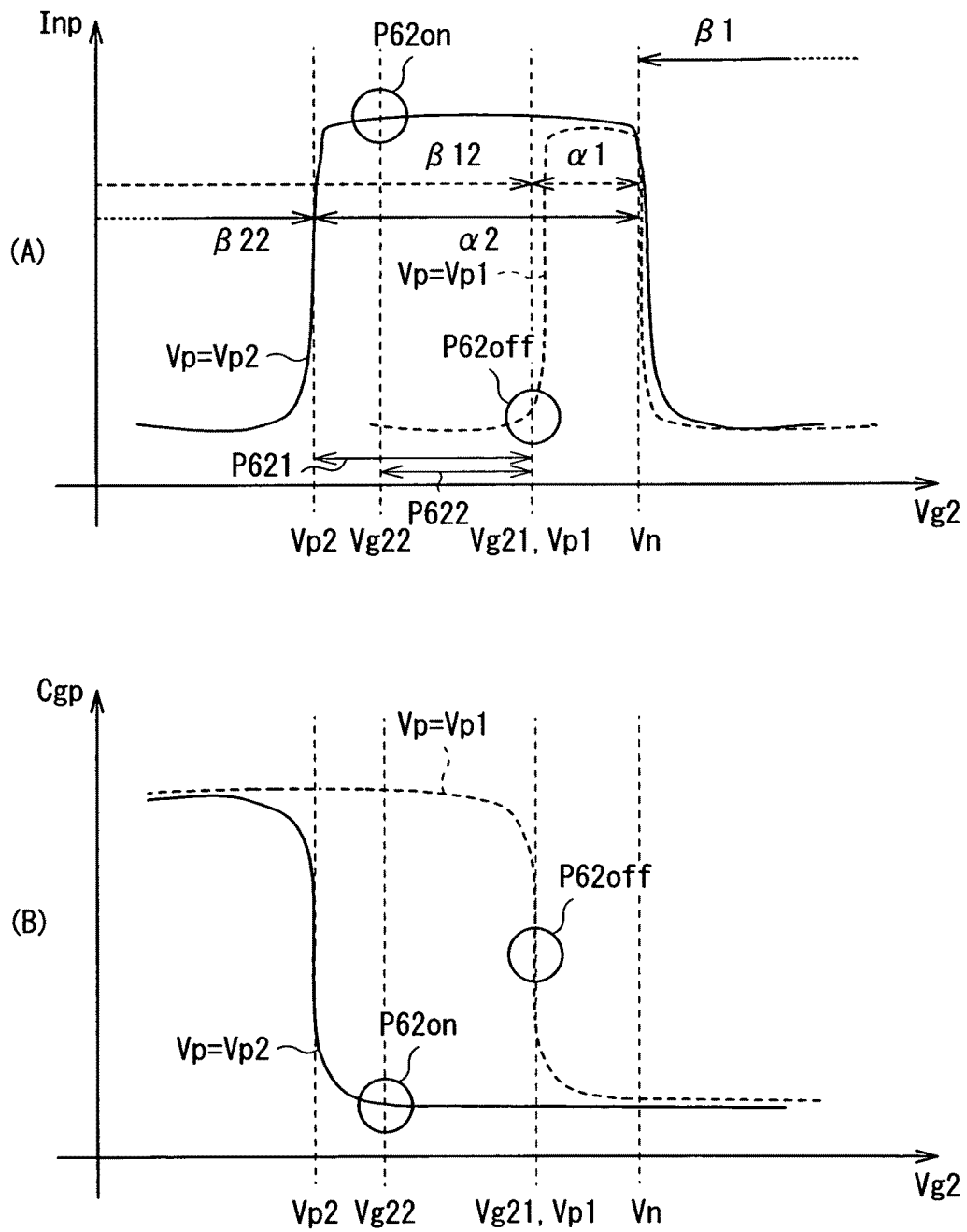
FIG. 40 is an illustration for describing the on-operation region and the off-operation region in the photoelectric transducer according to Modification Example 5.
Figure 41:
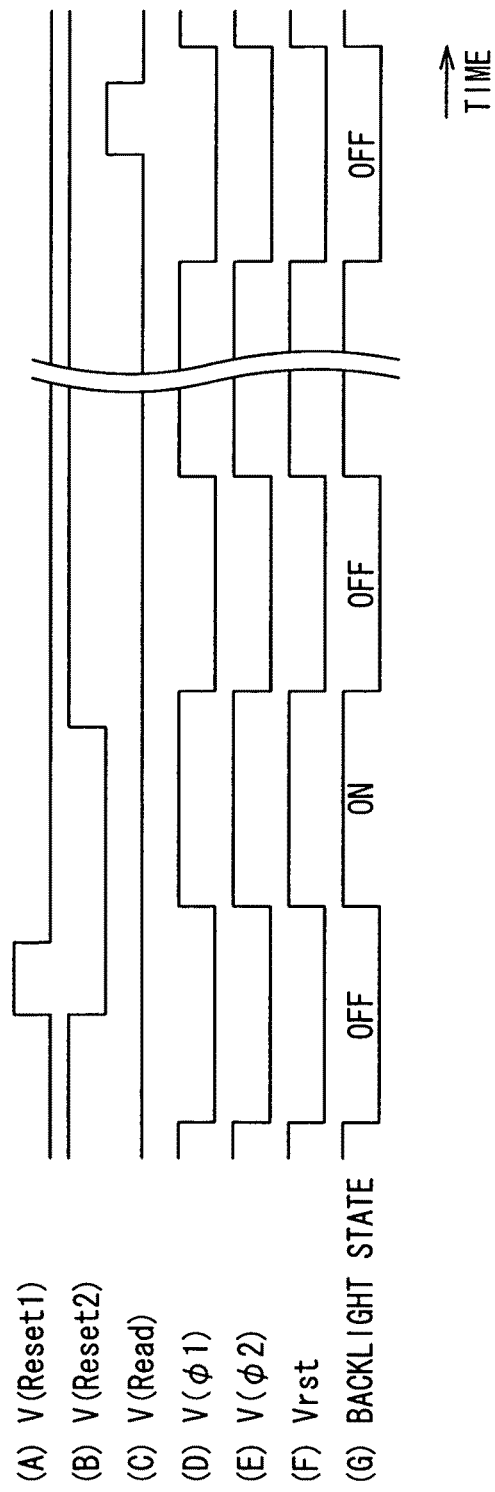
FIG. 41 is a timing waveform chart for describing an image pickup operation according to Modification Example 5.
Figure 42:
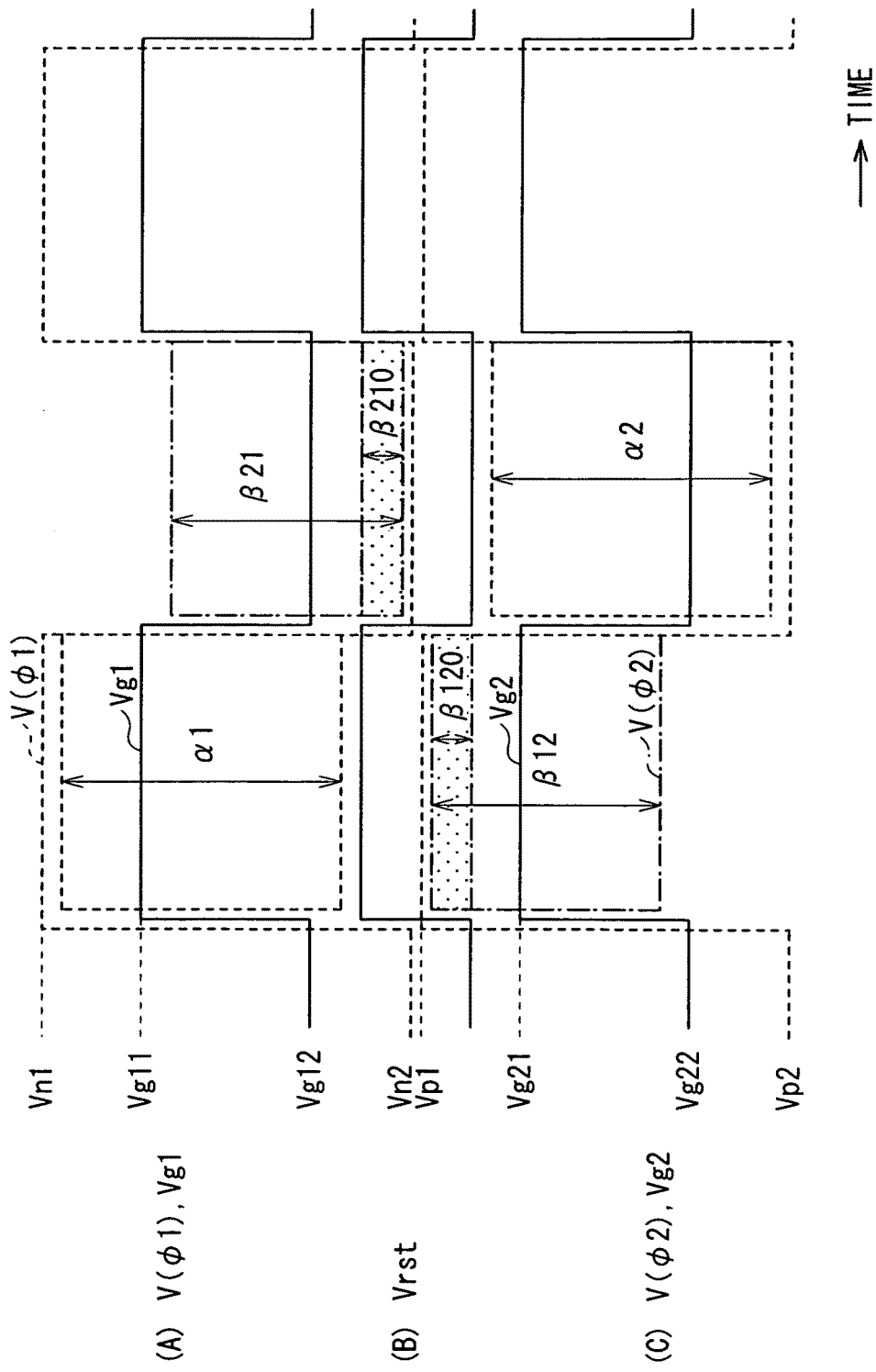
FIG. 42 is a timing waveform chart for specifically describing an on operation and an off operation in the photoelectric transducer according to Modification Example 5.

On the other hand, also in the modification example, as schematically illustrated in FIGS. 39(A) and (B), the anode potential Vp in the photoelectric transducer PD62 is changed by the signal line φ2. Then, the gate voltage Vg2 in the photoelectric transducer PD62 is changed by connecting or disconnecting between the signal line φ2 and a gate electrode through allowing a switching element SW62 configured of the transistor Tr62 to be turned on or off. More specifically, as illustrated in FIG. 39 and FIGS. 40(A) and (B), the anode potential Vp in the photoelectric transducer PD62 is changed alternately between Vp1 and Vp2 by the potential V(φ2) of the signal line φ2 (refer to an arrow P621 in FIG. 40(A); Vp2<Vp1). At this time, after the gate voltage Vg2 of the photoelectric transducer PD62 is reset to Vp2 through bringing the switching element SW62 into the on-state, the switching element SW62 is brought into the off-state. Then, after that, when the anode potential Vp is Vp=Vp1, as illustrated in a C-V characteristic in FIG. 40(B), the gate voltage Vg of the photoelectric transducer PD62 is reduced due to a coupling capacity between the gate and the anode, and stops at an operation point (Vg=Vg21) where the coupling capacity is increased. That is, the gate voltage Vg1 in the photoelectric transducer PD62 is changed alternately between Vg21 and Vg22 (refer to an arrow P622 in FIG. 40(A); Vg22<Vg21). Thus, for example, as illustrated in FIG. 40(A), the voltage ranges of the on-operation region α and the off-operation region β2 are different from each other between in the case of Vp=Vp1 and in the case of Vp=Vp2 (refer to the on-operation regions α1 and α2 and the off-operation regions β21 and β22). Therefore, when such a change in photoelectric conversion efficiency is actively used, as illustrated by operation points P62on and P62off in FIGS. 40(A) and (B), the on/off-state of the photoelectric transducer PD62 is arbitrarily settable by the potential V(φ2) of the signal line φ2 and the operation by the switching element SW62.

In the light-receiving section 33F of the modification example, for example, as illustrated in FIGS. 41(A) to (G) and FIGS. 42(A) to (C), by the reset signal voltages V(Reset1) and V(Reset2), the read signal voltage V(Read), the potentials V(φ1) and V(φ2) of the signal lines φ1 and φ2, the reset power source Vrst and the like, the image pickup operation is performed at timings in the drawings.

Figure 43:
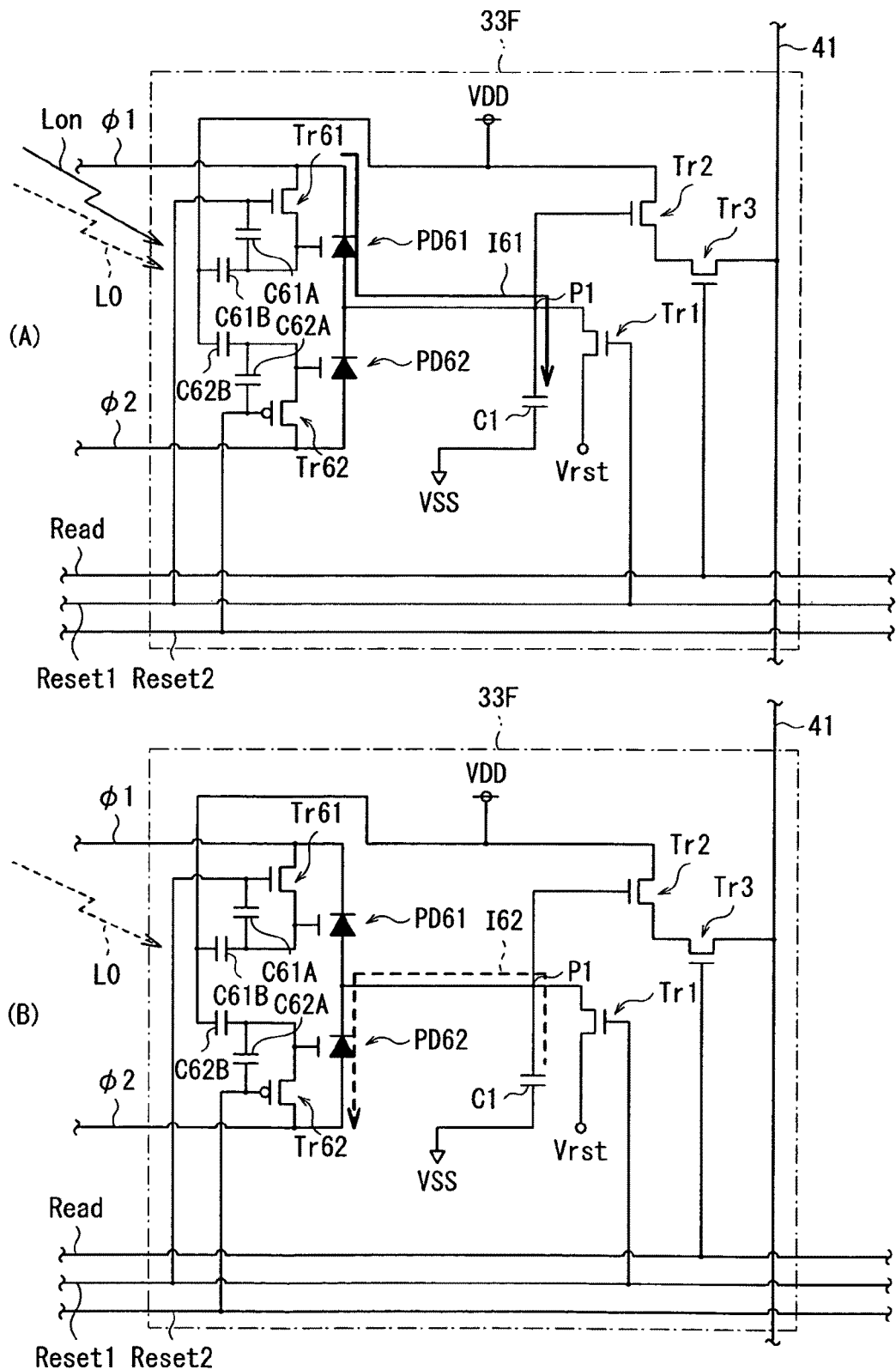
FIG. 43 is a circuit diagram for describing a charge operation and a discharge operation during the image pickup operation according to Modification Example 5.

More specifically, for example, as illustrated in FIG. 43(A), the electric charge for charging (in accordance with the total light amount as a summation of the reflected light Lon and the outside light L0) generated in the photoelectric transducer PD61 is accumulated in the capacitor C1 through a current path I61 in the drawing through bringing the photoelectric transducers PD61 and PD62 into the on-state and the off-state, respectively. Moreover, for example, as illustrated in FIG. 43(B), the electric charge for discharging (in accordance with the light amount of the outside light L0) generated in the photoelectric transducer PD62 is released from the capacitor C1 through a current path I62 in the drawing through bringing the photoelectric transducers PD61 and PD62 into the off-state and the on-state, respectively. In addition, a current flowing when the photoelectric transducers PD61 and PD62 are in the off-state is not 0, so to be precise, charging or discharging is performed by a current difference between the photoelectric transducer which is in the on-state and the photoelectric transducer which is in the off-state.

Thus, also in the modification example, by the above-described image pickup operation, the object is stably detectable irrespective of use conditions while reducing manufacturing costs.

Modification Example 6

Figure 44:
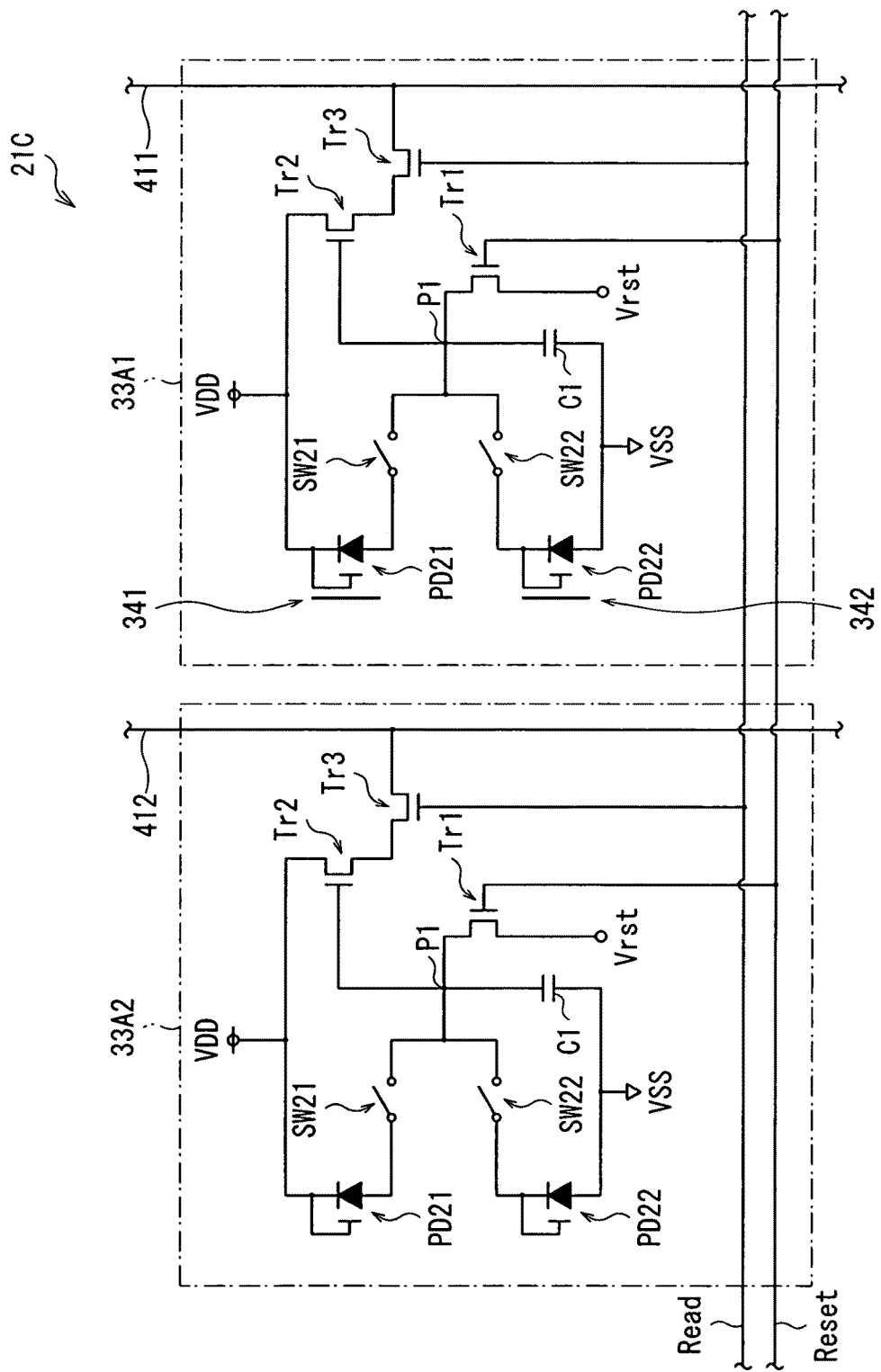
FIG. 44 is a circuit diagram illustrating a configuration example of a light-receiving section in a display area (a sensor area) in Modification Example 6 of the invention.

FIG. 44 illustrates a circuit configuration of a light-receiving section (light-receiving sections 33A1 and 33A2) in a display area (a display area (a sensor area) 21C) according to Modification Example 6. In the display area 21C, an image pickup pixel (the light-receiving section) includes an image pickup pixel (the light-receiving section) 33A1 including light-shielding sections 341 and 342 for shielding the photoelectric transducers PD21 and PD22 from the reflected light Lon and the environment light L0, and an image pickup pixel (the light-receiving section) 33A2 not including such a light-shielding section. In addition, any circuit configuration other than the light-shielding sections in the light-receiving sections 33A1 and 33A2 is the same as that of the above-described light-receiving section 33A described in Modification Example 1, and will not be further described.

Figure 45:
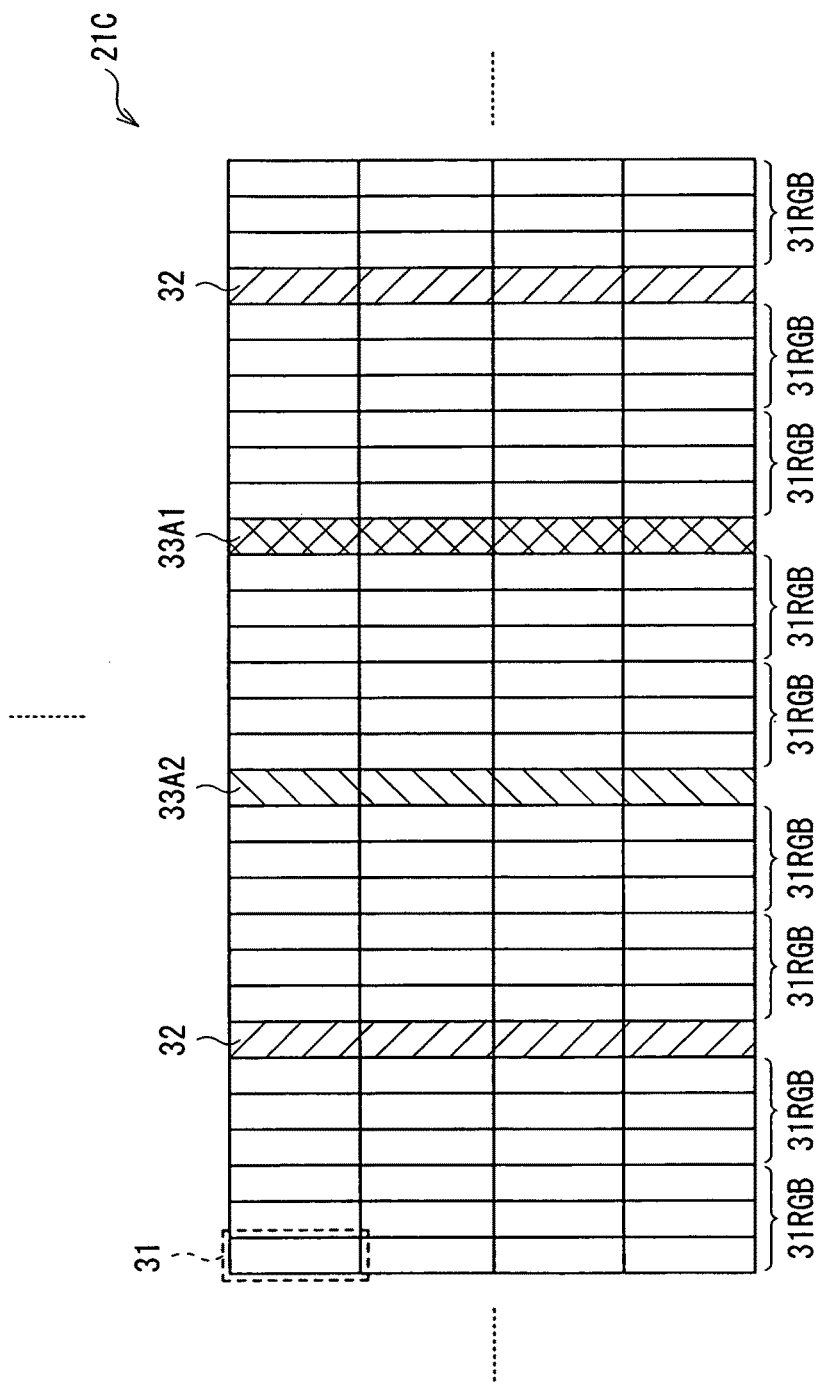
FIG. 45 is a plan view illustrating a pixel arrangement example in the display area (the sensor area) illustrated in FIG. 44.
Figure 46:
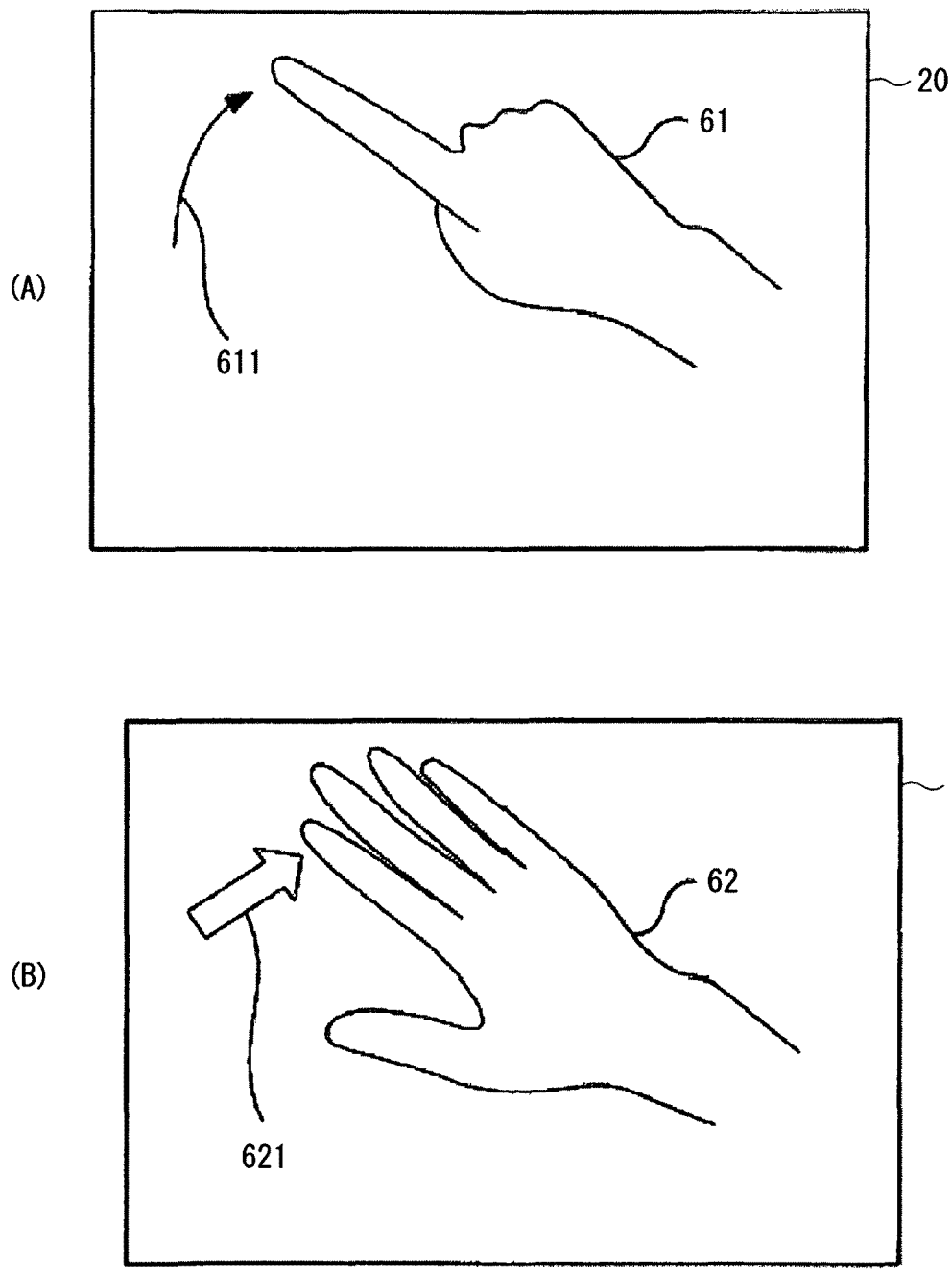
FIG. 46 is an illustration for describing an example of an application using an image pickup result (a result of a fingertip extraction process) in the invention.

In addition, also in these light-receiving sections (the image pickup pixels) 33A1 and 33A2, in the display area (the sensor area) 21C, for example, as illustrated in FIG. 45, the image pickup pixels 33A1 and 33A2 and the wiring sections 32 for driving these image pickup pixels 33A1 and 33A2 to pick up an image are arranged separately from each other.

In the modification example, the object information is obtained based on a difference signal between an image pickup signal obtained from the image pickup pixel 33A1 (an image pickup signal read out from a readout line 411) and an image pickup signal obtained from the image pickup pixel 33A2 (an image pickup signal read out from a readout line 412).

Thus, also in the modification example, the same fingertip extraction process is performed by the same image pickup operation as in the case of the above-described embodiment. Thereby, also in the modification example, the object is stably detectable irrespective of use conditions while reducing manufacturing costs.

Moreover, the image pickup pixel (the light-receiving section) includes the image pickup pixel (the light-receiving section) 33A1 including the light-shielding sections 341 and 342 and the image pickup pixel (the light-receiving section) 33A2 not including such a light-shielding section, and the object information is obtained based on the difference signal between the image pickup signal obtained from the image pickup pixel 33A1 and the image pickup signal obtained from the image pickup pixel 33A2, so an influence of a voltage gradient or the like generated in the I/O display panel 20, a noise component generated in the drive of a display system, or the like is allowed to be removed, and an improvement in the S/N ratio is allowed.

In addition, in the modification example, the case where the light-receiving sections 33A1 and 33A2 of two kinds each are based on the circuit configuration of the light-receiving section 33A according to Modification Example 1 is described, but such light-receiving sections of two kinds may be based on the circuit configuration of any one of the light-receiving section 33 according to the above-described embodiment and the light-receiving sections 33B to 33F according to Modification Examples 2 to 5.

Execution Example of Application Program

Next, referring to FIGS. 46 to 49, some execution examples of an application program by the application program execution section 11 using object position information or the like detected by the above-described fingertip extraction process will be described below.

First, an example shown in FIG. 46(A) is an example in which when a fingertip 61 touches a surface of the I/O display panel 20, a trail of points where the fingertip 61 touches is displayed on a screen as a drawing line 611.

Moreover, an example shown in FIG. 46(B) is gesture recognition using the shape of a hand. More specifically, the shape of a hand 62 touching (or in proximity to) the I/O display panel 20 is recognized, and the shape of the recognized hand is displayed as an image, and some process is performed on the image by a movement 621 of a displayed object.

Figure 47:
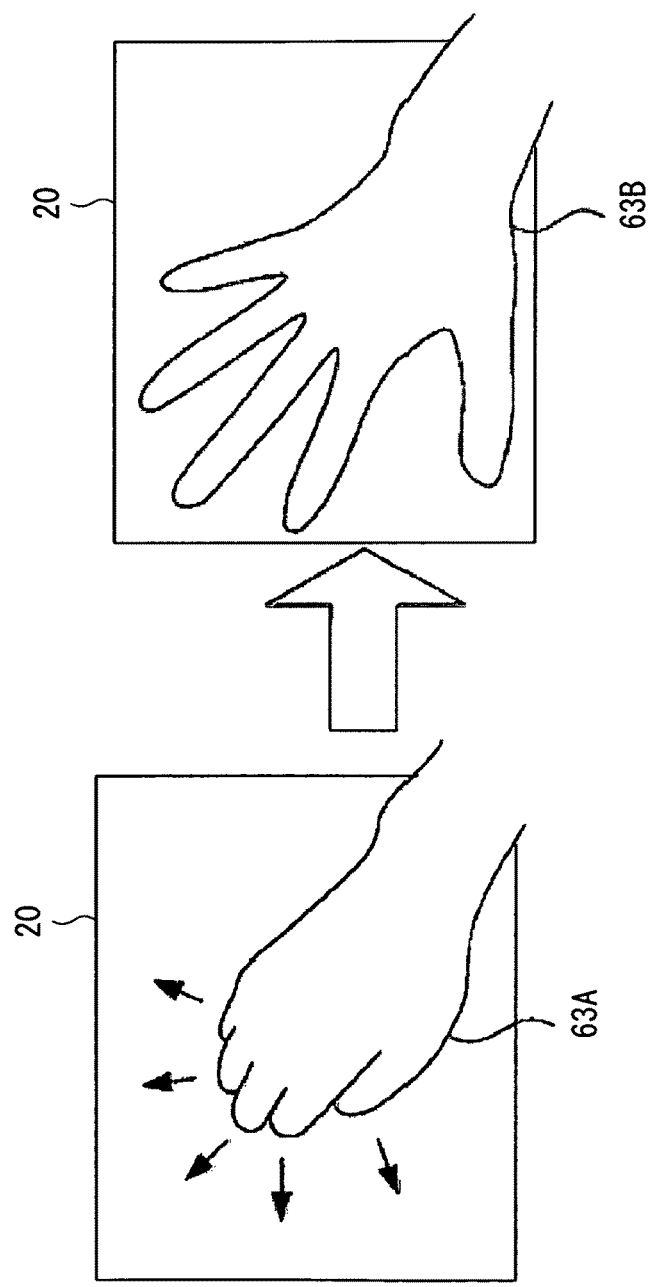
FIG. 47 is an illustration for describing an example of the application using the image pickup result (the result of the fingertip extraction process) in the invention.

Further, an example shown in FIG. 47 is that by changing from a hand 63A in a closed state to a hand 63B in an opened state, the hands touching or coming in proximity in both states are image-recognized by the I/O display panel 20 to execute a process on the basis of these image recognitions. When the process is performed based on these recognitions, for example, an instruction such as zoom-in is performed. Moreover, as such an instruction is performed, for example, the I/O display panel 20 is connected to a personal computer, and an operation of switching a command on the computer or the like is inputted by these image recognitions in a more natural way.

Figure 48:
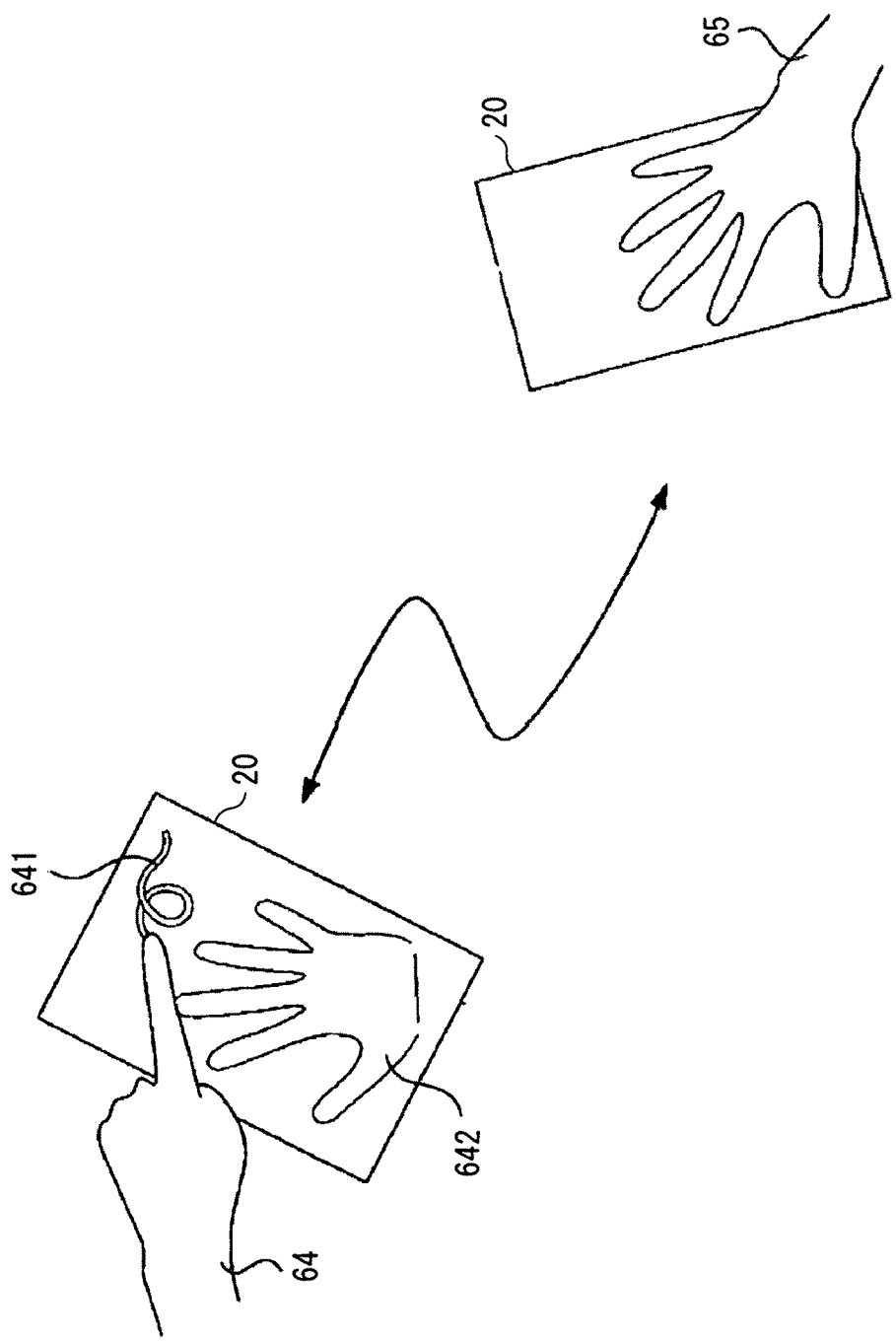
FIG. 48 is an illustration for describing an example of the application using the image pickup result (the result of the fingertip extraction process) in the invention.

Moreover, for example, as illustrated in FIG. 48, when a plurality of I/O display panels 20 are prepared, and the plurality of I/O display panels 20 are connected to one another by some transmission means, users operating the I/O display panels 20 may communicate with each other by transmitting and displaying an image obtained by detecting an object touching or coming in proximity to one I/O display panel 20 to and on another I/O display panel 20. That is, as illustrated in FIG. 48, two I/O display panels 20 are prepared, thereby a process such as transmitting the shape of a hand 65 which is image-recognized in one panel to the other panel so that a hand shape 642 is displayed on the other panel, or transmitting and displaying a track 641 displayed by touching one panel by a hand 64 to and on the other panel is allowed to be performed. Thus, the I/O display panel 20 which transmits a drawing state as a moving image, and transmits a handwriting character, symbol or the like to other I/O display panel 20 may be a potential new communication tool. As such an example, it is expected that, for example, the I/O display panel 20 is applied to a display panel of a cellular phone or the like.

Figure 49:
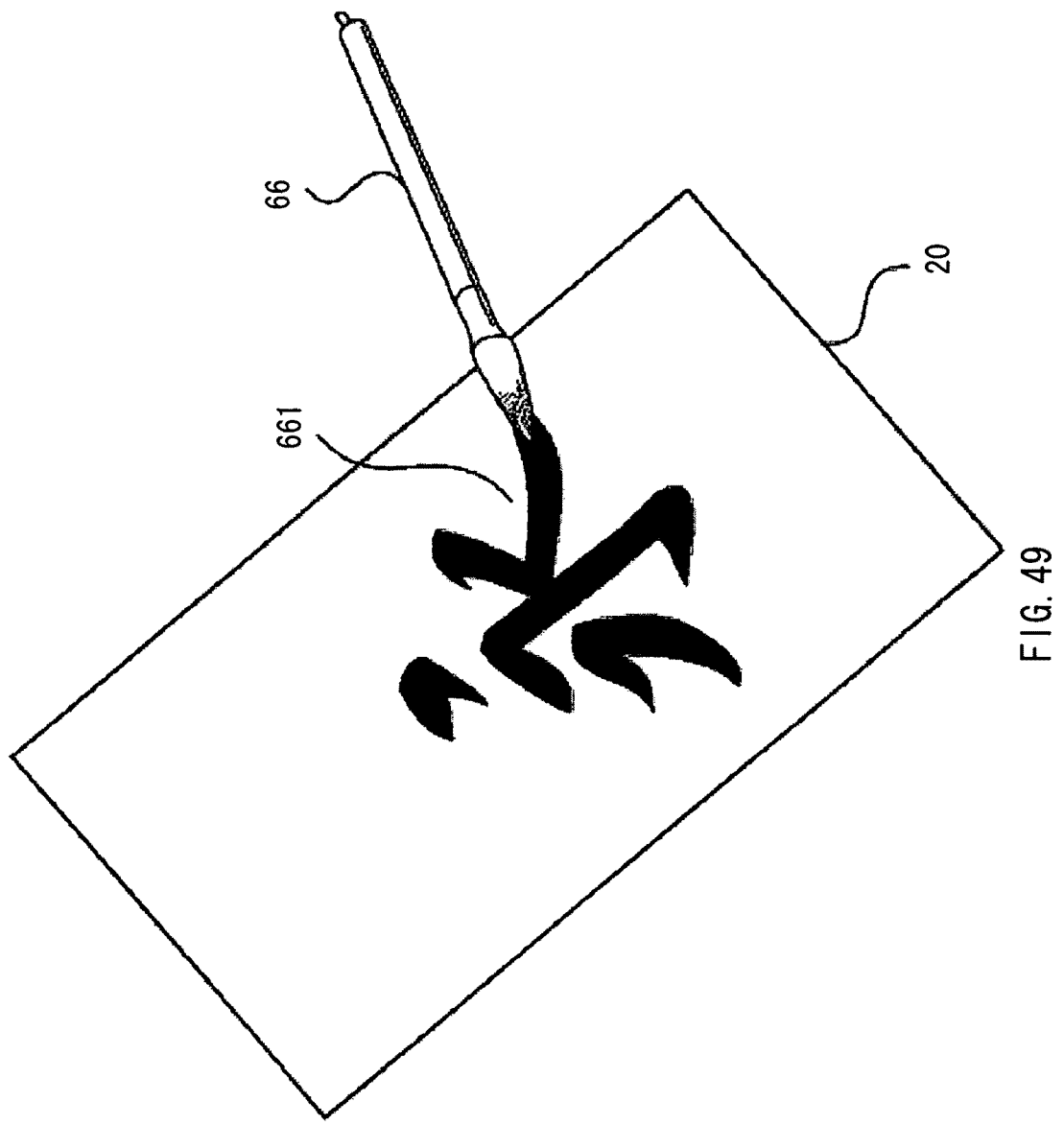
FIG. 49 is an illustration for describing an example of the application using the image pickup result (the result of the fingertip extraction process) in the invention.

Moreover, for example, as illustrated in FIG. 49, a brush 66 is used, and touches a surface of the I/O display panel 20 so as to draw a character, and a point where the brush 66 touches is displayed on the I/O display panel 20 as an image 661, thereby handwriting input by a brush is allowed. In this case, a fine touch by a brush is allowed to be recognized and displayed. In handwriting recognition in related art, for example, in some digitizers, the inclination of a special pen is reflected by detecting an electric field; however, in the example, a surface where a real brush touches is detected, thereby information input is performed with a more realistic sense.

MODULE AND APPLICATION EXAMPLES

Next, application examples of the display-and-image-pickup device described in the above-described embodiment and modification examples will be described referring to FIGS. 50 to 54. The display-and-image-pickup device of the above-described embodiment or the like is applicable to electronic apparatuses displaying a picture signal inputted from outside or a picture signal produced inside as an image or a picture in any fields, such as televisions, digital cameras, notebook personal computers, portable terminal elements such as cellular phones, and video cameras.

Application Example 1

Figure 50:
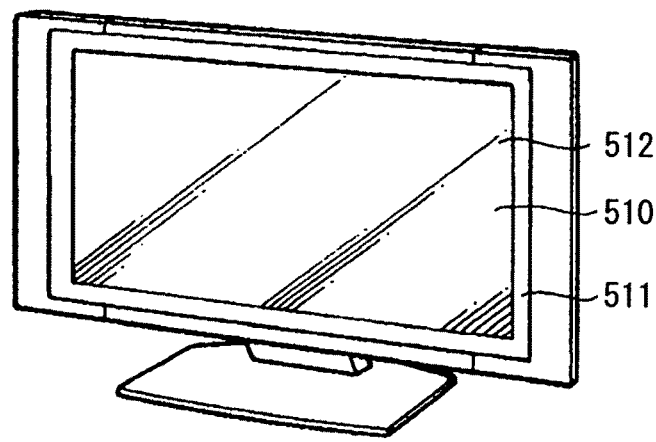
FIG. 50 is a perspective view illustrating an appearance of Application Example 1 of a display-and-image-pickup device of the invention.

FIG. 50 illustrates an appearance of a television to which the display-and-image-pickup device of the above-described embodiment or the like is applied. The television has, for example, a picture display screen section 510 including a front panel 511 and a filter glass 512, and the picture display screen section 510 is configured of the display-and-image-pickup device according to the above-described embodiment or the like.

Application Example 2

Figure 51:
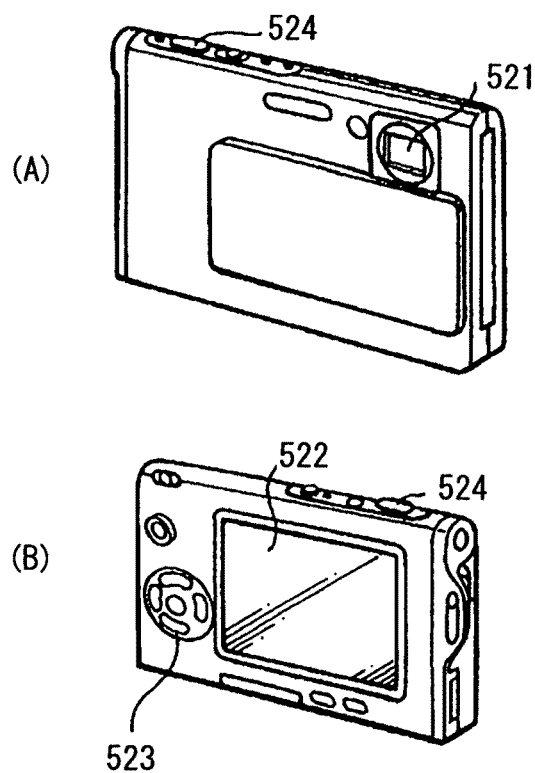
FIG. 51(A) is a perspective view illustrating an appearance viewed from a front side of Application Example 2.
FIG. 51(B) is a perspective view illustrating an appearance viewed from a back side of Application Example 2.

FIG. 51 illustrates appearances of a digital camera to which the display-and-image-pickup device of the above-described embodiment or the like is applied. The digital camera has, for example, a light-emitting section for a flash 521, a display section 522, a menu switch 523, and a shutter button 524, and the display section 522 is configured of the display-and-image-pickup device according to the embodiment or the like.

Application Example 3

Figure 52:
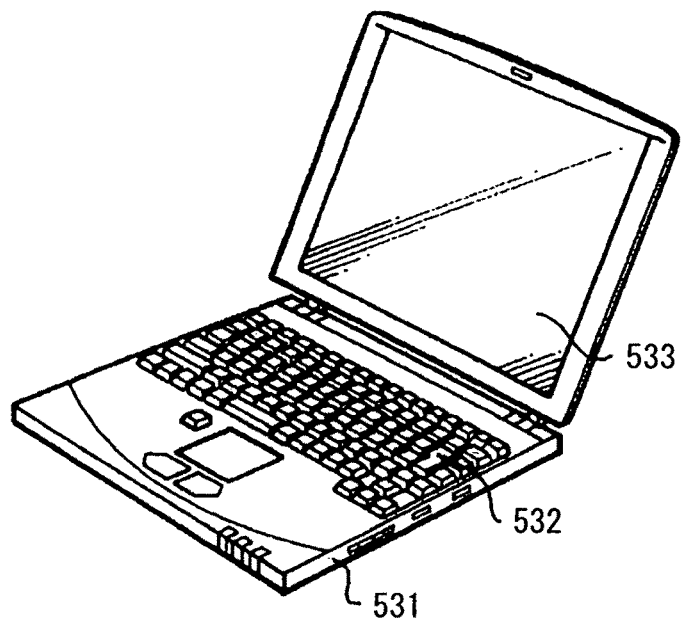
FIG. 52 is a perspective view illustrating an appearance of Application Example 3.

FIG. 52 illustrates an appearance of a notebook personal computer to which the display-and-image-pickup device of the above-described embodiment or the like is applied. The notebook personal computer has, for example, a main body 531, a keyboard 532 for operation of inputting characters and the like and a display section 533 for displaying an image, and the display section 533 is configured of the display-and-image-pickup device according to the above-described embodiment or the like.

Application Example 4

Figure 53:
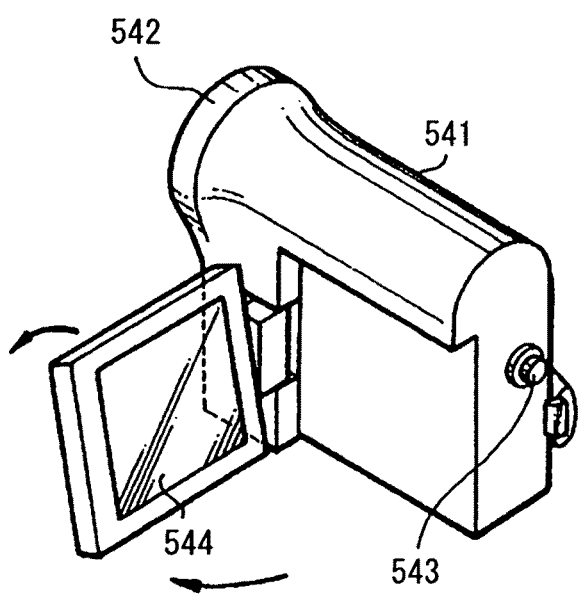
FIG. 53 is a perspective view illustrating an appearance of Application Example 4.

FIG. 53 illustrates an appearance of a video camera to which the display-and-image-pickup device of the above-described embodiment or the like is applied. The video camera has, for example, a main body 541, a lens for shooting an object 542 arranged on a front surface of the main body 541, a shooting start/stop switch 543 and a display section 544, and the display section 544 is configured of the display-and-image-pickup device according to the above-described embodiment or the like.

Application Example 5

Figure 54:
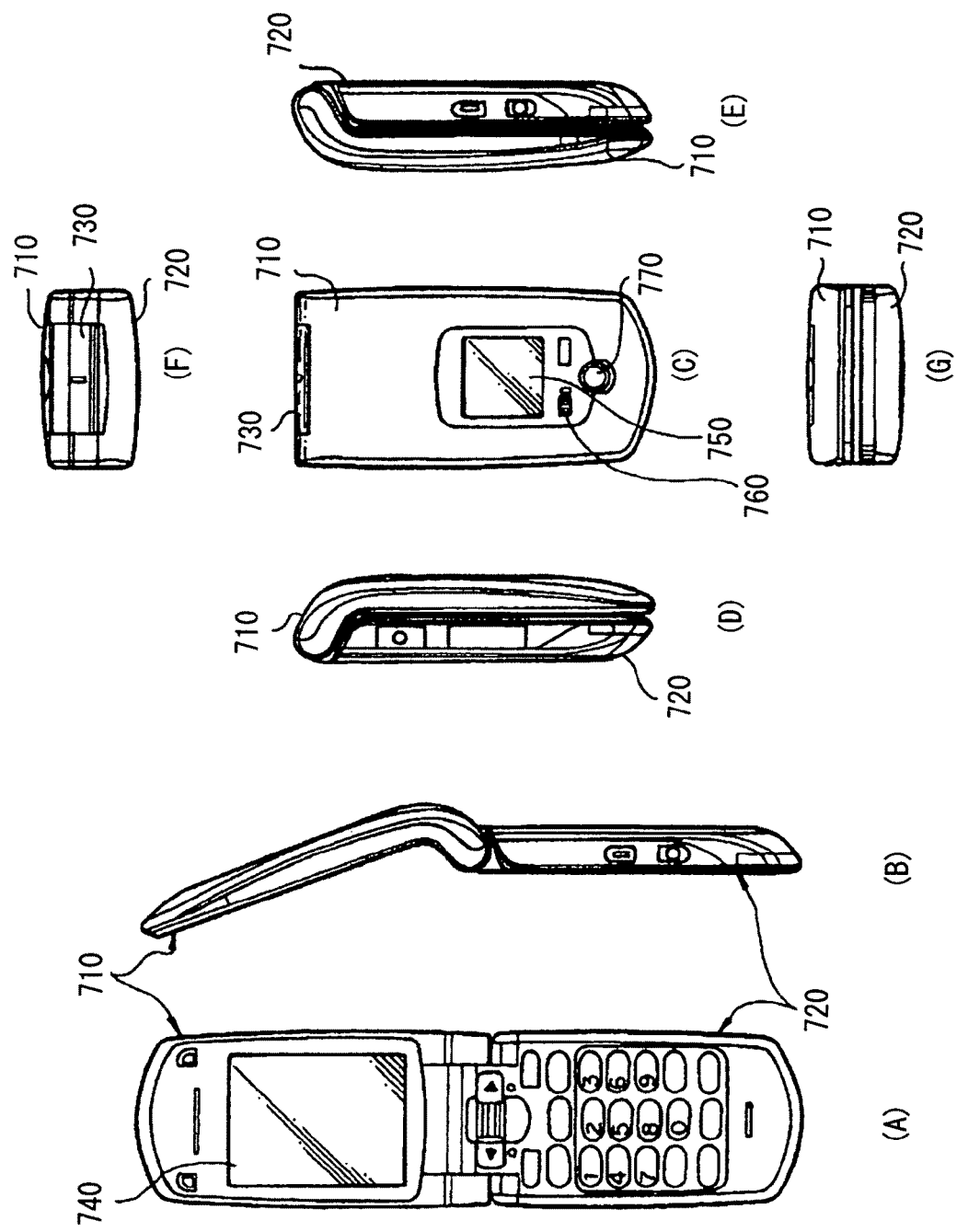
FIGS. 54(A) and 54(B) are a front view and a side view in a state in which Application Example 5 is opened, respectively.
FIGS. 54(C), 54(D), 54(E), 54(F) and 54(G) are a front view, a left side view, a right side view, a top view and a bottom view in a state in which Application Example 5 is closed, respectively.
Figure 55:
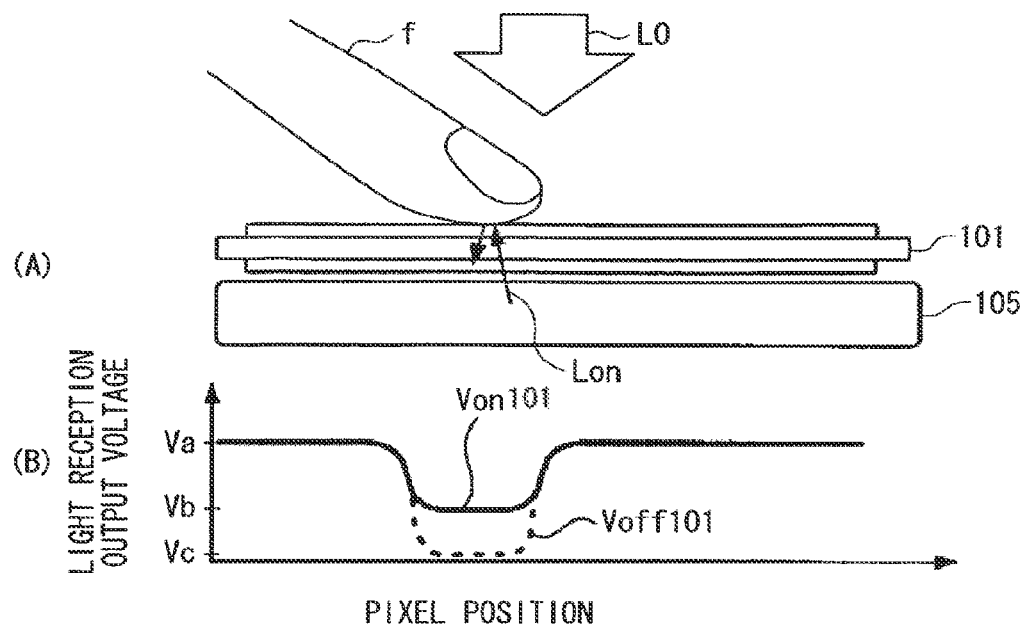
FIG. 55 is a plot illustrating an example of an image pickup operation (a difference image fingertip extraction process) by a display-and-image-pickup device in related art.
Figure 56:
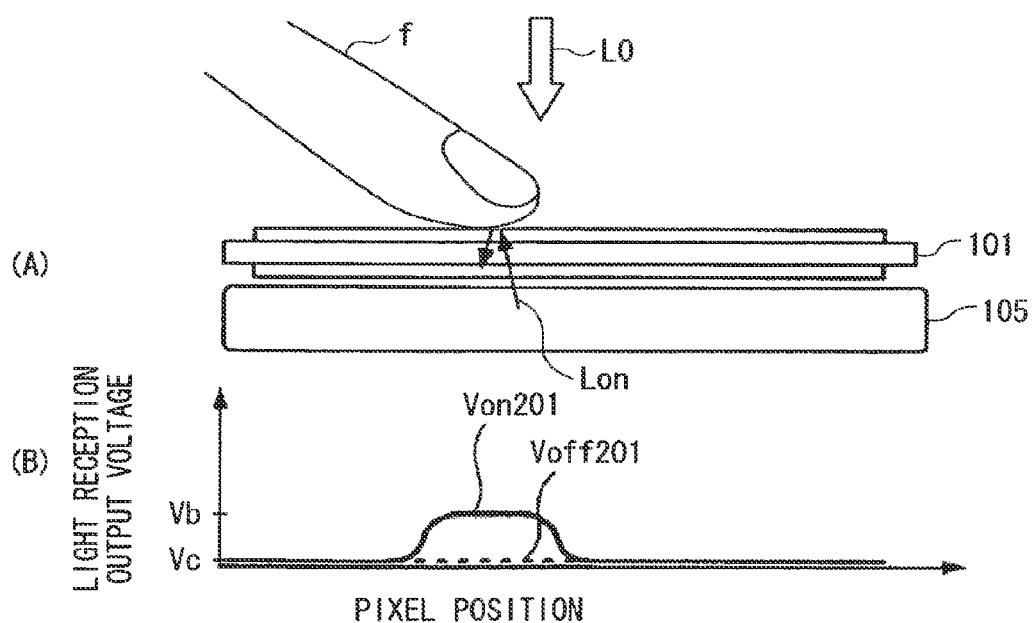
FIG. 56 is a plot illustrating another example of the image pickup operation (the difference image fingertip extraction process) by the display-and-image-pickup device in related art.

FIG. 54 illustrates appearances of a cellular phone to which the display-and-image-pickup device of the above-described embodiment or the like is applied. The cellular phone is formed by connecting, for example, a top-side enclosure 710 and a bottom-side enclosure 720 to each other by a connection section (hinge section) 730, and the cellular phone has a display 740, a sub-display 750, a picture light 760, and a camera 770. The display 740 or the sub-display 750 is configured of the display-and-image-pickup device according to the above-described embodiment or the like.

Although the present invention is described referring to the embodiment, the invention is not limited thereto, and may be variously modified.

For example, in the above-described embodiment or the like, the case of the I/O display panel configured of a liquid crystal panel including the backlight 15 is described; however, the backlight for display may also serve as a lighting device for detection, or a lighting device for detection only may be arranged. Moreover, in the case where a lighting device for detection is arranged, light in a wavelength region other than a visible light region (for example, infrared light) is more preferably used.

Moreover, in the above-described embodiment or the like, for example, as illustrated in FIG. 7, the case where a reset operation or a readout operation is performed on the light-receiving sections (the image pickup pixels) in one line in one ON period or one OFF period of the backlight 15 (the case where a blinking operation of a high-frequency backlight is performed) is described; however, the invention is not limited to the case. That is, for example, the reset operation or the readout operation may be performed on the light-receiving sections (the image pickup pixels) in a plurality of lines in one ON period or one OFF period of the backlight 15 (a blinking operation of a low-frequency backlight may be performed).

Further, in the above-described embodiment or the like, the case where in the I/O display panel 20, display elements are liquid crystal elements, and light-receiving elements are separately arranged is described; however, for example, like an organic EL (ElectroLuminescence) element, a light-emitting/receiving element (a display-and-image-pickup element) capable of performing a light-emitting operation and a light-receiving operation in a time-divisional manner may constitute an I/O display panel. In addition, a period in which display light is not emitted in this case is a period in which the light-emitting operation by the display-and-image-pickup element is not performed.

Moreover, in the above-described embodiment or the like, the display-and-image-pickup device including a display-and-image-pickup panel (the I/O display panel 20) which includes a plurality of display elements and a plurality of image pickup elements is described; however, the invention is applicable to an image pickup device including an image pickup panel including a plurality of image pickup elements and not including a display element.

The invention claimed is:

1. An image pickup device comprising:
an image pickup panel including a plurality of image pickup pixels, and having an illumination light source for a proximity object;
an image pickup drive means for obtaining an image pickup signal from each of the image pickup pixels by performing an image pickup drive on each of the image pickup pixels; and
an image processing means for obtaining object information including one or more of position, shape and size of the proximity object through utilizing a picked-up image based on the image pickup signal obtained from each of the image pickup pixels,
wherein each of the image pickup pixels includes:
a photoelectric transducer configured to generate an electric charge according to the amount of received light,
a capacitor,
a charging circuit coupled to the photoelectric transducer and the capacitor, and configured to allow an electric charge for charging to be accumulated in the capacitor, and
a discharging circuit is coupled to the photoelectric transducer and the capacitor, and configured to allow an electric charge for discharging to be released from the capacitor, and
wherein the image pickup drive means performs an image pickup drive that includes driving each charging circuit so that when illumination light is emitted from the illumination light source, the electric charge for charging is accumulated in the corresponding capacitor of each of the image pickup pixels in accordance with total light amount as a summation of reflected light originating from the illumination light and environment light, and includes driving each corresponding discharging circuit so that when the illumination light is not emitted from the illumination light source, the electric charge for discharging is released from the corresponding capacitor of each of the image pickup pixels through the corresponding photoelectric transducer in accordance with light amount of the environment light and not the reflected light originating from the illumination light, thereby to obtain the image pickup signal from each of the image pickup pixels.

2. The image pickup device according to claim 1, wherein the photoelectric transducer generates both of the electric charge for charging and the electric charge for discharging,
the charging circuit includes a switching element for charging, and the discharging circuit includes a switching element for discharging, and
the image pickup drive means performs the image pickup drive on the switching element for charging and the switching element for discharging so that the electric charge for charging generated in the photoelectric transducer is accumulated in the capacitor through the switching element for charging, and the discharge electric charge generated in the photoelectric transducer is released from the capacitor through the switching element for discharging.

3. The image pickup device according to claim 2, wherein the image pickup drive means performs an image pickup drive so that an on-state period of the switching element for charging and an on-state period of the switching element for discharging do not overlap one another.

4. The image pickup device according to claim 1, wherein the photoelectric transducer is configured of a first photoelectric transducer generating the electric charge for charging and a second photoelectric transducer generating the electric charge for discharging,
the charging circuit includes a switching element for charging, and the discharging circuit includes a switching element for discharging, and
the image pickup drive means performs the image pickup drive on the switching element for charging and the switching element for discharging so that the electric charge for charging generated in the first photoelectric transducer is accumulated in the capacitance element through the switching element for charging, and the discharge electric charge generated in the second photoelectric transducer is released from the capacitor through the switching element for discharging.

5. The image pickup device according to claim 4, wherein the image pickup drive means performs the image pickup drive on the switching element for charging and the switching element for discharging so that one end of the capacitor is alternately switched to be connected to a power source and a ground between a period of accumulating the electric charge for charging and a period of releasing the electric charge for discharging.

6. The image pickup device according to claim 5, wherein the image pickup drive means performs the image pickup drive so that an on-state period of the switching element for charging and an on-state period of the switching element for discharging do not overlap one another.

7. The image pickup device according to claim 1, wherein the photoelectric transducer is configured of a first photoelectric transducer generating the electric charge for charging and a second photoelectric transducer generating the electric charge for discharging,
each of the first and second photoelectric transducers is configured of a PIN photodiode including an anode electrode, a cathode electrode and a gate electrode, and
the image pickup drive means performs:
setting each of the first and second photoelectric transducers to an on-state or off-state through separately changing a potential relationship between the cathode electrode and the gate electrode in the first photoelectric transducer and a potential relationship between the anode electrode and the gate electrode in the second photoelectric transducer, and
driving the first and second photoelectric transducers for image pickup so that the electric charge for charging generated in the first photoelectric transducer is accumulated in the capacitor through bringing the first photoelectric transducer and the second photoelectric transducer into an on-state and an off-state, respectively, and so that the electric charge for discharging generated in the second photoelectric transducer is released from the capacitor through bringing the first photoelectric transducer and the second photoelectric transducer into an off-state and an on-state, respectively.

8. The image pickup device according to claim 7, wherein the image pickup drive means separately fixes the potential of the cathode electrode in the first photoelectric transducer and the potential of the anode electrode in the second photoelectric transducer, and separately sets the first and second photoelectric transducers to an on-state or off-state through separately changing the potentials of the gate electrodes in the first and second photoelectric transducers.

9. The image pickup device according to claim 7, wherein the image pickup drive means separately sets the first and second photoelectric transducers to an on-state or off-state through separately changing the potential of the cathode electrode in the first photoelectric transducer and the potential of the anode electrode in the second photoelectric transducer.

10. The image pickup device according to claim 9, wherein the image pickup drive means separately fixes the potentials of the gate electrodes in the first and second photoelectric transducers, respectively.

11. The image pickup device according to claim 9, wherein the image pickup drive means separately sets the potentials of the gate electrodes in the first and second photoelectric transducers to a high impedance state both in a period of accumulating the electric charge for charging and in a period of releasing the electric charge for discharging.

12. The image pickup device according to claim 1, wherein the image pickup pixels include a first image pickup pixel and a second image pickup pixel, the first image pickup pixel including a light-shielding section blocking both the reflected light and the environment light, while the second image pickup pixel not including the light-shielding section, and
the image processing means obtains the object information based on a difference signal between an image pickup signal obtained from the first image pickup pixel and an image pickup signal obtained from the second image pickup pixel.

13. The image pickup device according to claim 1, wherein the image processing means obtains the object information based on an image pickup signal obtained after multiple times of switching between an operation of accumulating the electric charge for charging and an operation of releasing the electric charge for discharging.

14. The image pickup device according to claim 1, wherein an initialization voltage, allowing whole of the electric charge accumulated in each of the image pickup pixels to be released, is an arbitrary voltage between a power source voltage and a ground voltage.

15. The image pickup device according to claim 1, wherein the image pickup pixels in the image pickup panel are arranged in a matrix form in the image pickup panel, and
the image pickup drive means performs the image pickup drive on the image pickup pixels in a line-sequential manner.

16. The image pickup device according to claim 1, wherein in the image pickup panel, the image pickup pixels and wiring for driving the image pickup pixels for image pickup are arranged separately from each other.

17. The image pickup device according to claim 1, wherein the image pickup drive means performs an image pickup drive so that when the proximity object is moving on the image pickup panel, the electric charge for charging is accumulated and the electric charge for discharging is released, thereby the image pickup drive means obtains an image pickup signal from each of the image pickup pixels.

18. The image pickup device according to claim 1, wherein the image processing means obtains the object information about a plurality of proximity objects placed on the image pickup panel at one time.

19. The image pickup device according to claim 1, the image pickup pixels further comprising:
a readout line, and
a readout circuit that is provided between the readout line and the capacitor, and couples the readout line to the capacitor so that a potential of the capacitor is read out from the readout line as the image pickup signal in response to a read signal,
wherein, in the image pickup drive, the image pickup drive means supplies the read signal to the readout circuit after an operation of accumulating the electric charge and an operation of releasing the electric charge for discharging.

20. A display-and-image-pickup device comprising:
a display-and-image-pickup panel including a plurality of display pixels and a plurality of image pickup pixels;
a display drive means for displaying an image by performing a display drive on each of the display pixels;
an image pickup drive means for obtaining an image pickup signal from each of the image pickup pixels by performing an image pickup drive on each of the image pickup pixels; and
an image processing means for obtaining object information including one or more of position, shape and size of a proximity object through utilizing a picked-up image based on the image pickup signal obtained from each of the image pickup pixels,
wherein each of the image pickup pixels includes:
a photoelectric transducer configured to generate an electric charge according to the amount of received light,
a capacitor,
a charging circuit coupled to the photoelectric transducer and the capacitor, and configured to allow an electric charge for charging to be accumulated in the capacitor, and
a discharging circuit coupled to the photoelectric transducer and the capacitor, and configured to allow an electric charge for discharging to be released from the capacitor, and
wherein the image pickup drive means performs an image pickup drive that includes driving each charging circuit so that when illumination light is emitted from the illumination light source, the electric charge for charging is accumulated in the corresponding capacitor of each of the image pickup pixels in accordance with total light amount as a summation of reflected light originating from the illumination light and environment light, and includes driving each corresponding discharging circuit so that when the illumination light is not emitted from the illumination light source, the electric charge for discharging is released from the corresponding capacitor of each of the image pickup pixels through the corresponding photoelectric transducer in accordance with light amount of the environment light and not the reflected light originating from the illumination light, thereby to obtain the image pickup signal from each of the image pickup pixels.

21. The display-and-image-pickup device according to claim 20, wherein
each of an operation of accumulating the electric charge for charging and an operation of releasing the electric charge for discharging each are in synchronization with a horizontal period during the display drive.

22. The display-and-image-pickup device according to claim 21, wherein
the image processing means obtains the object information based on an image pickup signal obtained after multiple times of switching between the operation of accumulating the electric charge for charging and the operation of releasing the electric charge for discharging.

23. The display-and-image-pickup device according to claim 20, wherein
the display drive means performs a display drive based on object information obtained by the image processing means, thereby to display the object information on the display-and-image-pickup panel.

24. The display-and-image-pickup device according to claim 20, wherein
the display pixels and the image pickup pixels are configured to include a plurality of display-and-image-pickup elements each allowed to perform a light-emitting operation and a light-receiving operation in a time-divisional manner.

25. An electronic apparatus comprising a display-and-image-pickup device having an image display function and an image pickup function, the display-and-image-pickup device includes:
a display-and-image-pickup panel including a plurality of display pixels and a plurality of image pickup pixels;
a display drive means for displaying an image by performing a display drive on each of the display pixels;
an image pickup drive means for obtaining an image pickup signal from each of the image pickup pixels by performing an image pickup drive on each of the image pickup pixels; and
an image processing means for obtaining object information including one or more of position, shape and size of a proximity object through utilizing a picked-up image based on the image pickup signal obtained from each of the image pickup pixels,
wherein each of the image pickup pixels includes:
a photoelectric transducer configured to generate an electric charge according to the amount of received light,
a capacitor,
a charging circuit coupled to the photoelectric transducer and the capacitor, and configured to allow an electric charge for charging to be accumulated in the capacitor, and
a discharging circuit coupled to the photoelectric transducer and the capacitor, and configured to allow an electric charge for discharging to be released from the capacitor, and
wherein the image pickup drive means performs an image pickup drive that includes driving each charging circuit so that when illumination light is emitted from the illumination light source, the electric charge for charging is accumulated in the corresponding capacitor of each of the image pickup pixels in accordance with total light amount as a summation of reflected light originating from the illumination light and environment light, and includes driving each corresponding discharging circuit so that when the illumination light is not emitted from the illumination light source, the electric charge for discharging is released from the corresponding capacitor of each of the image pickup pixels through the corresponding photoelectric transducer in accordance with light amount of the environment light and not the reflected light originating from the illumination light, thereby to obtain the image pickup signal from each of the image pickup pixels.

26. A method of detecting an object using an image pickup panel, the image pickup panel including a plurality of image pickup pixels and an illumination light source for a proximity object, each of the image pickup pixels including a photoelectric transducer that generates an electric charge according to the amount of received light, a capacitor, a charging circuit that is coupled to the photoelectric transducer and the capacitor and that allows the electric charge for charging to be accumulated in the capacitor, and a discharging circuit that is coupled to the photoelectric transducer and the capacitor and that allows an electric charge for discharging to be released from the capacitor, the method comprising steps of:
performing an image pickup drive that includes driving each charging circuit so that when illumination light is emitted to a proximity object from the illumination light source of the image pickup panel, the electric charge for charging is accumulated in the corresponding capacitor of each of the image pickup pixels in accordance with total light amount as a summation of reflected light originating from the illumination light and environment light, and includes driving each corresponding discharging circuit so that when the illumination light is not emitted, the electric charge for discharging is released from the corresponding capacitor of each of the image pickup pixels through the corresponding photoelectric transducer in accordance with light amount of the environment light and not the reflected light originating from the illumination light, thereby obtaining an image pickup signal from each of the image pickup pixels; and
obtaining object information including one or more of position, shape and size of the proximity object through utilizing a picked-up image based on the image pickup signal obtained from each of the image pickup pixels.

* * * * *